United States Patent [19]
Bakalash

[11] Patent Number: 5,963,212
[45] Date of Patent: *Oct. 5, 1999

[54] PARALLEL COMPUTING SYSTEM FOR MODELING AND DATA PROCESSING

[76] Inventor: Reuven Bakalash, 82 Shita St., Omer, 84965, Israel

[*] Notice: This patent is subject to a terminal disclaimer.

[21] Appl. No.: 08/873,043

[22] Filed: Jun. 11, 1997

Related U.S. Application Data

[63] Continuation of application No. 08/329,483, Oct. 26, 1994, abandoned, which is a continuation of application No. 07/936,178, Aug. 26, 1992, Pat. No. 5,361,385.

[51] Int. Cl.$^6$ .................................................. G06T 17/00

[52] U.S. Cl. .......................... 345/424; 345/501; 345/505; 345/507

[58] Field of Search ............................... 345/424, 501–2, 345/521–3, 526, 509, 517, 419–24, 505–6, 507–9

[56] References Cited

U.S. PATENT DOCUMENTS

| | | | |
|---|---|---|---|
| 4,590,465 | 5/1986 | Fuchs ...................................... | 345/189 |
| 4,598,400 | 7/1986 | Hillis ......................................... | 370/60 |
| 4,641,351 | 2/1987 | Preston, Jr. .............................. | 382/154 |
| 4,814,980 | 3/1989 | Peterson et al. ...................... | 395/200.3 |
| 4,985,834 | 1/1991 | Cline et al. ........................ | 364/413.22 |
| 4,985,856 | 1/1991 | Kaufman ................................ | 345/421 |
| 4,987,554 | 1/1991 | Kaufman ................................ | 345/424 |
| 5,101,475 | 3/1992 | Kaufman et al. ...................... | 355/424 |
| 5,222,216 | 6/1993 | Parish et al. ........................ | 395/310 N |
| 5,222,237 | 6/1993 | Hillis ....................................... | 395/650 |
| 5,280,474 | 1/1994 | Nickolls et al. ......................... | 320/610 |
| 5,297,265 | 3/1994 | Frank et al. ............................. | 395/412 |
| 5,299,321 | 3/1994 | Iizuka ...................................... | 395/388 |
| 5,361,385 | 11/1994 | Bakalash ................................. | 345/124 |
| 5,381,518 | 1/1995 | Drebin et al. .......................... | 345/124 |

OTHER PUBLICATIONS

"An Introduction to Pixel–planes and other VLSI–intensive Graphic Systems" by Henry Fuchs, published in *Theoretical Foundations of Computer Graphics and CAD*, NATO ASI Series, Series F: Computer and Systems Sciences, vol. 40, pp. 675–688, Springer–Verlag, 1988. July 1987.

"Memory and Processing Architecture for 3D Voxel–Based Imagery" by Arie Kaufman and Reuven Bakalash, State Univeristy of New York at Stony Brook, IEEE Computer Graphics & Applications, pp. 10–23 Nov. 1988.

"The Connection Machine" by W. Daniel Hillis Trends in Computing, pp. 24–31. Jun. 1987.

"Divide and Conquer—Analyzing and Visualizing Large-Scale 3–D Problems" by James H. Jackson & Robert L. Utzschneider, Sun World, pp. 47–54. Apr. 1991.

"Third–generation R.I.S.C. processors" by Ray Weiss, Technical Editor, pp. 96–108, EDN. Mar. 30, 1992.

"The Conveyor—an Interconnection Device for Parallel Volumetric Transformations" by Daniel Cohen and Reuven Bakalash, Department of Computer Science, State University of New York, Stony Brook, NY, pp. 1–9. Aug., 1991.

(List continued on next page.)

*Primary Examiner*—Rudolph J. Buchel, Jr.
*Attorney, Agent, or Firm*—Hopgood, Calimafde, Kalil & Judlowe

[57] ABSTRACT

A parallel computing system useful for volume visualization, numeric, symbol, and other computing applications. The parallel computing system includes a memory storage system indexed to provide a three dimensional memory storage array, a plurality of local computing units, and a display unit. The plural computing units have the capability of accessing, in parallel and without conflict, the memory storage system. Local and global data transfer mechanisms are provided to facilitate transfer of data elements among the memory storage elements. This system can be used to generate voxel-based 3-D objects and to generate a 2-D image of any such 3-D virtual object along any viewing direction (such as by simulating parallel or perspective viewing ray processes).

34 Claims, 45 Drawing Sheets

OTHER PUBLICATIONS

"A Parametric Algorithm for Drawing Pictures of Solid Objects Composed of Quadric Surfaces" by Joshua Levin, New York University, Communications of the ACM, vol. 19, No. 10, pp. 555–563. Oct. 1976.

"A Taxonomy of Volume Visualization Algorithms" by Marc Levoy, Computer Science Department, Stanford University, Siggraph, pp. 6–12. 1992.

"The Design of the MasPar MP–1: A Cost Effective Massively Parallel Computer" by John R. Nickolls, Proceedings of the IEEE Compcon Spring 1990, IEEE, pp. 25–28. Feb. 1990.

"Software To Support Massively Parallel Computing on the MasPar MP–1" by Peter Christy, Proceedings of the IEEE Compcon Spring 1990, IEEE, pp. 29–33. Feb. 1990.

"The MasPar MP–1 Architecture" by Tom Blank, Proceedings of the IEEE Compcon Spring 1990, IEEE, pp. 20–24. Feb. 1990.

"Logic–Enhanced Memory" in *Principles of Computer Graphics*, from Foley, van Dam, pp. 893–894. 1990.

"Parallel Processing for Computer Vision and Image Understanding" by Alok Choudhary and Sanjay Ranka, IEEE, pp. 7–10. Feb. 1992.

Sales Brochure Entitled "VIC68—VMEbus Interface Controller Specification" by Cypress Semicondutor of Bloomington, Minnesota. 1991.

Software on the brink by Richard Comerford, Senior Editor, IEEE Spectrum, pp. 34–38. Sep. 1992.

Montani, et al., "Parallel rendering of volumetric data set on distributed–memory architectures", Concurrency: Practice and Experience, vol. 5(2), pp. 153–167, 1993.

Ma, et al., "Parallel Volume Visualization On Workstations", Computer & Graphics, vol. 17, No. 1, pp. 31–37, 1993.

Pfister, et al., "Real–Time Architecture for High–Resolution Volume Visualization", Department of Computer Science, 1993.

Yagel, "Volume Viewing: State of the Art Survey", Department of Computer and Information Science, Publ. in Siggraph '93 Course Notes, No. 41, 1993.

Robert S. Wolff and Larry Yaeger, Visualization of Natural Phenomena, Springer–Verlag, "Volume Visualization", Chapter 5, pp. 121–144, 1993.

Kaufman et al., "Modeling in Volume Graphics", (Department of Computer Science, in Modeling in Computer Graphics, Methods and Applications, Springer–Verlag, pp. 441–454, 1993.

Wieslaw L. Nowinski, "A SIMD Architecture for Medical Imaging", *Parallel Processing: CONPAR 92–VAPP V*, Second Joint International Conference on Vector and Parallel Processing, Lyon, France, Institute of Systems Science, National University of Singapore, pp. 169–180, 1992.

Nieh, et al., "Volume Rendering on Scalable Shared–Memory MIMD Architecture", Computer Systems Laboratory, 1992.

Bakalash, et al., "Building a Full Scale VLSI–Based System", Advances in Computer Graphics Hardware v. Rendering, Ray Tracing and Visualization Systems, pp. 109–115, 1992.

Yoo, et al., "Direct Visualization of Volume Date", Comp. Graph. Appl. (USA), vol. 12, No. 4, pp. 63–71, 1992.

Bakalash, et al., Cube–3: Building a Full Scale VLSI–Based Volume Visualization System, Dept. of Computer Science, pp. 109–115, 1992.

Lorensen, et al., "Volume Modeling", GE Corporate Research and Development, New York, pp. 1–11; Siggraph Course Notes, vol. 8 pp. 46–56, 1992.

Leung, et al., "G2: The design and realization of an accelerator for volume visualization", SPIE, vol. 1808, Visualization in Biomedical computing, published by Int. Soc. for Optical Engineering, Bellingham, VA, USA, pp. 384–395, 1991.

Jackson, "The Data Transport Computer: A 3–Dimensional Massively Parallel SIMD Computer", Spring '91 Digest of of Paper, pp. 264–269, 1991.

Neumann, et al., "Achieving Direct Volume Visualization with Interactive Semantic Region Selection", Dept. of Computer Science and Dept. of Radiation Oncology, University of North Carolina, pp. 1–9, 1990.

Liow, et al., "Three–dimensional data visualization using DSP meshes", SPIE vol. 1259, Extracting meaning from Complex Data: Processing, Display, Interaction, pp. 39–49, 1990.

Levoy, "Efficient Ray Tracing of Volume Data", ACM Transaction on Graphics, vol. 9, No. 3, pp. 245–261, 1990.

Kaufman, et al., "A Survey of Architectures for Volume Rendering", IEEE Engineering, Medicine and Biology, pp. 18–23, 1990.

Levoy, "Design for a Real–Time High–Quality Volume Rendering Workstation", CH Volume Visualization Workshop, pp. 85–90, 1989.

Stytz, et al., "Computer Systems For Three–Dimensional Medical Imaging", 1989.

Kaufman, "Workstation for 3–D Volume Visualization", Electronic Imaging '88: International Electronic Imaging Exposition and Conference, Advance Printing of Paper Summaries 1988, pp. 1096–1100, 1988.

Kaufman, "The Cube Workstation—1 3–D voxel–based graphics environment", The Visual Computer 4: pp. 210–221, 1988.

Bakalash, et al., "A Barrel Shift Microsystem for Parallel Processing" Department of Computer Science, State University of New York, Stony Brook, NY, Micro 23, Orlando, FL, Dec. 1990.

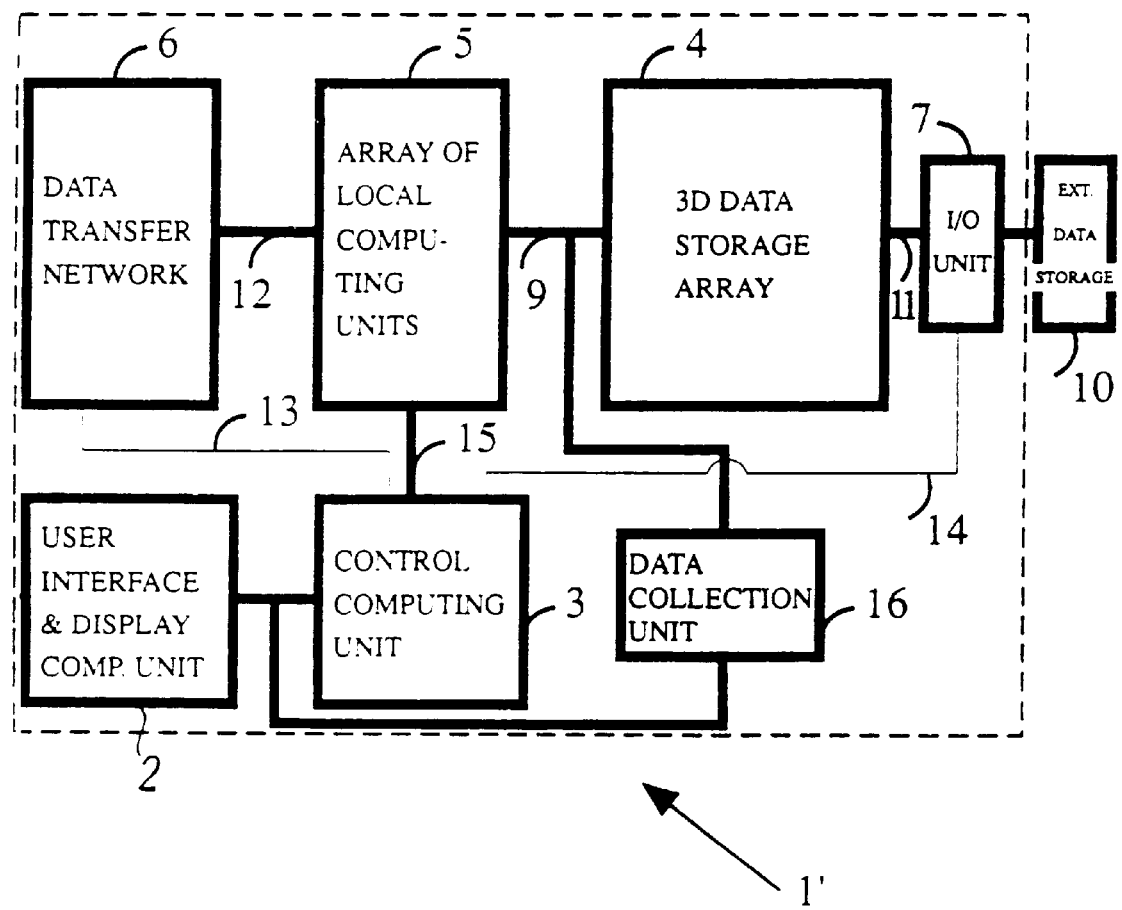
FIG. IB

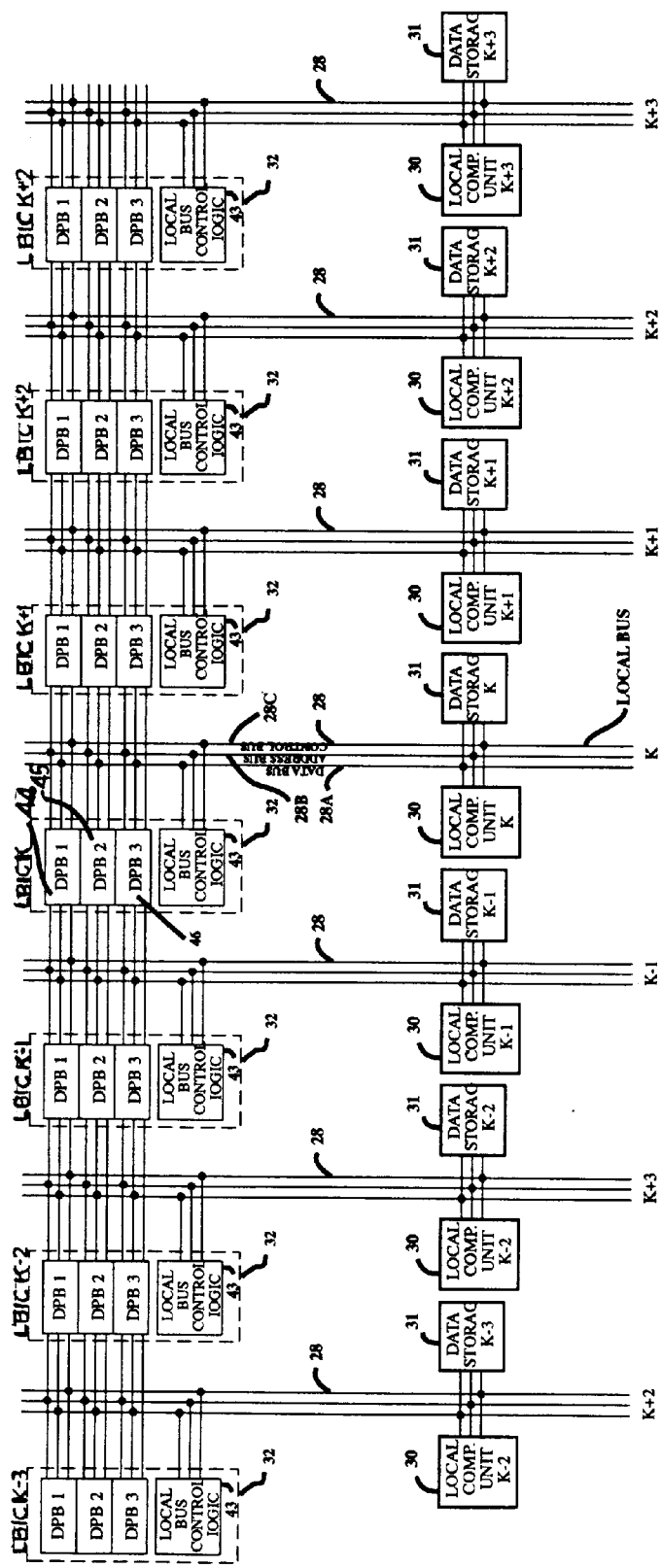
FIG.4D(1)

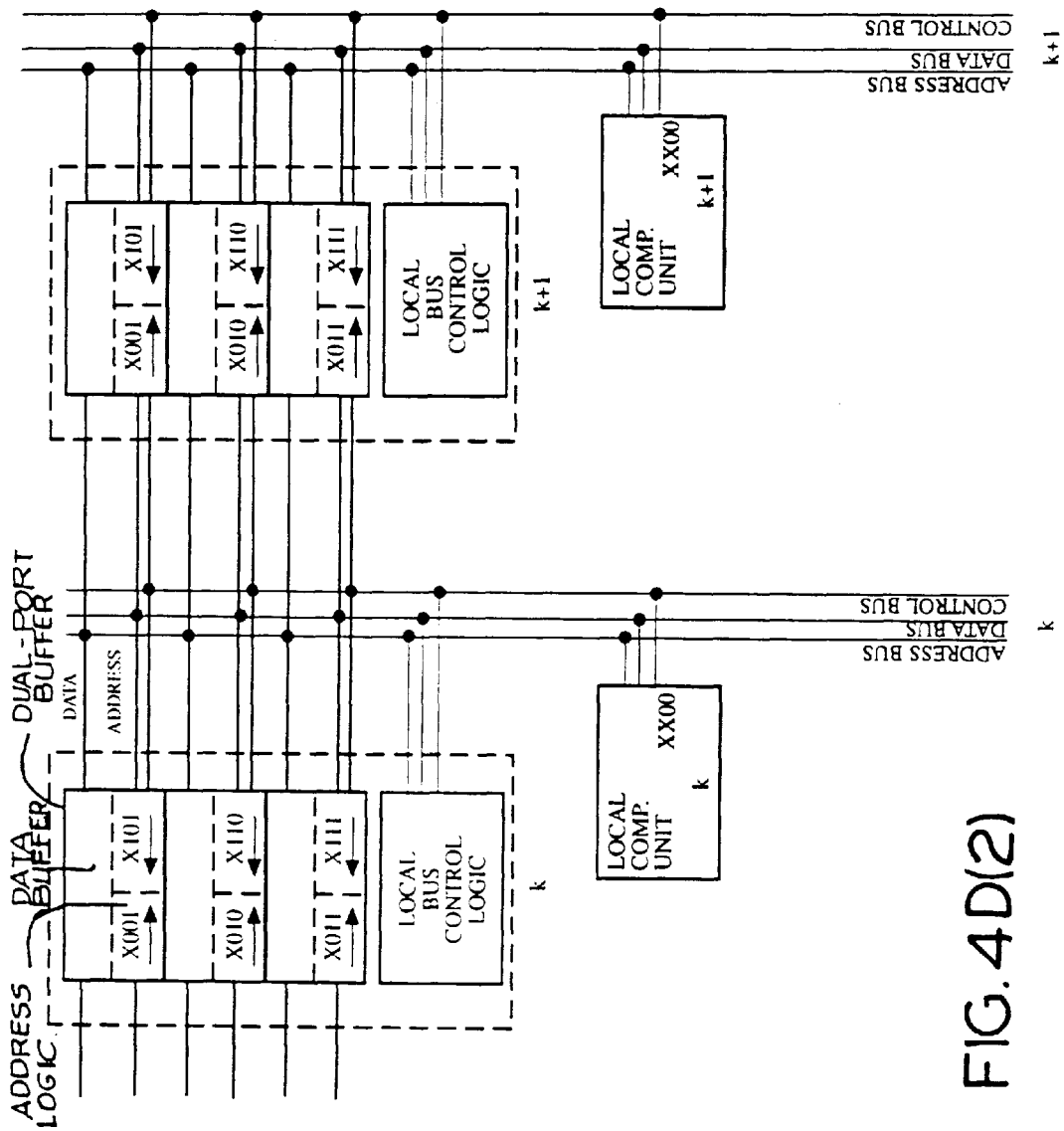
FIG. 4D(2)

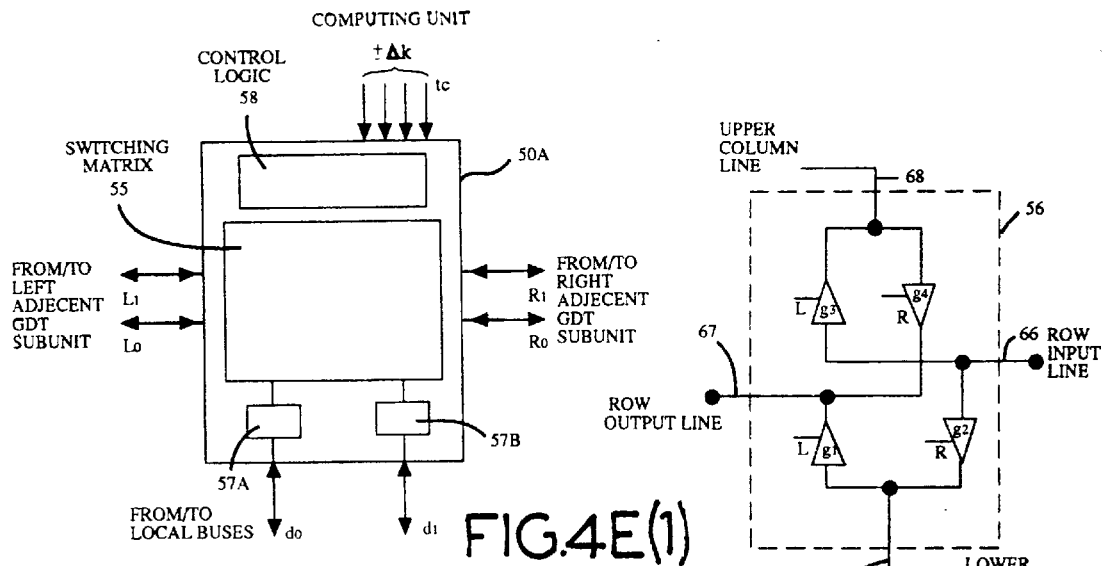
FIG.4E(1)
FIG.4E(3)
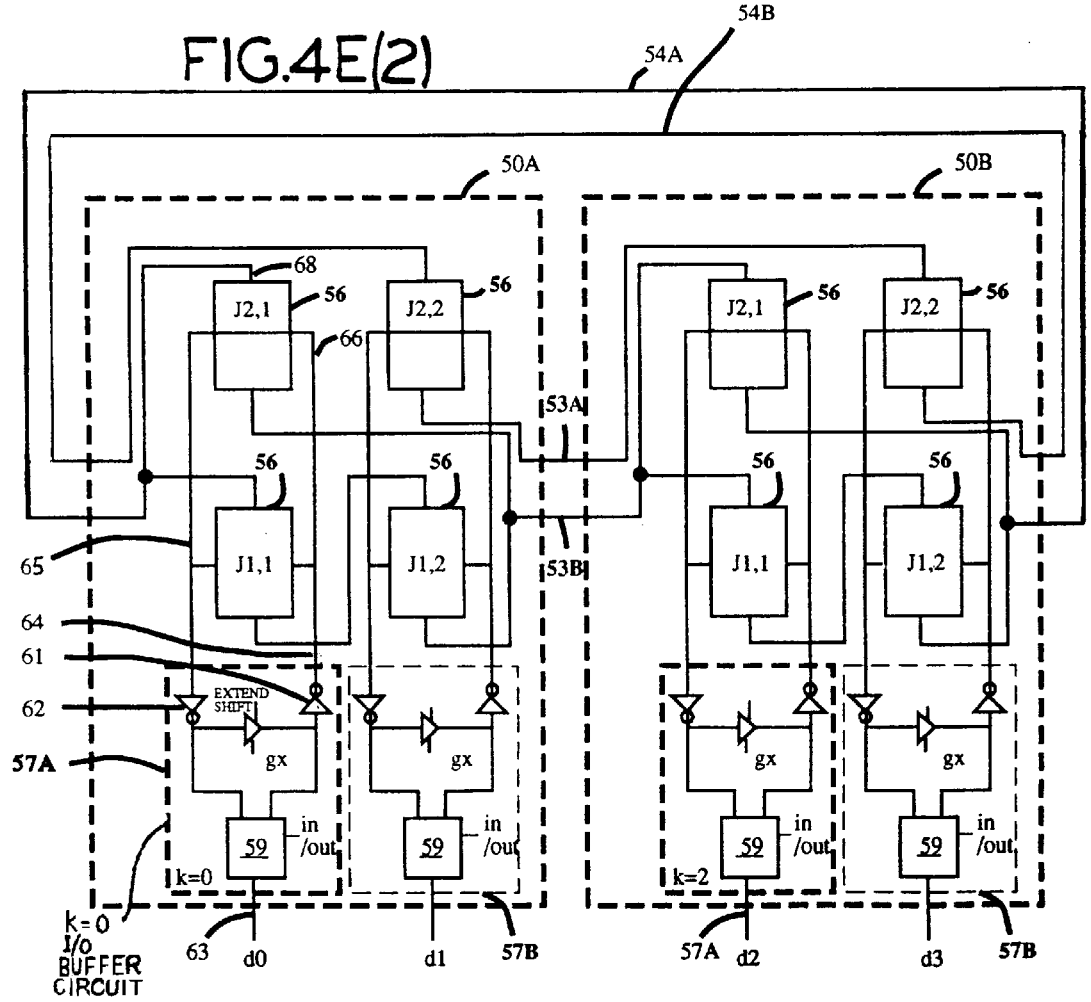
FIG.4E(2)

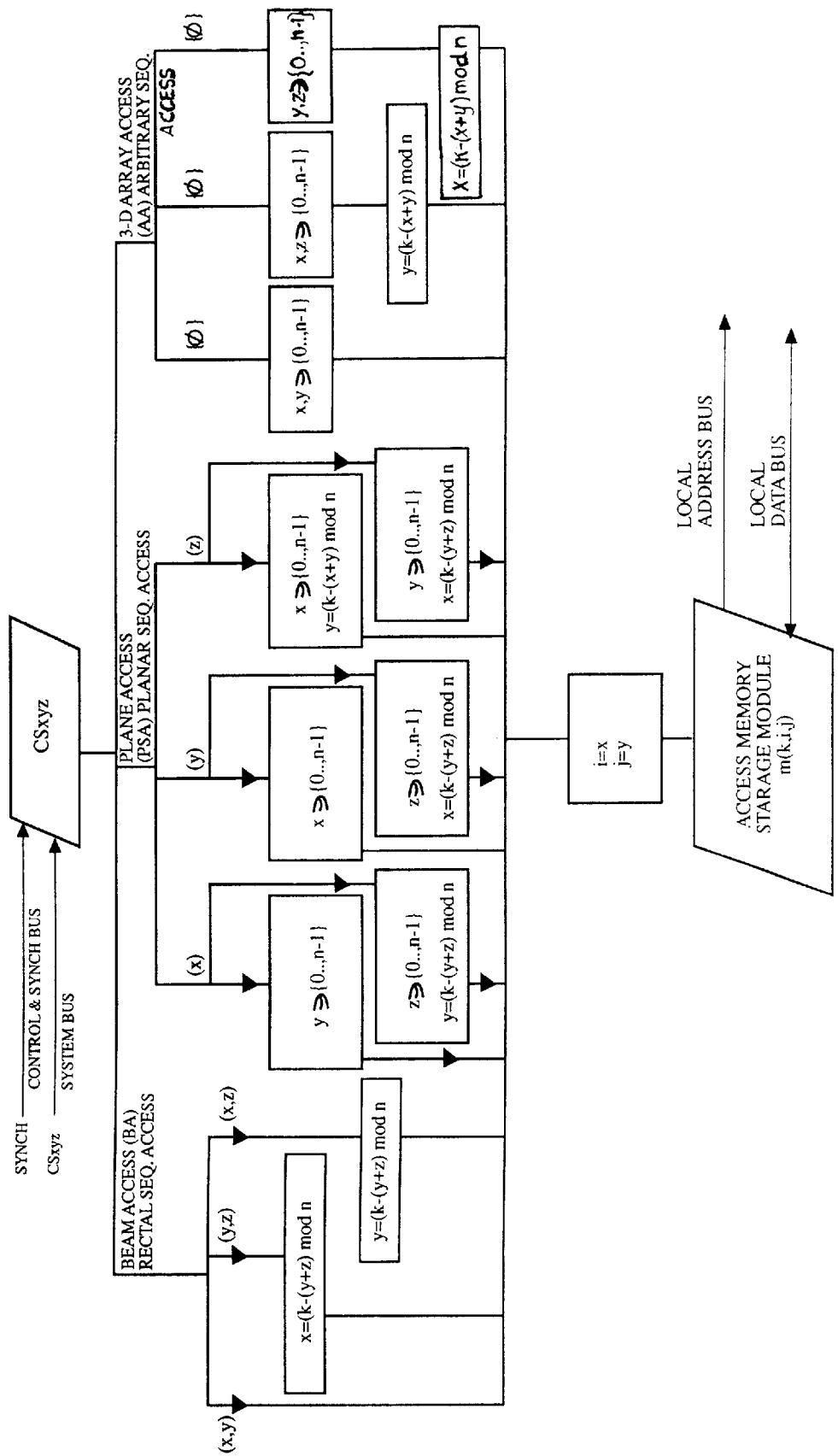

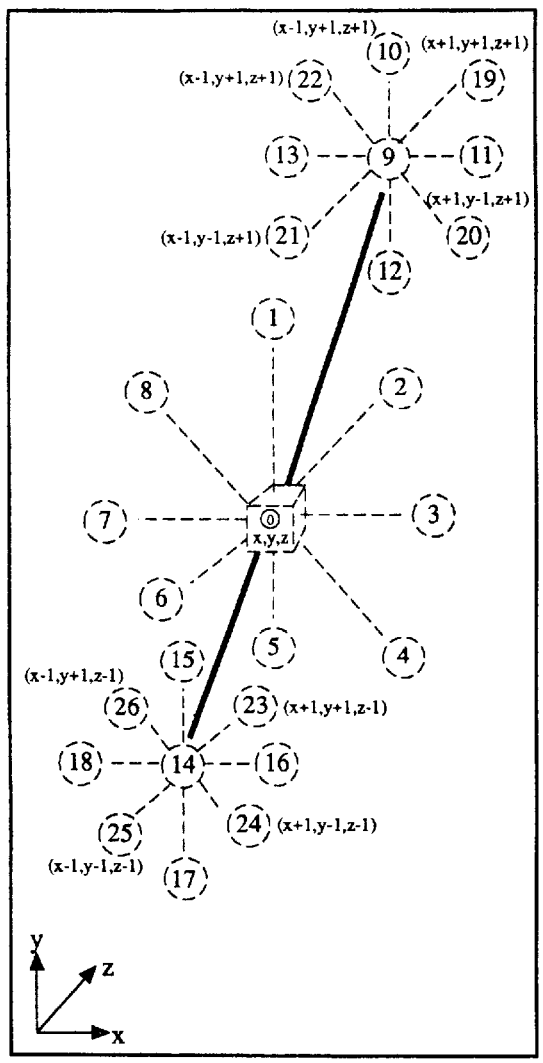
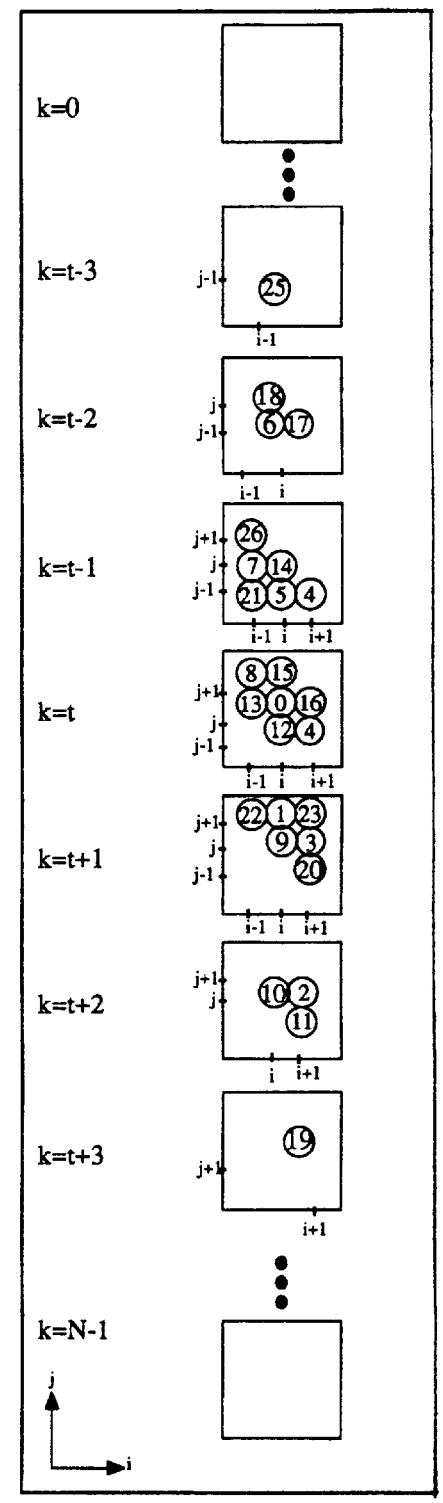
FIG. 7C 1.1 CONE

PARAMETERS (DIMENSIONS, ORIENTATION, LOCATION, COLOR)
   BOOLEAN Op - OR 1.2 BOUNDING PLANE

PARAMETERS (ORIENTATION, LOCATION)
   BOUNDED SIDE 1.3 BOUNDING PLANE

PARAMETERS (ORIENTATION, LOCATION)
   BOUNDED SIDE 2.1 CYLINDER

PARAMETERS
   BOOLEAN Op-OR 2.2 BOUNDING PLANE

PARAMETERS
   BOUNDED SIDE 2.3 BOUNDING PLANE

PARAMETERS
   BOUNDED SIDE 3.1 SPHERE
   PARAMETERS
   BOOLEAN Op-OR

FIG.10C

| SOLID PRIMITIVE DATA SET | QUADRIC SURFACE | NONZERO QUADRIC COEF. | ATTRIBUTE (COLOR) | QUADRIC INEQUALITY $E(V_m)$ | $OP_{post\,AC}$ BOOL.OP. WITHIN SOLID PRIMITIVE | $OP_{post\,AC}$ BOOL.OP. WITH STORAGE |
|---|---|---|---|---|---|---|
| $P_A$ | CONE (S0) | A,B,C | | $v_0 < 0$ | $(S_0 - S_1) - S_2$ | OR |
| | PLANE (S1) | G,H,I,J | BLUE | $v_1 > 0$ | | |
| | PLANE (S2) | G,H,I,J | | $v_2 < 0$ | | |
| $P_B$ | CYLINDER (S0) | A,B,J | | $v_0 < 0$ | $(S_0 - S_1) - S_2$ | OR |
| | PLANE (S1) | G,H,I,J | BLUE | $v_1 < 0$ | | |
| | PLANE (S2) | G,H,I,J | | $v_2 > 0$ | | |
| $P_C$ | SPHERE (S0) | A,B,C,J | RED | $v_0 < 0$ | NONE | OR |

FIG.10D

| VIEWING ANGLES | | VIEWING ZONE NUMBER | CARTESIAN AXES TRANSFORMATION | | | ZONE VIEWING ANGLES | |
| --- | --- | --- | --- | --- | --- | --- | --- |
| a | b | | U | V | W | $\alpha$ | $\beta$ |
| $315° < a \leq 45°$ | $-45° < b \leq 45°$ | 1 | z | y | -x | -a | -b |
| $45 < a \leq 135°$ | $-45° < b \leq 45°$ | 2 | -x | y | z | 90-a | -b |
| $135° < a \leq 225°$ | $-45° < b \leq 45°$ | 3 | -z | y | x | 180-a | -b |
| $225° < a \leq 315°$ | $-45° < b \leq 45°$ | 4 | x | y | z | 270-a | -b |
| $315° \leq a \leq 45°$ | $45° < b \leq 90°$ | 5 | z | -x | -y | -a | 45-b |
| $225° \leq a \leq 315°$ | $-90° \leq b \leq -45°$ | 6 | x | -z | y | 270-a | 45-b |

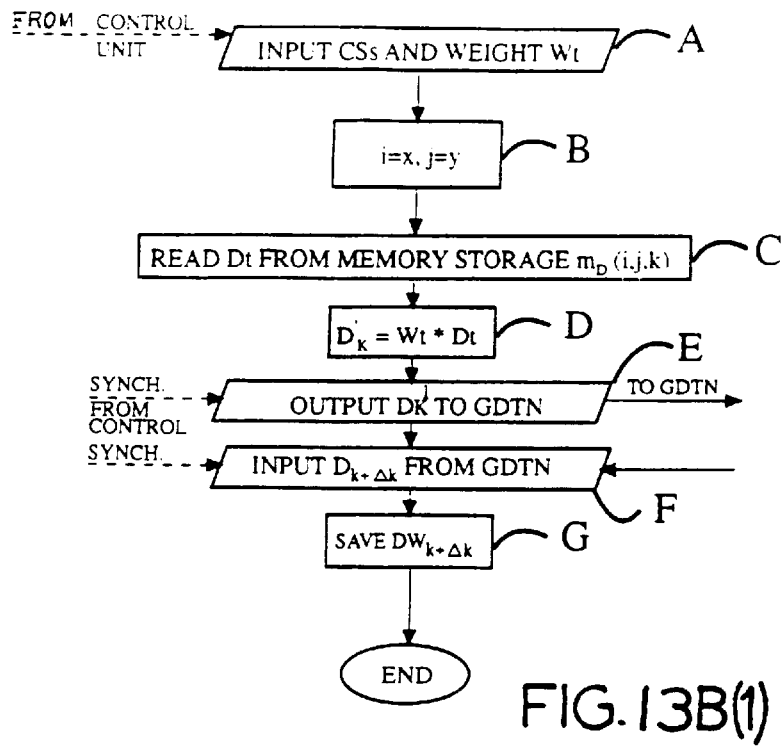
FIG. 13B(1)
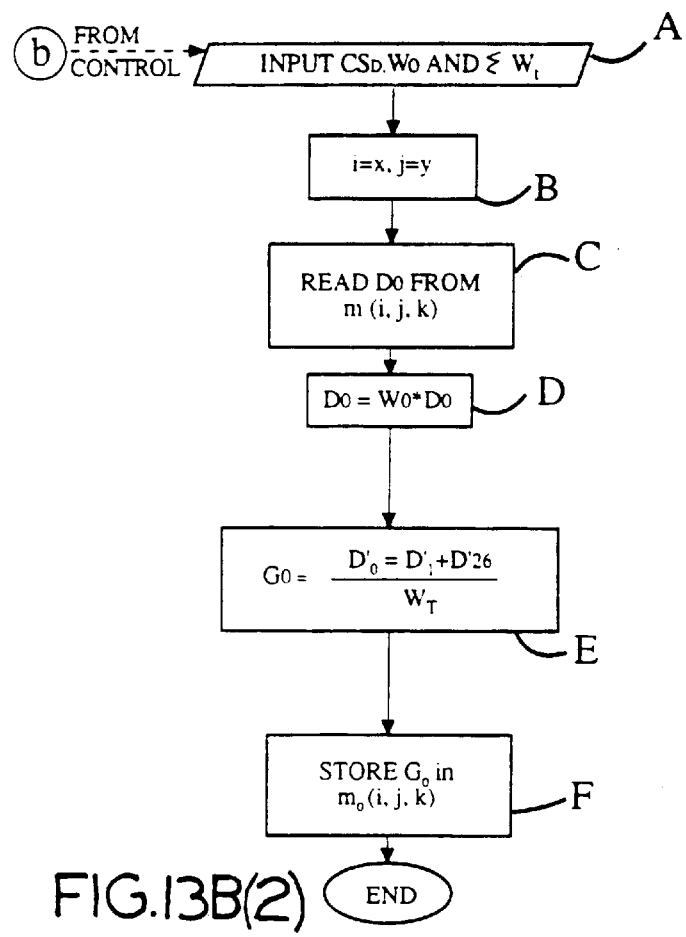
FIG. 13B(2)

PARALLEL COMPUTING SYSTEM FOR MODELING AND DATA PROCESSING

This application is a continuation of application Ser. No. 329,483, filed Oct. 26, 1994, now abandoned, which is a continuation of application Ser. No. 936,178, filed Aug. 26, 1992, now U.S. Pat. No. 5,361,385.

BACKGROUND OF INVENTION

1. Field of Invention

The present invention relates to an advanced method and apparatus for parallel computing which is versatile and suitable for use in computationally demanding applications, including real-time visualization of volumetric data.

2. Brief Description of the Prior Art

In the contemporary period, most digital computers are similar in that they have (i) a central processing unit for performing computational tasks such as addition, multiplication, loading registers and comparisons, and also (ii) a memory storage medium for storing data. In order to solve a particular problem by computing, human programmers first reduce the problem to a series of computational tasks, and then divide each computational task into a sequence of steps or instructions to provide a program. The central processing unit then executes the sequence of instructions one step at a time upon a data set in order to compute a solution to the formulated problem. For each computation to be performed, the appropriate data set must be retrieved from the memory and brought to the central processing unit where there it is operated upon in accordance with the program before being returned to memory. This type of computing machine design is called sequential or serial because the processing operations are performed one at a time, in a sequence or series.

One major drawback of serial computing machines is that while the central processor is kept active, most of the memory is idle during processing operations. Another major drawback is that serial computing machines are inherently slow, since during each phase of a computation, many of the components of the processor are idle.

Hitherto, the development of interleaved memory, pipelining, vector processing and very long word (VLIW) machinery has helped to increase the speed and efficiency of single processor serial computers. However, there are numerous applications in which even very fast serial computers are simply inadequate. For example, presently there are a large number of problems requiring the performance of hundreds of millions of computations per second. Such problems include, for example, simulation of atomic or particle interaction in the fields of computational physics and chemistry; simulation of gravitational interplay among celestial objects in the field of computational cosmology; simulation of biological cell processes in the field of computational biology; climate modeling and forecasting in the field of computational meteorology; air-traffic control; flight simulation; and knowledge-base searching in artificial intelligence (AI) systems. Commercially available serial computing machines have been simply too slow for such computationally demanding applications.

One solution to the problem posed by serial computing machines has been to use a parallel processing design in which many small processors are linked together to work simultaneously so that both memory capacity and processing capacity can be utilized with high efficiency. To date, a number of parallel computing machines have been constructed. In general, the character and performance of such computing machines are determined by three factors: (i) the nature, size and number of the processing elements; (ii) the nature, size and number of the memory nodes; and (iii) the strategy of interconnecting the processors and the memories.

One type of parallel computing machine in commercial use is known as a Single-Instruction-Stream-Multiple-Data-Stream (SIMD) machine. In general, a SIMD computing machine has a single control unit that broadcasts one instruction at a time to all of the processors which execute the instructions on multiple data sets simultaneously. On the basis of the performance factors set forth above, commercially available SIMD computing machines can be grouped into two distinct classes.

The first class of SIMD computing machine includes numeric supercomputers and other parallel computing machines that operate on vectors by performing the same operation on each vector element. In general, each processor in this class of SIMD computing machinery is a vector processor consisting of an array of arithmetic logic units (ALU's) particularly adapted for processing vector formatted data. Each vector processor is provided access to a common memory, and there is no interprocessor connections or other provision for the parallel vector processors to share information among themselves. A typical program run on this class of SIMD computing machine includes many statements of the form: for i=1 to n, do a[i]=b[i]+c[i] where a, b and c are vectors. In essence, this class of SIMD machine receives two n-element vectors b[i] and c[i] as input, and operates on corresponding elements in parallel using the vector ALU's to provide an n-element vector a[i] as output. The Cray-1 Supercomputer from the Cray Computer Corporation, is representative of this first class of SIMD computing machine.

The second class of SIMD computing machine includes parallel-type computing machines which facilitate coordinated communication among the parallel processors. In general, each processor in this second class of SIMD computing machines is a simple ALU which is provided access to a local memory which it controls. Each ALU can communicate with other ALU's through a communication network having either a fixed or programmable topology. In the Connection Machine computer from the Thinking Machines Corporation, 65,536 1-bit ALU's are configured as parallel processors and an interprocessor communication network having the topology of a n-cube or hypercube is provided for the transfer of data among these parallel processors. As in other SIMD computing machines, a single control unit broadcasts instructions to the 65,536 independent ALU processors. Although the ALU processors are individually small and slow, the total computation and input/output throughput of the Connection Machine computer is quite substantial because of the assembled power of its processing units and interprocessor communication system. Notably, as the Connection Machine computer has no program storage of its own, the instructions of the program must be downloaded while the program is running. Consequently, a high bandwidth is required between the host system and the Connection Machine computer, resulting in relatively long cycle times.

While the Connection Machine and Cray-1 parallel computer systems each perform well in a number of advanced parallel computing applications, they both are poorly suited for volume visualization applications. Consequently, a variety of special purpose computing machines exploiting parallelism have been built in order to perform volume visualization tasks quickly. A number of prior art 3-D graphics-display and voxel-based computer graphic systems are described in detail in Applicant's U.S. Letters Pat. No. 4,985,856 which is incorporated herein by reference.

While many existing voxel-based systems employ parallel data transfer and processing mechanisms dedicated specifically to volume projection and rendering tasks, such capabilities are neither available for scan-conversion of geometrically represented objects nor processing of voxel-based objects without transferring data out of the 3-D memory storage device. Moreover, modification of a 3-D voxel-based object in prior art systems requires discarding the voxel-based object, creating a new geometrically represented object with desired modifications, and then scan-converting (i.e. voxelizing) the modified geometric object. This process results in great computational time and expense. Additionally, while these prior art voxel-based systems permit volume visualization of 3-D objects, only a limited number of directions are provided along which to visualize volumetrically represented data, without irreversibly modifying original voxel data.

Thus, there is a great need in the parallel computing art to provide a versatile method and apparatus for parallel computing which permits high levels of computational performance in numeric, symbolic and volume visualization applications in diverse fields of science, art and commerce.

OBJECTS AND SUMMARY OF THE INVENTION

Accordingly, it is a primary object of the present invention to provide a method and apparatus for parallel computing, in which a sequence of data elements represented in three-dimensional (3-D) Cartesian Space can be accessed and processed in a parallel manner by an array of local computing units which are coordinated by a control computing unit that specifies the accessed sequence of data elements using a selected set of Cartesian coordinates.

A further object of the present invention is to provide such a method and apparatus in which each local computing unit executes a local routine in its program memory, in a manner coordinated by the control computing unit simultaneously executing a control routine in its program memory, in response to a user interface/display routine running on an operably associated user interface and display computing unit.

A further object of the present invention is to provide such apparatus in the form of a reconfigurable parallel computing machine having memory storage elements indexed so as to represent a three-dimensional array of $N^3$ memory storage elements arranged in 3-D Cartesian Space having three orthographic coordinate axes, and in which the control computing unit selectively coordinates the plurality of local computing units to access in parallel a Cartesian specified sequence of memory storage elements within the three-dimensional array, such that each memory storage element is always accessed by a different local computing unit for conflict-free memory storage access.

A further object of the present invention is to provide such a parallel computing machine, in which the control computing unit coordinates the local computing units to access in parallel, a rectilinear sequence of N memory storage elements parallel to any one of the orthographic coordinate axes, such that each memory storage element is accessed by a different local computing unit for conflict-free memory storage access.

A further object of the present invention is to provide such a parallel computing system, in which the control computing unit coordinates the local computing units to access in parallel a sequence of N memory storage elements resididng within a Cartesian specified plane parallel to any one of the principal planes in 3-D Cartesian space, such that each memory storage element is accessed by a different local computing unit for conflict-free memory storage access.

A further object of the present invention is to provide such a parallel computing machine, in which the control computing unit coordinates the local computing unit to access in parallel, a sequence of N memory storage elements extending through the 3-D memory storage array, such that each memory storage element is accessed by a different local computing unit for conflict-free memory storage access.

A further object of the present invention is to provide such a parallel computing machine, in which an external parallel data input/output unit is provided for loading and unloading of sequences of data elements under the control of the control computing unit.

A further object of the present invention is to provide such a parallel computing machine, in which the plurality of memory storage elements are physically arranged into N memory storage modules indexed by k=0,1,2, . . . N-1 where each memory storage module contains $N^2$ memory storage elements each indexed by physical memory address indices i and j.

A further object of the present invention is to provide such a parallel computing machine, in which the array of local computing units are indexed by indices k=0,1,2, . . . N-1, where each k-th memory storage module is independently accessible by the k-th local computing unit by way of a k-th local bus.

An even further object of the present invention is to provide such a parallel computing machine with a global data transfer network, in which the control computing unit receives user provided Cartesian parameters which, in turn, are provided to the local computing units to create in a parallel fashion, a voxel based image of a specified 3-D geometric object which is then stored within the 3-D memory storage array.

It is a further object of the present invention to provide such a parallel computing machine, in which 3-D voxel-based objects represented in discrete 3-D Cartesian Space can be viewed from any arbitrary viewing direction using either parallel or perspective visualization processes simulated within the parallel computing system.

It is a further object of the present invention to provide such a parallel computing machine, in which 3-D voxel based lines, surfaces and solids can be internally generated in discrete 3-D Cartesian space and thereafter viewed from any arbitrary viewing direction using either parallel or perspective visualization process simulated within the parallel computing system.

It is a further object of the present invention to provide such a parallel computing machine, in which 3-D voxel-based objects represented in discrete 3-D Cartesian Space can be processed in situ by a variety of processing operations.

Yet an even further object of the present invention is to provide such a parallel computing machine, in which various physical or virtual processes can be simulated and viewed from any arbitrary viewing direction in 3-D Cartesian Space.

It is a further object of the present invention to provide such a parallel computing machine which is particularly suited for generating and representing within the 3-D memory storage array, 3-D voxel-based images of geometric objects. Particularly, such geometric objects are specified in the user interface/display computing unit using conventional 3-D geometric specifications, are subsequently converted into implicit representations, and are then provided to the control computing unit. In turn, these implicit representations are used to create, in a parallel fashion, within the 3-D memory storage array, voxel based images of the specified geometric objects.

An even further object of the present invention is to provide such a parallel computing machine, in which a global data transfer network is provided so that each data element on the k-th local data bus is simultaneously transferred to the (k+▲k)th node data bus, where ▲k represents the module distance that each data element is transferred during a global data transfer cycle.

An even further object of the present invention is to provide such a parallel computing machine with a local data transfer network, in which each k-th local computing unit can transfer data elements to the (k±1)th, (k±2) or (k±3)th local computing units under the control of its own local routine.

Yet an even further object of the present invention is to provide such a parallel computing machine which can coordinate the operation of the local computing units in the local data transfer network so as to achieve high speed data communication between any pair of local computing units.

It is an even further object of the present invention to provide such a parallel computing machine, in which medical data collected from a medical scanner can be loaded into the 3-D memory storage array through the parallel data input/output unit under the control of the control computing unit, processed in a variety of ways, and thereafter viewed from an arbitrary viewing direction using either perspective or parallel visualization processes.

It is further an object of the present invention to provide such a general purpose parallel computing machine which can be easily programmed for use in scientific business, financial, industrial and recreational applications while achieving high levels of computational performance and speed.

A further object of the present invention is to provide a method for reconfiguring a parallel computing machine having memory storage elements indexed so as to represent a 3-D memory storage array of $N^3$ memory storage elements arranged in 3-D Cartesian Space characterized by three orthographic coordinate axes, and in which the control computing unit selectively coordinates the plurality of local computing units to access in parallel a Cartesian specified sequence of memory storage elements within the 3-D memory storage array, such that each memory storage element is always accessed by a different local computing unit for conflict-free memory storage access.

A further object of the present invention is to provide a method of accessing, in parallel, a rectilinear sequence of N memory storage elements residing along a beam parallel to any one of the orthographic coordinate axes, such that each memory storage element is accessed by a different local computing unit for conflict-free memory storage access.

A further object of the present invention is to provide a method of accessing, in parallel, a sequence of N memory storage elements residing within a Cartesian specified plane parallel to any one of the principal planes in 3-D Cartesian Space, such that each memory storage element is accessed by a different local computing unit for conflict-free memory storage access.

A further object of the present invention is to provide a method of accessing, in parallel, a sequence of N memory storage elements extending through the 3-D memory storage array, such that each memory storage element is accessed by a different local computing unit for conflict-free memory storage access.

A further object of the present invention is to provide a method for loading into and unloading from a parallel computing machine, sequences of data elements.

A further object of the present invention is to provide a method of accessing, in parallel, N memory storage elements in a plurality of memory storage elements physically arranged into N memory storage modules indexed by k=0, 1,2, . . . N-1, where each memory storage module contains $N^2$ memory storage elements each indexed by physical memory address indices i and j.

It is a further object of the present invention to provide a method of generating 3-D voxel-based images represented in discrete 3-D Cartesian Space which can be viewed from any arbitrary viewing direction by simulating either parallel or perspective visualization processes.

It is a further object of the present invention to provide a method of generating within the memory of a parallel computing system, 3-D voxel-based lines, surfaces and solids in discrete 3-D Cartesian Space.

It is a further object of the present invention to provide a method of processing, in situ, 3-D voxel-based objects represented in discrete 3-D Cartesian Space.

Yet an even further object of the present invention is to provide a method of simulating within a parallel computing machine, various physical or virtual processes which can be viewed, in real-time, from any arbitrary viewing direction in 3-D Cartesian Space.

It is a further object of the present invention to provide a method of generating and storing within a 3-D memory storage array, voxel-based images of 3-D geometric objects. Particularly, the method involves specifying the 3-D geometric objects in the user interface/display computing unit using conventional 3-D geometric specifications, subsequently converting the geometric specifications into implicit representations, and then providing these implicit representations to a control computing unit which broadcasts these inplicit representations to an array of local computing units in order to create, within the 3-D memory storage array, in a parallel fashion, voxel-based images of the specified geometric objects.

These and other objects of the present invention will become apparent hereinafter.

BRIEF DESCRIPTION OF THE DRAWINGS

For a fuller understanding of the objects of the present invention, the Detailed Description of the Illustrative Embodiments is to be taken in connection with the following drawings, in which:

FIG. 1B is a high-level block diagram of the second embodiment of the parallel computing system of the present invention, shown interfaced with an external data storage system;

FIG. 4D(1) is a schematic diagram illustrating the components comprising the local data communication data network of the Illustrative Embodiment which is capable of achieving data transfer among 26-connected neighboring memory storage elements of the parallel computing system of the present invention;

FIG. 4D(2) is a schematic diagram illustrating the interface between an adjacent pair of local buses and local computing units associated thereto, by way of the local bus interface controllers;

FIG. 4E(1) is a schematic diagram of the global data transfer subunit used for transferring each bit of a data element within the global data transfer mechanism of the present invention;

FIG. 4E(2) is a schematic diagram of the global data transfer mechanism employed in the parallel computing system of the Illustrative Embodiment the present invention;

FIG. 4E(3) is a schematic diagram of the switching element utilized within each global data transfer subunit shown in FIG. 4E(2);

FIG. 6A through 6C are flow charts of computer routines executed by the user interface and display computing unit, the control computing unit and the local computing units, respectively, during the various parallel data access operations illustrated in FIGS. 6D through 6J;

FIG. 6I is a schematic representation of the 4×4×4 memory storage array of FIG. 2, illustrating the access of memory storage elements residing within a plane parallel to the y-z plane of 3-D Cartesian Space C3 and the location of these accessed memory storage elements in Physical Memory Storage Space $M^3$;

FIG. 7C is a schematic representation illustrating, in both 3-D Cartesian Space $C^3$ and Physical Memory Storage Space $M^3$, the location of a group of neighboring memory storage elements arranged in a 26-connected manner about a memory storage element located at coordinates x,y,z in the 3-D memory storage array of the parallel computing system of the present invention;

FIG. 10C is a schematic representation of user input specifications for the 3-D geometric objects illustrated in the process of FIG. 10B;

FIG. 10D is a table compiling the geometrical specifications produced from the user interface/display computing unit during the voxeliization process of the present invention;

FIGS. 13B(1) and 13B(2) are a flow chart of the local computer routines executed by each local computing unit during the computer routine of FIG. 13A.

DETAILED DESCRIPTION OF THE ILLUSTRATIVE EMBODIMENTS OF THE PRESENT INVENTION

Figure 1A:
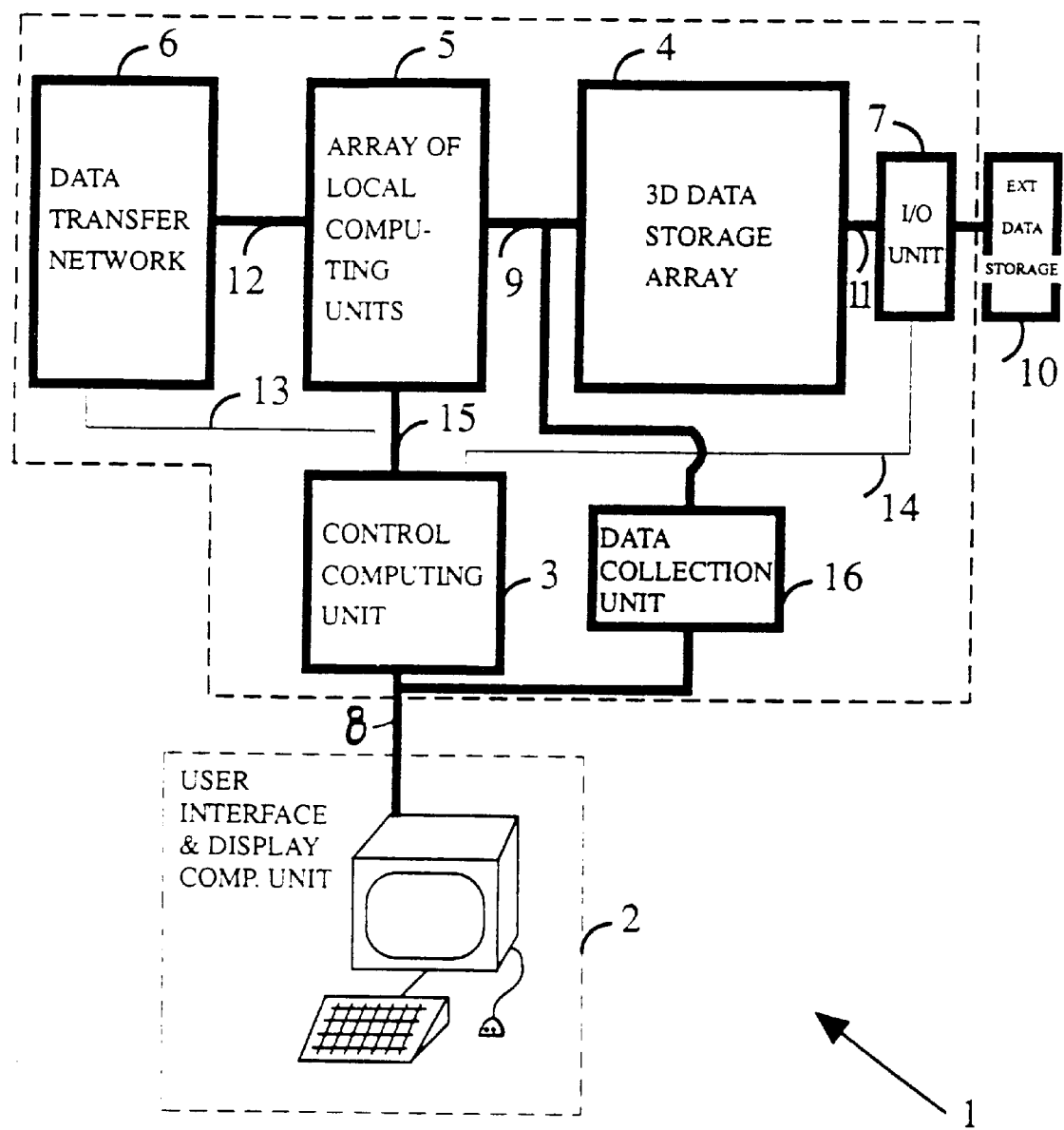
FIG. 1A is high-level block diagram of the first embodiment of the parallel computing system of the present invention, shown interfaced with a user interface and display computing unit and an external data storage system.

Referring to FIGS. 1A and 1B, the major components of the parallel computing system of the present invention are shown.

In general, parallel computing system 1 comprises user interface/display computing unit 2, control computing unit 3, 3-D memory storage array 4, array of local computing units 5, a data transfer network 6 and a data input/output unit 7, and data collection unit 16.

In the illustrative embodiment of FIG. 1A, user interface/display computing unit 2 is realized as a separate host computer system such as, for example, a computer graphics workstation having a high resolution visual display unit, processor, keyboard and other data input devices. User interface/display computing unit 2 supports a user interface programs which provide various types of data to control computing unit 3 by way of data transfer means 8. In general, memory storage array 4 comprises a plurality of memory storage elements each being capable of storing one or more data elements. These memory storage elements are indexed so that they represent a three-dimensional (3-D) array of N×N×N memory storage elements arranged within 3-D Cartesian coordinate system characterized by x,y, and z orthographic coordinate axes. Hereinafter and in the claims, this 3-D Cartesian Space shall be referred to as "$C^3$ space."

In general, array of local computing units 5 comprises N local computing units, each having means for storing one or more local computer programs, and means for locally processing data in accordance with a local computer program. In order that the array of local computing units can simultaneously access a sequence of N memory storage elements in $C^3$ space, when coordinated under the control of the control computing unit, each local computing unit is assigned to a group of $N^2$ memory storage elements in the 3-D memory storage array so that each memory storage element within the sequence of N memory storage elements is accessed by a different local computing unit. As will be described in greater detail hereinafter, this memory storage and accessing scheme provides the parallel computing system of the present invention with the ability to access, in a parallel manner, (i) any rectilinear sequence of N memory storage elements extending parallel to any of the three orthographic x,y and z axes in $C^3$ space; (ii) any sequence of N memory storage elements residing within any pane parallel to one of the principal planes in $C^3$ space; and (iii) any sequence of N memory storage elements extending through the 3-D memory storage array.

As illustrated in FIG. 1A, data transfer means 9 is provided between the array of local computing units and the 3-D memory storage array so that sequences of N accessed data elements can be transferred, in parallel, between the N groups of memory storage elements and the N local computing units. Similarly, in order that the sequence of data elements can be transferred between the 3-D memory storage array and an external data storage system 10, the parallel data I/O unit is interfaced with the 3-D memory storage array by way of data transfer means 11.

In order that the data elements can be transferred among the N different groups of $N^2$ memory storage elements, data transfer network 6 is operably associated with the N local computing units by way of data transfer means 12. As shown, the control computing unit provides control data to the data transfer network over control data transfer means 13, and to the data input/output unit 10 over control data transfer means 14. In addition, the control computing unit provides local computer programs, control data and synchronization signals to each of the N local computing units over data transfer means 15.

Figure 4:
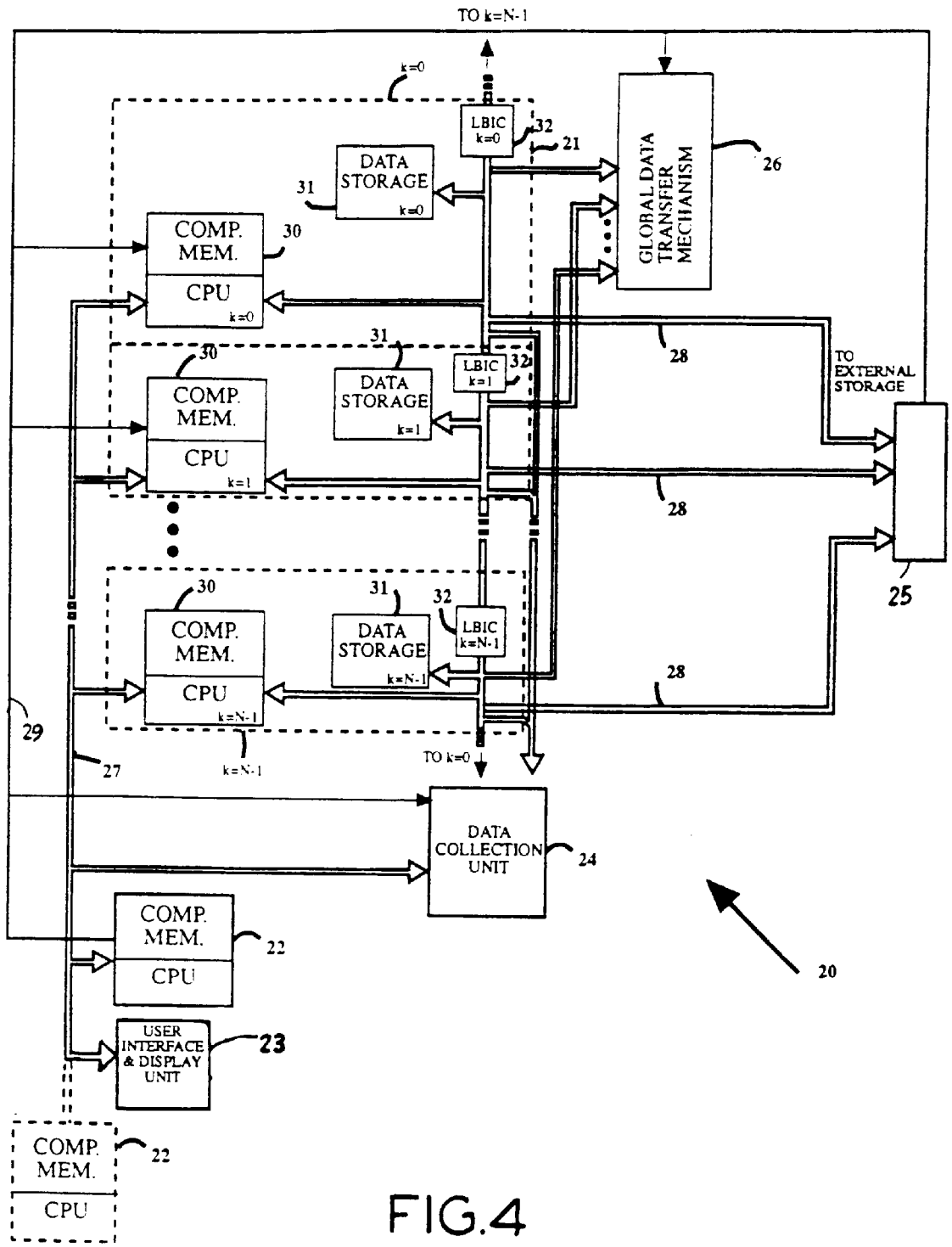
FIG. 4 is a schematic diagram of the parallel computing system of the illustrative embodiment of the present invention, showing the user interface and display computing unit, the control computing unit, the system bus, the control and synchronizing bus, the local data buses, the parallel data input/output unit, the data collection unit and N modules each including a local computing unit, a local memory storage module and a local bus interface controller.

Alternatively, the parallel computing system of the present invention may be configured in a manner different from the system architecture shown in FIG. 1A. For example, in system 1 and illustrated in FIG. 1B, user interface/display computing unit 2 is shown formed as an integral part of the parallel computing system, rather than as a separate host computing system interfaced with the control computing unit, as shown in FIG. 1A. In this alternative embodiment, the user interface/display computing unit and the control computing unit can both be realized using a single sequential computing system running both user interface/display computer programs and control computer programs. This feature will be discussed in greater detail hereinafter when describing the illustrative embodiment of the present invention as shown in FIG. 4.

In order to fully understand how parallel data accessing is achieved in the parallel computing system of the present invention, it will be helpful to describe in greater detail the structure and function of the memory storage, accessing and transfer scheme of the present invention. This is best achieved by reference to the schematic representation of the parallel computing system shown in FIG. 2.

In the illustrative embodiment, the position of each memory storage element in (x, y, z) in $C^3$ space is specified by user interface/display computing unit 2. The $N^3$ memory storage elements in 3-D memory storage array are grouped into N local memory modules indexed k=0, 2, 3, N−1. Each N memory module contains $N^2$ memory storage elements or cells, which can store one or more data elements of a selected word length (e.g. 32 bits or more). The m(x, y z) location of each memory storage element in physical memory is specified by physical address indices i and j. Together, these indices i, j and k specify the physical address location in physical memory space, which hereinafter shall be referred to as "$M^3$ space". Thus, each memory storage element m(x,y,z) in $C^3$ space uniquely represents one physical memory storage element m(i,j,k) in $M^3$ space. In order to provide conflict-free access to a sequence of N memory storage elements {m(x,y,z)} in $C^3$ space, the memory storage and accessing system of the present invention employs a linear "periodic" skewing function which maps each memory storage element m(x,y,z) in $C^3$ space, into a physical memory storage element m(i, j, k) in $M^3$ space. According to the linear skewing function, the Cartesian coordinates x, y, z are mapped into physical address indices, as follows:

$$i=x,\ j=y$$

$$A=(x+y+z) \bmod N$$

$$0 \leq x,\ y,\ z;\ K=N-1 \quad (1)$$

Thus, each memory storage module is specified by index k and each memory storage element within the memory module is specified by physical address indices (i, j). The following deskewing functions can be applied in order to map the physical address indices of memory storage element m(i,j,k) $M^3$ space into the corresponding coordinates of memory storage element m(x,y,z) in $C^3$ space:

$$x=(k-(y+z)) \bmod N$$

$$y=(k-(z+y)) \bmod N$$

$$z=(k-(x+y)) \bmod N \quad (2)$$

Further discussion on linear skewing can be found in: "Towards a 3-D Graphics Workstation", Advances in Graphics Hardware I, Arie Kaufman, W. Strasser (Ed.), Springer-Verlag, pp. 17–26, 1987, "Voxel-Based Architectures for Three-Dimensional Graphics," Proc. IFIP '86, 10th World Computer Congress, Arie Kaufman, Dublin, Ireland, pp. 361–366, 9/86; and "Cube-An Architecture Based on a 3-D voxel map," Theoretical Foundations of Computer Graphics and CAD, Arie Kaufman and R. Bakalash. R. A. Earnshaw (Editor) Springer-Verlag, pp. 689–701, 1988.

Figure 2:
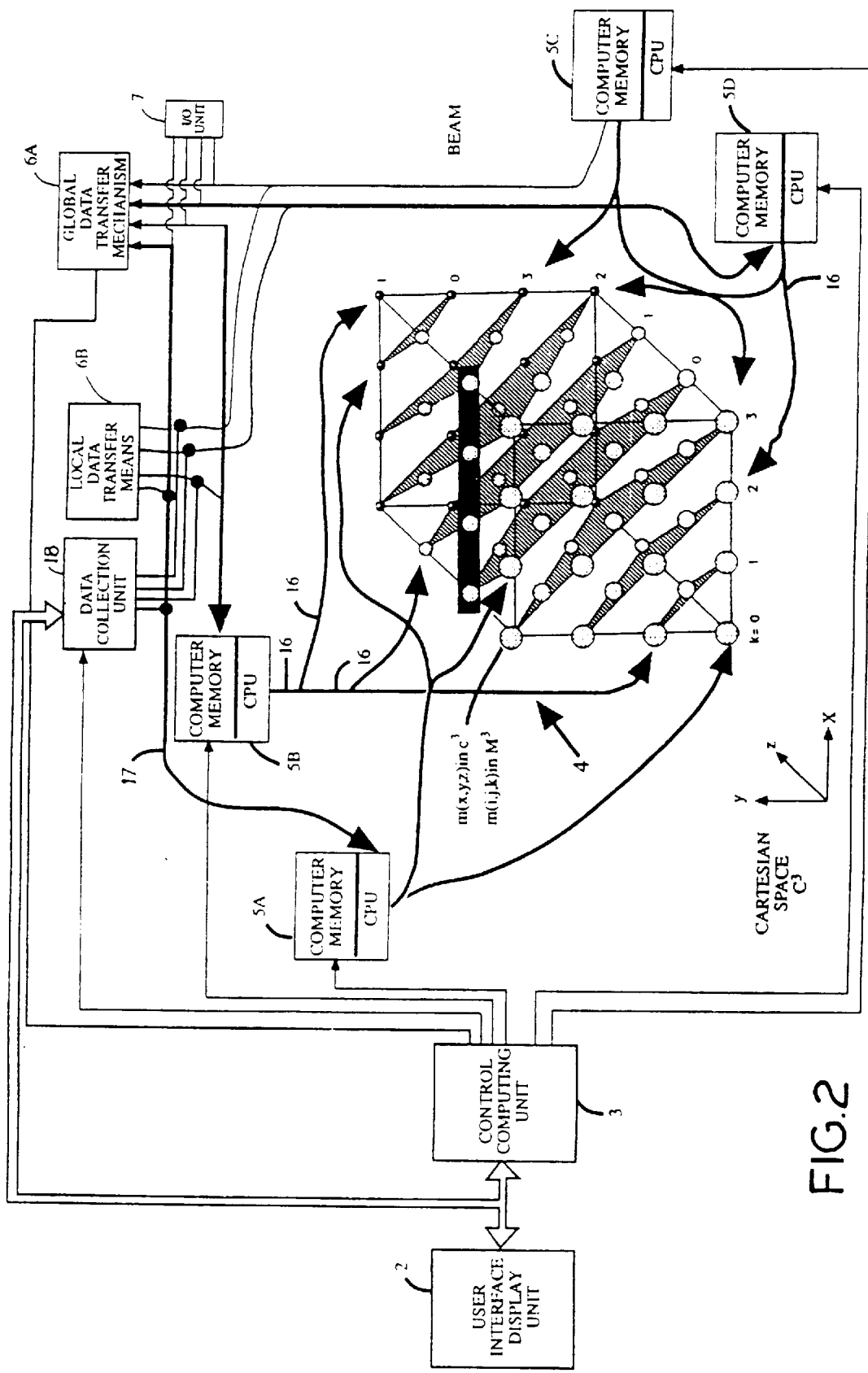
FIG. 2 is a schematic diagram of the parallel computing system of an exemplary embodiment of the present invention, showing a 3-D matrix model of a 4×4×4 storage memory array operably associated with an array of four local computing units, a control computing unit, the parallel data input/output unit, local and global data transfer circuitry, and a data collection unit.

As a result of the linear mapping scheme employed in the memory storage and accessing system of FIG. 2, the memory storage elements {m(x,y,z)} in $C^3$ space which are mapped into a single memory storage module in $M^3$ space, reside along diagonal sections having a 45 degree angle with respect to the principal axis planes of $C^3$ space. For illustrative purposes, this skewed memory organization is illustrated in the exemplary 4×4×4 memory storage array of FIG. 3, in particular, in which the diagonal sections are sequentially numbered and grouped "modulo 4." In a commercial embodiment, N will typically equal 512 or more to provide a high-resolution 3-D data storage buffer. The size of each memory storage element is not restricted by the physical address indices i, j, k. Rather, the size of each memory storage element can be much larger than the size of the data element. Thus, a record consisting of a number of data elements can be stored at a single physical memory location m(i,j,k) and be retrieved by repeatedly accessing the memory location m(i,j,k) a number of times. This feature of the present invention will be described in greater detail hereinafter.

As illustrated in the exemplary embodiment of FIG. 2, each local computing unit 5A through 5D is operably associated with $(N=4)^2$ memory storage elements contained with a local memory storage module assigned to the local computing unit. When controlled (i.e. coordinated) by control computing unit 3, the array of local computing units can simultaneously access any rectilinear sequence of memory storage elements parallel to anyone of the principal axes, without conflicts between the local computing units. As used hereinafter, the term "beam" shall mean any rectilinear sequence of memory storage elements parallel to any one of the principal axes in $C^3$ space.

When a planar sequence of beams or an entire array of beams are to be accessed (i.e. scanned) by the array of local computing units, the location of these beams are specified in $C^3$ space by the user interface/display computing device. As will be described in greater detail hereinafter, the specification of these beams is achieved using Cartesian parameters, (i.e. Cartesian coordinates) which are provided to the control computing unit. The control computing unit then transmits (i.e. broadcasts) these Cartesian coordinates to the array of local computing units. Within each local computing unit, the CPU executes a local computer routine which, when coordinated by the control computing unit, achieves parallel data accessing. This involves locally computing the physical address indices i and j using the received coordinate data and mathematical expression(s) derived from the linear skewing equation. After each local computing unit has generated its set of physical indices i, j, k in $M^3$ space, the control computing unit then sends synchronization signals to its array of local computing units, which coordinate the array during its access to the specified beam of memory storage elements. Notably, during the parallel memory accessing operation, one local computing unit accesses one memory storage element from its local memory storage module.

Once a specified beam has been accessed, data elements in the beam can be placed on local buses 16. At this stage, the accessed data elements can be held in the local computing units for local processing, and thereafter returned to the same or other memory storage elements in its local memory storage module. Alternatively, a number of possible data transfer operations may be performed. For example, an entire beam can be accessed, placed on the local buses, uniformly shifted onto other local buses by way of global data transfer mechanism 6A, and thereafter returned to memory storage locations in $M^3$ space, which correspond to either the same or different beam of memory storage elements in $C^3$ space. As will be described in greater detail hereinafter, this global data transfer mechanism permits uniform parallel data transfer from one beam, to another.

According to another possible data transfer scheme, one or more memory storage elements can be accessed from the 3-D memory storage array, placed on the local bus(es), and then transferred across adjacent local bus(es) to neighboring memory storage elements, using local data transfer mechanism 6B. As will be described in greater detail hereinafter, local data transfer mechanism 6B permits non-uniform data transfer among neighboring memory storage elements. Collectively, global and local data transfer mechanisms 6A and 6B comprise data transfer network 6 illustrated in FIGS. 1A and 1B.

In accordance with yet another possible data transfer scheme, a beam of memory storage elements can be simultaneously accessed, placed on the local buses, and then transferred through data input/output unit 7 to external data storage device 10. Alternatively, data elements from the external data storage device can be transferred through data input/output unit 7, and into an accessed beam of memory storage elements. Notably, both of these data transfer operations occur under the control of the control computing unit.

In accordance with yet another data transfer scheme, a beam of memory storage elements can be accessed, placed on the local buses, and transferred to data collection unit 15. Thereafter, the control computing unit can transfer the collected data to the interface/display computing unit for storage processing and eventually visual display.

In the parallel computing system of the present invention, it is necessary to define the location of a memory storage element in the 3-D memory storage array so that a data element stored therein can be accessed. It is also necessary to define the exact distances between a pair of memory storage elements in both $C^3$ and $M^3$ space, in order to transfer a data element between these memory storage elements. A mathematical foundation for these particular measures will be developed below.

Figure 3:
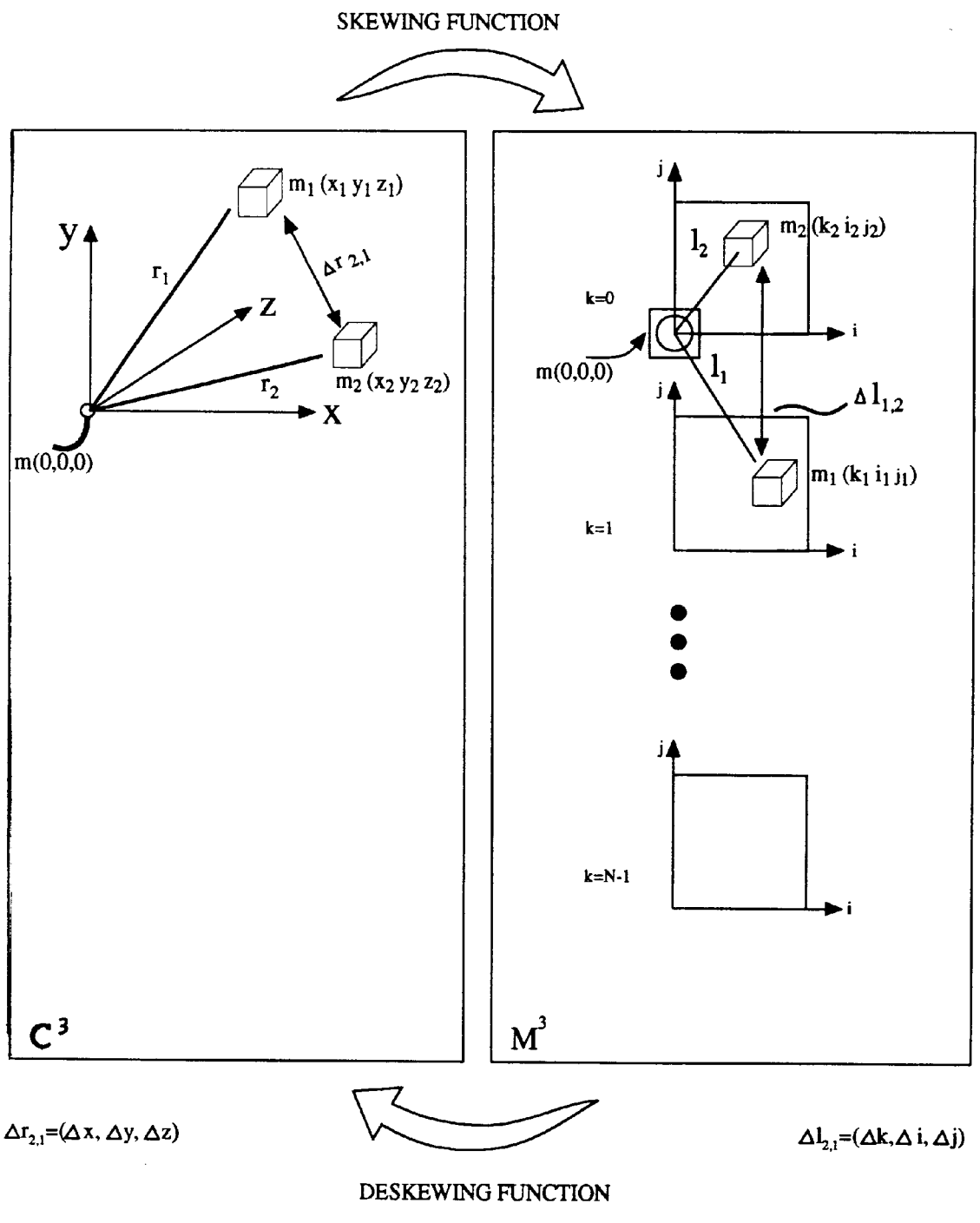
FIG. 3 is a schematic diagram illustrating how the transfer of a data element from memory storage element $m_1(x_1,y_1,z_1)$ to memory storage element $m_2(x_2,y_2,z_2)$ in the 3-D Cartesian Space of the parallel computing system corresponds to the transfer of the data element from memory storage element $m_1(i_1,j_1,k_1)$ to memory storage element $m_2(i_2,j_2,k_2)$ in the Physical Memory Storage Space $M^3$ of the parallel computing system of the present invention.

As illustrated in FIG. 3, the distance between any pair of memory storage elements, e.g. $m_1(x_1,y_1,z_1)$ and $m_2(x_2,y_2,z_2)$ in Cartesian Space $C^3$, is defined in terms of the displacement vectors $r_1$ and $r_2$ of memory storage elements $m_1(x_1,y_1,z_1)$ and $m_2(x_2,y_2,z_2)$ respectively. Notably, such distance measurements are made from a reference point in the 3-D Cartesian Coordinate System. By definition, distance $\blacktriangle r_{2,1}$ equals $r_2$-$r_1$ when the data transfer is from $m_1(x_1,y_1,z_1)$ to $m_2(x_2,y_2,z_2)$ and the distance $\blacktriangle r_{1-2}$ equals $r_1$-$r_2$ when the data transfer is from $m_2(x_2,y_2,z_2)$ to $m_1(x_1,y_1,z_1)$. In Cartesian Space $C^3_1$ the displacement $r_1$ of memory storage element $m_1(x_1,y_1,z_1)$ is measured from a reference point in $C^3$, which preferably is selected as the memory storage element m(0,0,0) located at the origin of 3-D Cartesian coordinate system. Similarly, displacement $r_2$ is also measured from this reference point in the Cartesian coordinate system, as are displacement measures r for all other memory storage elements in the 3-D memory storage array. The distance $\blacktriangle r$ for data transfer from $m_1(x_1,y_1,z_1)$ to $m_2(x_2,y_2,z_2)$ can be more precisely defined in terms of Cartesian coordinates (x, y, z), namely: $\blacktriangle r_{2,1}=(x_2-x_1, y_2-y_1, z_2-z_1)$.

In accordance with the present invention, data transfer operations are specified by the user in Cartesian Space $C^3$, and prior to execution, must be converted into corresponding parameters expressed in physical memory space $M^3$. For example, memory storage element $m_1(x_1,y_1,z_1)$ has a physical memory address in $M^3$ expressed as $m_1(i_1,j_1,k_1)$, and memory storage element $m_2(x_2,y_2,z_2)$ has a physical memory address in $M^3$ expressed as $m_2(i_1,j_1,k_1)$. Consequently, a distance measure $\blacktriangle l_{2,1}$ in $M^3$ space, corresponding to distance measure $\blacktriangle r_{2,1}$ in $M^3$ space is expressed in physical memory space $M^3$ as: $\blacktriangle l_{2,1}=(i_2-i_1,$ j2-j$_1$, k$_2$-k$_1$). Similarly, a distance measure ▲l$_{1,2}$ corresponding to distance measure ▲r$_{1,2}$, is expressed in physical memory space M$^3$ as: ▲l$_{1,2}$=(i$_1$-i$_2$, j$_1$-j$_2$, k$_1$-k$_2$).

Similar to the definition of distance ▲r in C$^3$ space, distance ▲l in M$^3$ space can be expressed in terms of displacements l$_1$ and l$_2$ of memory storage elements m$_1$(i, j,k) and m$_2$(i$_2$,j$_2$,k$_2$) in M$^3$ space, as by definition, distance ▲l$_{2,1}$=l$_2$-l$_1$ when the data transfer is from m$_1$(i$_1$,j$_1$,k$_1$) to m$_2$(i$_2$,j$_2$,k$_2$) and distance ▲l$_{1,2}$=l$_1$-l$_2$, when the data transfer is from m$_2$(i$_2$,j$_2$,k$_2$) to m$_1$(i$_1$,j$_1$,k$_1$). In physical memory space M$^3$, the displacement l$_1$ of memory storage element m$_1$(i$_1$,j$_1$,k$_1$) is measured from a reference point in M$^3$, which preferably is selected as memory storage element m(i=o, j=o, k=o) located at module k=o, with a physical memory address i=o, j=o in the 3-D memory storage array. Similarly, displacement l$_2$ is also measured from this reference point in physical memory space M$^3$, as are displacement measures for all other memory storage elements in the 3-D memory storage array.

The distance ▲l$_{2,1}$ for data transfers from m$_2$(i$_2$,j$_2$,k$_2$) to m$_1$(i$_1$,j$_1$,k$_1$) can be expressed in terms of displacements l$_1$ and l$_2$, or in terms of physical addresses i, j, k, namely: ▲l$_{2,1}$=l$_2$-l$_1$ (i$_2$-i$_1$, j$_2$j$_1$, k$_2$-k$_1$) similarly, the distance ▲l$_{1,2}$ for data transfers from m$_1$(i$_1$,j$_1$,k$_1$) to m$_2$(i$_2$,j$_2$,k$_2$) can be expressed in terms of displacements l$_1$ and l$_2$ or in terms of physical addresses i, j, k, namely: ▲l$_{1,2}$=l$_1$-l$_2$ (i$_1$-i$_2$, j$_1$-j$_2$, k$_1$-k$_2$). By applying the linear skewing equation (1) to the above expressions, the distance ▲l$_{2,1}$ in physical memory space M$^3$ can be expressed as:

$$\blacktriangle l_{1,2}=l_2-l_1=(x_2-x_1, y_2-y_1, [(x_2, y_2, 3_2)\bmod N - (x_1,y_1,z_1)\bmod N]). \quad (3)$$

The transfer of a single data element from one memory storage location to another is required in certain applications. However, in order to rapidly process blocks of data elements within the 3-D memory storage array, parallel data access and transfer is desired. Such parallel data element transfers will involve accessing a specified set of N memory storage elements residing along a vector parallel with one of the three or the graphic principal x, y and z coordinate axes. As used hereinafter and in the claims, the term "rectilinear beam" and "rectilinear beam of memory storage elements" shall mean any sequence of N memory storage elements lying along such a vector. Also, the term "rectilinear beam of data elements" shall mean any sequence of N data elements residing within a "rectilinear beam of memory storage elements."

In mathematical terminology, a rectilinear beam or sequence of N memory storage elements can be expressed as {M(X,Y,Z)}$_N$ in Cartesian space C$^3$, or as {m(i,j,k)}$_N$ in physical memory space M$^3$. A sequence of N data elements stored within such a beam of memory storage elements can be expressed as {D$_k$}$_N$, where k=0,1 . . . N-1. As will become apparent hereinafter, the parallel computing system of the present invention can access a beam of memory storage elements {m(x,y,z)} in a conflict-free parallel manner by simply specifying a pair of coordinates in the principal plane of the coordinate system, which is perpendicular to the orthographic axis that is parallel with the beam of memory storage elements to be accessed. For example, in order to specify a beam of memory storage elements parallel to the x axis of the Cartesian coordinate system, only the pair of y and z coordinates lying within the y-z plane from which the beam perpendicularly extends, must be specified by the user. Thus, this beam of memory storage elements can be designated by {m(x,y',z')}, where y' and z' represent the pair of user specified coordinates defining the point in the y-z plane from which the beam perpendicularly extends. Similarly, a beam of memory storage elements parallel to the y axis of the Cartesian coordinate system, can be designated by {m(x',y,z')}, where x' and z' represent the pair of user specified coordinates defining the point in the x-z plane from which the beam perpendicularly extend. Also, in accordance with this convention, a beam of memory storage elements parallel to the z axis can be designated by {m(x',y',z)}, where x' and z' represent the point of user specified coordinate defining the point in the x-y phase from which the beam perpendicularly extends.

The parallel transfer of data elements from a "source" beam of memory storage elements to a "destination" beam of memory storage elements is a basic operation within the parallel computing system of the present invention. Thus, it will be helpful to illustrate how data accessed from a "source" beam {m$_{ns}$(x,y,z)}$_N$, is transferred to a "destination" beam {m$_{nd}$xy,z)}$_N$.

In general, the source beam, as well as the destination beam, may be parallel to any one of the three principal axes in the 3-D Cartesian coordinate system. Thus, each arbitrary source beam and destination beam can be uniquely specified in C$^3$ space by specifying a set of two Cartesian coordinates (x,y), (y,z) or (x,z) in the principal plane, from which the source or destination beam extends. Hereinafter, these coordinates shall be referred to as the Cartesian specifications or parameters of a source and destination beam, designated by CS$_s$ and CS$_d$, respectively.

The position of each n-th memory storage element m$_{as}$ (x,y,z) and m$_{nd}$(x,y,z) along any pair of source and destination beams, is specified in C$^3$ space by the distance between the memory storage element and a preselected reference memory storage element m$_r$(x,y,z)$_N$ in C$^3$ space, preferably located at x=0, y=0, z=0. This distance measure, referenced against m$_r$(o,o,o) in C$^3$ is referred to as the displacement of memory storage element m$_{ns}$(x,y,z) or M$_{nd}$(x,y,z) and is designated by the displacement vector r$_{ns}$ for the n-th memory storage elements along the source beam and r$_{nd}$ for the n-th memory storage element along the destination beam. For an entire source beam, a set of N displacement vectors can be defined as R$_s$=({r$_{ns}$}$_N$. Similarly, for an entire destination beam, a set of N displacement vectors can be defined as R$_d$={r$_{nd}$}$_N$.

In order to appreciate how the x,y, z coordinates of each n-th memory storage element along a source or destination beam increment, it will be helpful to consider the case of a source beam extending parallel to the y-axis and a destination beam extending along the x-axis. In this case, the x and z coordinate values of memory storage elements along the source beam are constant or restricted along the entire beam, and this can be designated as x$_s$' and z$_s$'. Also, the y and z coordinate values of memory storage elements along the destination beam are constant and can be represented as y$_d$' and z$_d$'. It can be easily shown, that for each n-th memory storage element in the specified source and destination beams, the x,y and z coordinate values for each n-th memory storage element along these beams can be expressed in terms of the following displacement vectors:

$$r_{ns}=x_s', \ y_s=n, \ z_s'$$
$$r_{nd}=x_d=n, \ y_d', \ 3_d'$$

Thus, the distance between each n-th memory storage element m$_{ns}$(x,y,z) along the exemplary source beam and the corresponding n-th memory storage element m$_{nd}$(x,y,z) along the exemplary destination beam, is given by the distance measure ▲r$_n$ expressed in C$_3$ space as:

▲$r_n = x_d' - n, n - y_s', z_d' - z_s'$.

Notably, as arbitrary source and destination beams may have any one of nine relative principal orientations in $C_3$ space, there will be nine corresponding distance equations which can be readily derived in the manner described above. In addition, it is possible that the destination beam may spatially coincide with a source beam, and that each n-th memory storage element in the source beam be transferred to the n-th corresponding memory storage element along the destination beam, but which has a different coordinate location. While parallel data transfer operations are specified using Cartesian specifications $CS_s$ and $CS_d$, these data transfer operations are executed in the parallel computing system of the present invention using distance measures defined in physical memory space $M^3$. Such distance measures will be developed below.

The location of each n-th memory storage element $m_{ns}(i,j,k)$ and $m_{nd}(i,j,k)$ along any pair of source and destination beams, is specified in physical memory space $M_3$ by the distance between the memory storage element and a preselected reference memory storage element $m_r(i,j,k)$ in $M_3$ space, which corresponds the reference memory storage element $m_r(i_r,j_r,k_r)$ in $C^3$ space. As described hereinabove, memory storage location $m_r(x,y,z)$ at x=o, y=o, z=o in $C^3$ space has a physical address location at memory storage element $m_r(i=o, j=o, k=o)$ in $m^3$ space, in accordance with linear skewing equation (1). Referenced against $m_r(o,o,o)$ in $M^3$ space, this distance is referred to as the displacement of memory storage element $m_{ns}(i,j,k)$, or $m_{nd}(i,j,k)$ and is designated by displacement vector $l_{ns}$ for the n-th memory storage element $m_{ns}(i,j,k)$, and $l_{nd}$ for the n-th memory storage element $m_{nd}(i,j,k)$. Displacement vector $l_{ns}$ can be expressed in terms of its vector components as follows:

$$l_{ns} = i_{ns} - i_r = 0, j_{ns} - j_r = 0, k_{ns} - k_r = 0$$

which can be reexpressed as:

$$l_{ns} = i_{ns}, j_{ns}, k_{ns}.$$

For an entire source beam represented in $M^3$ space, a set of N displacement vectors can be defined as $l_{ns} = \{l_{ns}\}_N$. Displacement vector $l_{nd}$ can also be expressed in terms of its vector components as follows:

$$l_{nd} = i_{nd}, j_{nd}, k_{nd}.$$

Also, for an entire source beam represented in M3, a set of N displacement vectors can be defined as $L_{nd} = \{l_{nd}\}$.

The distance ▲$l_{ns,nd}$ between the n-th corresponding memory storage elements along source and destination beams can be defined as the difference of displacement vectors $l_{ns}$ and $l_{nd}$ to provide the following equation:

$$▲l_{ms,nd} = l_{nd} - l_{ns}.$$

For N corresponding memory storage elements along a pair of source and displacement beams, a set of N distance measures ▲L can be defined as follows:

$$▲L = \{▲l_{ms,nd}\}_N = \{l_{nd} - l_{ns}\}_N$$

Using the vector expressions for displacement vectors $l_{nd}$ and $l_{ns}$, the set of distance measures ▲L in $M^3$ space can be expressed as:

$$▲L = \{i_{nd} - i_{ms}, j_{nd} - j_{ms}, k_{nd} - k_{ms}\}_N. \quad (4)$$

By defining the terms $i_{nd} - i_{ns} = ▲i_n$, $j_{nd} - j_{ns} = ▲j_n$ and $k_{nd} - k_{ns} = ▲k_n$, the distance measure set ▲L can also be expressed as:

$$▲L = \{▲i_n, ▲j_n, ▲k_n\}_N. \quad (5)$$

Expressions (4) and (5) for ▲L above are most important as they provide specifications which can be used by the parallel computing system of the present invention in order to execute the physical operations required during parallel data transfer between a set of source and destination beams specified in terms of $CS_s$ and $CS_d$ by the user interface/display computing unit.

Careful analysis of the above derived expressions for ▲L indicate several useful relationships which can be explained in designing a highly efficient parallel data transfer mechanism in accordance with the present invention. It can be shown that distance measure ▲$k = k_{nd} - k_{ns}$ is constant for all values of n during data transfers between arbitrary source and distance beams, then a global data transfer mechanism can be used to uniformly transfer each data element along the source beam to its corresponding location along the destination beam in a parallel fashion. Additionally, it can be shown that physical address indices $i_{ns}$ and $j_{ns}$ can be derived from a single set of parameters, such as $CS_s$, then these Cartesian parameters can be transmitted (i.e. broadcasted) to all local computing units and each set of physical address indices $i_{ns}$ and $j_{ns}$ can be locally computed and used to access data from memory storage element $m_{ns}(i,j,k)$ during data access from the specified source beam. Also, if physical address indices $i_{nd}$ and $j_{nd}$ can be derived from a single set of parameters, such as $CS_d$, then these Cartesian parameters can be transmitted to all local computing units and each set of physical address indices $i_{nd}$ and $j_{nd}$ can be locally computed and used to transfer uniformly shifted data to memory storage element $m_{nd}(i,j,k)$ during data transfer to the specified destination beam.

Surprisingly, physical address indices $i_{ns}$ and $j_{ns}$ for all values of n, can be locally computed using (a) Cartesian parameter $CS_s$ specifying a user selected source beam, and (b) the linear skewing function k=(x+y+z) mod N. Also, physical address indices $i_{nd}$ and $j_{nd}$ for all values of n, can also be locally computed using (a) Cartesian parameters $CS_d$ specifying a user selected destination beam, and (b) the linear skewing function specified above. Notably, the specific variants of the linear skewing function required during this computational step, depends on the constrained coordinate pairs of $CS_s$ and $CS_d$, and will be described in greater detail hereinafter.

Advantageously, distance ▲$k_n$ has been found to equal a constant measure for all value of n, thereby permitting the use of a global data transfer mechanism in the parallel computing system of the present invention. In order to illustrate this remarkable feature of the memory storage, accessing and transfer subsystem of the present invention it is helpful to first note that user specified source and destination beams can be spatially arranged in $C^3$ space in any of one of nine possible coordinate orientations expressed relative to the principal coordinate axis. For purposes of illustration, the case where the source beam is parallel to the x-axis and the destination beam is parallel to the y-axis, is considered. In this particular case, the Cartesian parameter $CS_s$ comprises the coordinate pair $(y_s', z_s')$, where $y_s'$ and $z_s'$ are each constant for all values of $x_s$. Also, Cartesian parameter $CS_d$ comprise the coordinate pair $x_d'$, $z_d'$, where $x_d'$ and $z_d'$ are each constant for all values of $y_d$. Utilizing distance expression $\blacktriangle k_n = k_{nd} - k_{ns}$ and linear skewing function $k+(x+y+z)$ mod N, distance $\blacktriangle k_n$ can be reexpressed as:

$$\blacktriangle k_n = k_{nd} - k_{ns} = (x_{nd} + y_{nd} + z_{nd}) \bmod N - (x_{ns} + y_{ns} + z_{ns}) \bmod N$$

$$\blacktriangle k_n = (x_n' + n + z_d') \bmod N - (n + y_s' + z_s') \bmod N. \quad (6)$$

Since $x_d$ and $Z_d$, and $y_s$, and $z_s$, are constant for all values of n, these coordinate pairs can be defined by constant terms $C_s$ and $C_d$, respectively, to provide the following expressions:

$$\blacktriangle k_n = (n + c_d) \bmod N - (n - c_s) \bmod N$$

$$\blacktriangle k_n = (n + c_d - n - c_s) \bmod N$$

$$\blacktriangle k_n = (c_d + c_s) \bmod N = \text{constant for all values of n.}$$

The above constraint can be shown to hold between any user specified set of source and destination beams in $C_3$ space. This naturally includes the nine possible coordinate orientations between specified source and destination beams. However, it also includes the case where a specified destination beam spatially coincides with a specified source beam. It can be readily shown that in such types of parallel data transfer, the Cartesian parameters $CS_s = CS_d$ and $\blacktriangle k_n$ is constant for all values of n, thus permitting the use of a global data transfer mechanism among all N modules in the parallel computing system of the present invention.

Referring now to FIG. 4, a schematic diagram is shown for the parallel computing system of the illustrative embodiment of the present invention. As illustrated, parallel computing system 20 generally comprises a number of system components, namely: N local modules 21 indexed k=0, 1, . . . N−1; a control computing unit 22; user interface/display computing unit 23; data collection unit 24; data input/output unit 25; and global data transfer mechanism 26. As will be described in detail hereinafter, these system components are structured about a system bus 27, N local buses 28 indexed k-o, 1, 2, . . .N−1, and a control and synchronization bus 29.

As illustrated in FIG. 4, each k-th local module comprises a k-th local computing unit 30, a k-th local data storage module 31 having $N^2$ memory storage elements or cells indexed by physical address indices i, j, as hereinbefore described, and a k-th local bus interface controller 32. As shown, each k-th local computing unit is connected to the k-th local memory storage module, the I/O unit, the data collection unit, the global data transfer mechanism and the k-th and (k+1)-th local bus interface controllers. As will be described in greater detail hereinafter, the interconnection of each k-th local computing unit with the k-th and (k-i)th local bus interface controllers permits each local computing unit to transfer data elements to any one of its three neighboring local computing units.

In general, each local computing unit can be realized by any sequential computer capable of running local computer programs and communicating with its environment. The local computer programs (e.g. routines), which will be described in greater detail hereinafter, are preferably complied in user interface/display computing unit 23, or alternatively in the control computing unit 22. In the illustrative embodiment, each local computing unit is implemented by a Reduced Instruction Set Computer (RISC) having associated program memory realized as cache memory, and independently accessible data storage memory, realized as a RAM device. In the preferred embodiment the reduced instruction set computer is a high performance 32-bit microprocessor, such as the R3051 RIS controller commercially available from Intelligent Device Technology (IDT). In order to improve memory access speed, 4K-byte cache program memory is provided to each microprocessor. The cache memory is used to store local computer programs downloaded from the control unit by way of computing system bus 27.

In the illustrative embodiment, where N=256 and each data element is 32 bits in length, each local memory storage module is implemented by a single dynamic RAM memory chip of 64K×32 bits. The size of the data element can be easily extended by stacking up more than one memory storage module, so that a desired sequence of bits in each memory storage element can be locally addressed in a sequence selected by the local computing unit. In such extended data element applications, the physical address of each memory storage element m(i,j,k) remains unchanged in its memory storage module, although there is a need to provide a simple memory management unit to each local memory storage module in order to handle the sequence of data elements stored at each memory storage element m(i, j,k). This option in described in greater detail in connection with the description of FIGS. 13A through 13B(2).

In general, control computing unit 22 can be realized by any sequential computer capable of running control computer programs (e.g. routines) and communicating with its environment. In the illustrative embodiment, the control computing unit is implemented by a RISC computer having associated program memory and independently accessible data storage memory realized as a RAM device. Control computer programs, which will also be described in greater detail hereinafter, are complied in the user interface/display computer unit and are then downloaded into the program memory by way of system bus 27.

In general, the function of the user interface/display computing unit is to interact with the parallel computing system 20. Alternatively, the interface/display computing unit may be used to interface parallel computing system 20 with another computer system. In either case, the user interface/display computing unit supplies to the system, information specifying particular computing and display tasks to be performed. In one illustrative embodiment, the user interface/display computing unit is a 3-D graphics workstation, commercially available from Sun Microsystems, Silicon Graphics, etc. The function of this workstation is to run user interface programs (e.g. routines), compile control and local computer programs, and provide an interactive environment and graphics utilities (e.g. Windows). Functioning as a host computer system, the graphics workstation includes a graphics display and shading unit in order to display 2-D projections from 3-D volume renderings stored within the 3-D memory storage array of the system.

Alternatively, user interface display computing unit 22 can be incorporated within the control computing unit, as illustrated in FIG. 4. In this embodiment, control computing unit is preferably realized as a graphics workstation, and the user interface/display and control programs are stored in and run on the sequential computer of the graphics workstation.

Figure 4A:
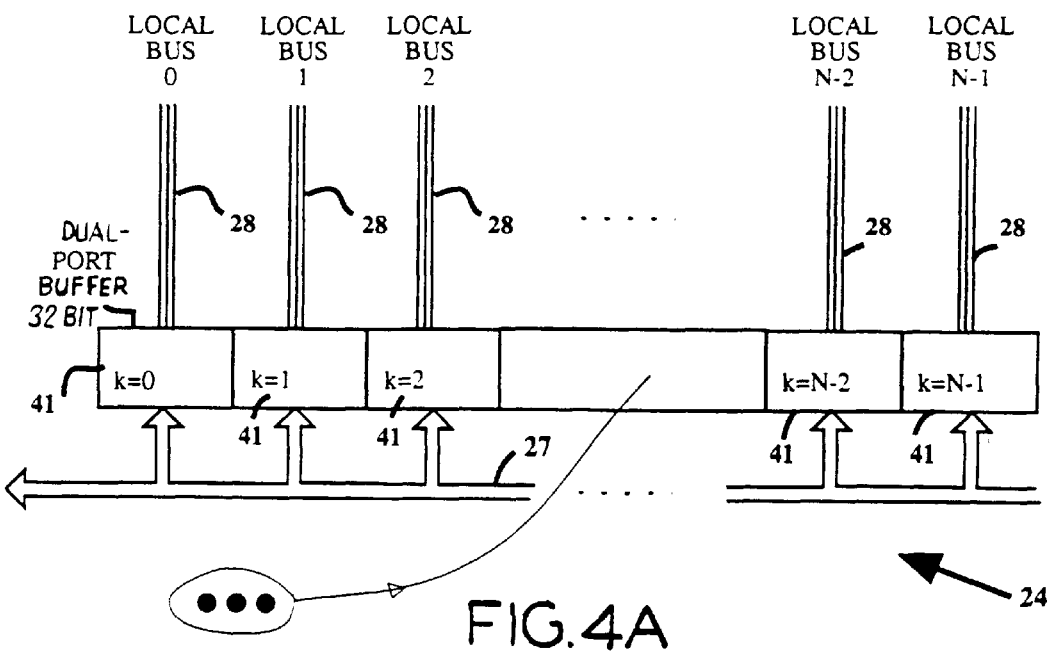
FIG. 4A is a schematic diagram of the data collection unit of the parallel computing system of FIG. 4.
Figure 4B:
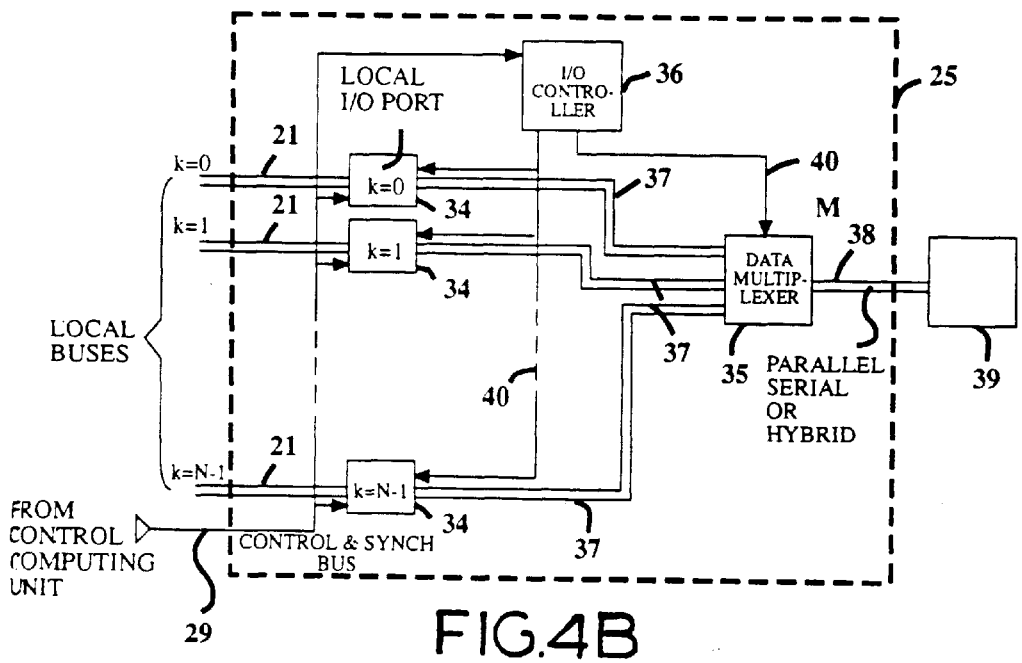
FIG. 4B is a schematic diagram of the data input/output unit of the parallel computing system of FIG. 4.

As illustrated in FIGS. 4 and 4B, parallel data I/O unit 25 comprises N local I/O ports 34 indexed k=0,1,2, . . .N−1; a N/M data multiplexing device 35, and an I/O controller 36. As shown, the first side of each k-th local I/O port is connected to the k-th local data bus, and the second side thereof is operably connected to one port on the "system"

side of the N/M data multiplexing device by way of electrical conductors 37. On the "external" side of the data multiplexing device, one or more ports 38 are provided and are operably connected with an external data storage system 39. As shown, local I/O ports 21 and data multiplexing device 35, are controlled by control signals sent from I/O controller 26 over control bus 40. As constructed, parallel I/O unit 25 provides an interface between local data buses 21 and a external data storage system 39 which functions as a data file system.

When a single disk file system is being interfaced with the parallel computing system, all data output from the local buses can be serialized into a single 32-bit wide data stream. This parallel to serial conversion process is carried out under the control of I/O controller 36. The major drawback of this M=1 serialization process is that it slows down the I/O data throughput of the system. In order to achieve higher levels of I/O data throughput in the system, a multidisk file system can be employed. One possible configuration is to provide one disk for every four local computing units. This technique can be achieved using redundant arrays of inexpensive disks (RAID's) and SCSI-2 bus technology to interface this data storage system and the parallel I/O unit.

As illustrated in FIGS. 4 and 4A, data collection unit 24 provides a feedback mechanism for (i) transferring data results from the local computing units to the control computing unit, as well (ii) individual data (e.g., control flags, semaphores) from the control computing unit to different local computing units. This feedback mechanism permits each local computing unit to indicate that a parallel operation has been completed, and to write non-uniform data from the control computing unit to different local units. As shown in FIG. 4A, data collection unit 24 comprises an arrangement of N dual-port data buffers 41, in which each dual-port data buffer is operably connected to one local computing unit by its local data bus. The N dual port buffers are accessible in parallel by the N local computing units by way of the N local buses, and sequentially accessible by the control computing unit (or optionally by the interface/display computing unit) by way of the system bus.

As illustrated in FIG. 4, system bus 27 and control and synchronization bus 29 can be implemented by a standard bus technology (e.g., VME and VMS bus family). For details regarding bus technology, reference can be made to pgs. 143–149 of "Structural Computer organization" by Andrew Tanenbaum. Together, these two buses create a communication environment between the control computing unit and the array of local computing units, and also between the user interface/display computing unit and the central computing unit. For example, commands and parameters furnished by the control computing unit are broadcast over the system bus to each of the local computing units. The system bus is also utilized during the loading of programs to the memories of the local computing units. The control and synchronization bus runs independently of the system bus, and is used by the control computing unit for low-bandwidth control communication and synchronization of the local computing units, the global data transfer mechanism, parallel data I/O unit, and the data collection unit.

As illustrated in FIGS. 4 and 4D(1), each k-th local bus 28 comprises 32 data lines 28A, 17 address lines 28B, and a required number of control lines 28C. Each local bus can be realized using standard VME bus technology, the advantage of which is its reliability, availability and variety. Each k-th local bus is governed by the k-th local bus interface controller 32. In the illustrative embodiment, each local bus interface controller 43 is realized by integrating local bus control logic circuitry 43 and a triad of dual-port buffers 44, 45 and 46, each having associated address logic. Local interface control logic circuitry 43 can be realized using a standard VME interface controller (e.g., VIC068 by Cypress Semiconductors). In the form of a single integrated circuit (IC) chip, the local interface control logic circuitry provides all VME bus control functions operating at a rate of up to 40 Mbytes per second. Such local bus control functions include, for example, (i) data transfer, (ii) bus arbitration, and (iii) interrupt control.

Data transfer functions on each local bus include ordinary read and write operations performed between the various elements operably connected to each k-th local bus in the parallel computing system, namely the k-th local computing unit, the k-th local memory storage module, the first, second and third dual-port buffers in the k-th local bus interface controller, the data collection buffer, the parallel data I/O unit, and the global data transfer mechanism bus arbitration on each local bus is performed using master/slave relationships. In the illustrated embodiment, each k-th local computing unit acts as master element when attempting to communicate (i) with neighboring local computing units through the first, second or third dual-port buffers, (ii) with the k-th local memory storage module, (iii) with the parallel I/O port, and (iv) with the data collection buffer. On the other hand, each local computing unit acts as a slave element when it is addressed by the parallel I/O unit, the global data transfer mechanism, and any one of the dual-port buffers of either the k-th or the (k−1)th local bus interface controllers. Each k-th local memory storage module acts as a slave element in all communication modes. Notably, each k-th local memory storage module can be addressed by the k-th local computing unit and also by the k-th I/O port of the parallel data I/O unit. Similarly, each k-th dual-port buffer in the data collection unit acts as a slave element and is addressed by the k-th local computing unit. Each k-th local I/O port of the parallel data I/O unit is addressed by the k-th local computing unit and acts as a slave element during data output operations. However, during data input operations, each k-th local I/O port acts as a master element and addresses the k-th local computing unit or the k-th local memory storage module. Each k-th bidirectional terminal of the global data transfer mechanism acts as a master element addressing the k-th local computing unit during all phases of global data transfer operations. During local data transfer operations, the first, second and third dual-port buffer of each k-th local bus interface controller acts as a slave element and is addressed by the k-th local computing unit and the associated dual-port buffers of the (k+1)th and (k−1)th local bus interface controllers.

Using the above described master/slave relationships, the bus arbitration process operates as follows. Whenever two competing master elements attempt to concurrently access the k-th local bus, the local bus control logic circuitry of the k-th local bus interface controller grants an access to the master element having the higher priority, in accordance with a priority table preprogrammed with the local bus interface controller.

Figure 4C:
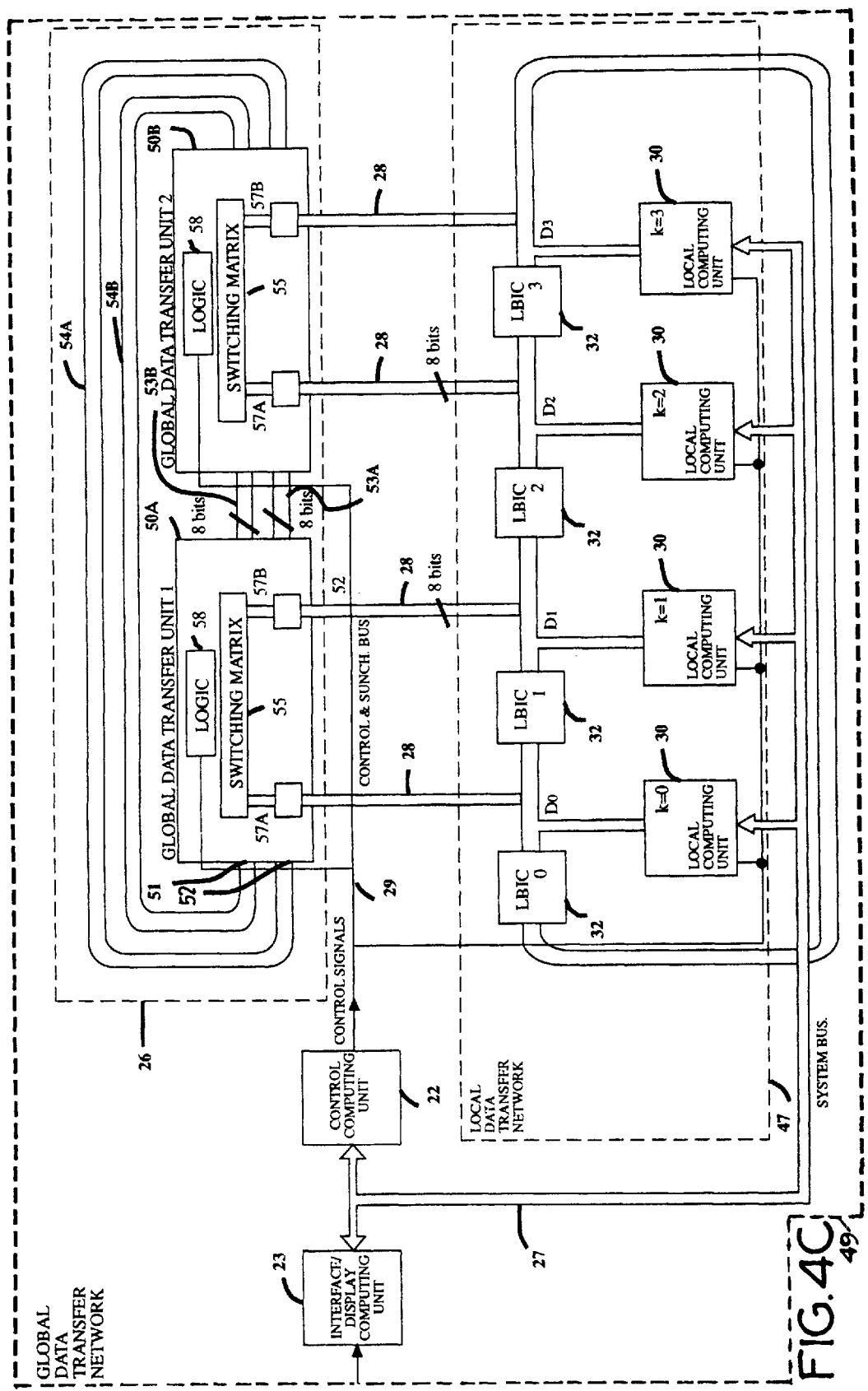
FIG. 4C is a schematic diagram of the global and local data transfer networks of the parallel computing system of FIG. 4.

As shown in FIG. 4(C), local data transfer network 47 comprises the array of N local computing units, local buses 28, and local bus interface controllers 32, which interface adjacent local buses in a manner to be described in detail hereafter. The function of the local data transfer network is to permit each k-th local computing unit to selectively transfer an accessed data element stored in memory storage element $m(i_c, j_c, k_c)$, i.e., at $m(x_c, y_c, z_c)$, in its local memory module, to any one of the 26 memory storage elements having x, y and z Cartesian coordinates selected from the set defined by $\{x_c \pm 1, y_c \pm 1, z_c \pm 1\}$. This local data transfer capability of the parallel computing system of the present invention is decentralized in that it does not operate under the control of the control computing unit and is essentially asynchronous during its operation. Owing the unique structure of the memory storage and accessing subsystem of the present invention, the above-defined 26 connected data transfer capability of the local data transfer network requires that each k-th local computing unit only transfer an accessed data element from its local memory module to up to three adjacent local computing units associated with the k±1, k±2, k±3 memory storage modules. As will be more full appreciated hereinafter, the decision to transfer any data element (s) residing in a specified memory storage module remains strictly with the local computing unit managing the local memory storage module in which its specified data element is stored.

Referring to FIGS. 4D(1) and 4D(2), the details of a data transfer among 26 connected neighboring memory storage elements, will be described.

As shown in FIG. 4D(1), each k-th local bus is physically interfaced with adjacent k±1 local buses by way of dual-port buffers 44 of the k-th bus interface controller. As illustrated in FIG. 4D(1), the data and address lines of the first port of first dual-port buffer 44 are connected to the data and address lines of the k-th local bus, whereas the data and the address lines of the second port of the first dual-port buffer are connected to the data and address lines of the (k−1)th local bus. Similarly, the data and address lines of the first port of second dual-port buffer 45 are connected to the data and address lines of the k-th local bus, whereas the data and the address lines of the second port of the second dual-port buffer are connected to the data and address lines of the (k−1)th local bus. Also, as shown, the data and address lines of the first port of third dual-port buffer 46 are connected to the data and address lines of the k-th local bus, whereas the data and the address lines of the second port of the third dual-port buffer are connected to the data and address lines of the (k−1)th local bus. As shown in FIG. 4D(1), the data, address and control lines of the k-th local bus control logic circuit (i.e., VME bus controller) are connected to the data, address and control lines of the k-th local bus.

Transferring data elements between a k-th "source" local computing unit and a (k±▲$k_n$) "destination" neighboring local computing unit (i.e., where ▲$k_n$=±1, ±2 or ±3) is achieved using the local buses, dual-port buffers 44, 45 and 46 and local bus control logic 43 disposed between these local computing units. In order to perform such data transfers, dual-port data buffers 44, 45, and 46 each utilize special address logic schematically distributed in FIG. 4D(2). According to this local addressing scheme, each k-th local computing unit (acting as a source) and surrounded by its six neighboring local computing units (any one of which can be a destination) is assigned a relative local address binary "00" which is indicated by the two last significant bits on the address lines of the k-th "source" local bus. The right-hand neighbors of the k-th local computing unit are assigned the following binary relative local addresses. Local computing unit at module k+(▲$k_n$=1) is assigned relative local address "001". Local computing unit at module k+(▲$k_n$=2) is assigned. relative local address "010". Local computing unit at module k+(▲$k_n$=3) is assigned relative local address "011". Similarly, the left-hand neighbors of the k-th local computing units are assigned the following relative local addresses. Local computing unit at module k+(▲$k_n$=−1) is assigned local address "101". Local computing unit at module k+(▲$k_n$=−2) is assigned local address "110". Local computing unit at module k+(▲$k_n$=−3) is assigned local address "111". Lastly, in accordance with the relative local addressing scheme, each. first dual-pont buffer in the neighborhood of the k-th local computing unit is assigned, relative local address equal to the local relative address of one of the six neighboring local computing units.

In accordance with the above-described "relative-local" addressing scheme, each k-th local computing unit is mediated from its six neighboring local computing units by a designated dual port buffer assigned the same relative local address value. To achieve local data transfer between specified local computing units, each dual-port buffer performs three primary functions:

(i) to decode at its first port address, the address placed on the k-th local address bus;

(ii) to buffer in the first data port of the addressed dual-port buffer, the data element placed on the k-th local data bus;

(iii) to generate at its second address port, an address equal to the binary address value at its first address port decremented by "1";

(iv) to transfer from its second data port, to the (k±1)th local data bus, depending on the direction of data transfer.

Advantageously, the local bus interface controllers resolve local bus conflicts during concurrent local data transfer across the local data transfer network. Upon the occurrence of bus contention at a local bus interface controller, where two data elements are being transferred along the same data bus lines, one data element will be automatically delayed while buffered in the dual-port buffer triad of the local bus interface controller, until the other data element is removed from the required local bus.

As illustrated, the local data transfer network involves primarily the local computing unit acting as the "source" of data to be transferred, and the function of the "destination" local computing unit is merely to receive the transferred data element. This data reception process is initiated by an interrupt signal generated by the local bus address logic in the dual-port buffer feeding the destination local computing unit. The function of the control computing unit, on the other hand, is to allocate time slots, during which local computing units are permitted to participate in a particular local data communication session. Preferably, these time slots will be allocated according to the demand for local data transfer in each application.

Referring to FIG. 4C, the global data transfer network of the parallel computing system will be described. In general, global data transfer network 49 comprises the array of local computing units 30, local buses 28, global data transfer mechanism 26, control computing unit 22, system bus 27, and control and synchronization bus 29. The function of the global data transfer network is to selectively transfer sequence of N data elements from a specified source beam in the 3-D memory storage array, to a specified destination beam therein. In contrast with the local data transfer network of the present invention, the global data transfer network uniformly transfers each data element in the accessed source beam over a uniform distance ▲$k_n$ in $M^3$ space, to the accessed destination beam. This implies that each data element in each k-th memory storage element of a source beam is moved across the same number of local memory storage modules during its transfer to the corresponding memory storage element in the destination beam. Accordingly, the function of global data transfer mechanism 26 is to move in a parallel fashion, N data elements over a uniform distance ▲$k_n$ under the control of the central computing unit.

The global data transfer network is best illustrated by describing its operation during the simultaneous transfer of N data elements from a source beam to a destination beam specified in $C^3$ space. This process can be best illustrated by referring to the global data transfer network of the present invention schematically represented in FIGS. 4, 4C and 4E(1), and the computer routines illustrated by the flow-charts represented in FIGS. 5, 5A, 5B and 5C.

Figure 5:
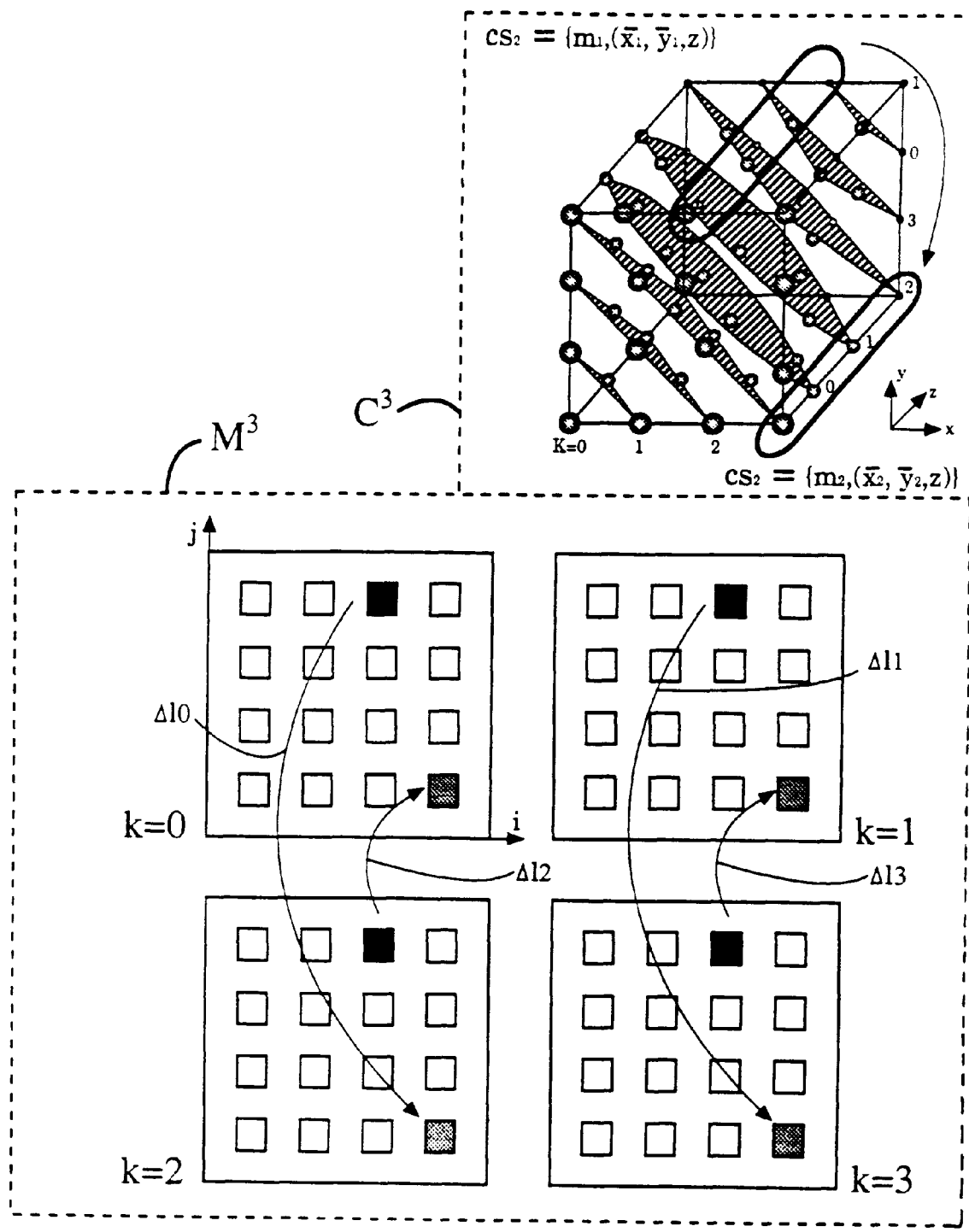
FIG. 5 is a schematic representation illustrating the orthographic access and transfer of a rectangular sequence of data elements between source and destination memory storage elements specified in the 3-D Cartesian Space $C^3$ of the 4×4×4 memory storage array of FIG. 2, and also the uniform intermodule transfer of these data elements in Physical Memory Storage space M3 by a module distance of ▲k=3 using the global data transfer network of the parallel computing system of the present invention.
Figure 5A:
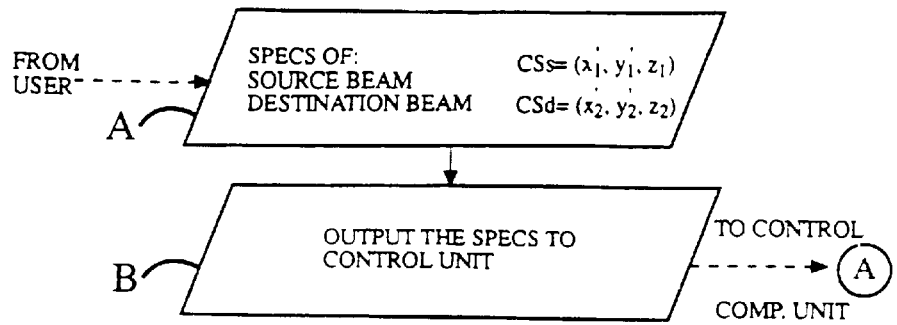
FIG. 5A is a flow chart for the user interface computer routine executed by the user interface and display computing unit in order to direct the control computing unit to coordinate the array of local computing units to effectuate a uniform intermodule transfer of the rectilinear sequence of data elements between source and destination sequences of memory storage elements specified by the Cartesian parameters illustrated in FIG. 5.

As illustrated in FIG. 5A, the first step in this parallel data transfer process involves the user specifying the source and destination beams in terms of Cartesian parameters $CS_s$ and $CS_d$. Typically, these parameters are generated at the user interface/display computing unit and then transferred over the system bus, to the control computing unit. As illustrated at Blocks A through B in FIG. 5B, the control computing unit uses Cartesian parameters $CS_s$ and $CS_d$ and expression 6, to calculate uniform distance measure (i.e., memory module shift) ▲k, which is then buffered. As indicated at Block C in FIG. 5B, the control computing unit then broadcasts Cartesian parameters $CS_s$ over the system bus, to the array of local computing units. As indicated at Block A through C in FIG. 5C, each k-th local computing unit uses Cartesian parameters $CS_s$ to compute physical address indices i and j, then accesses memory storage element m(i,j,k) along the source beam. Then as indicated at Block D in FIG. 5B, the control computing unit transmits synchronization signal over the control and synchronization bus to the local computing units. Then, at Block D in FIG. 5C, each k-th local computing unit places the accessed data element on the k-th local bus.

Figure 5B:
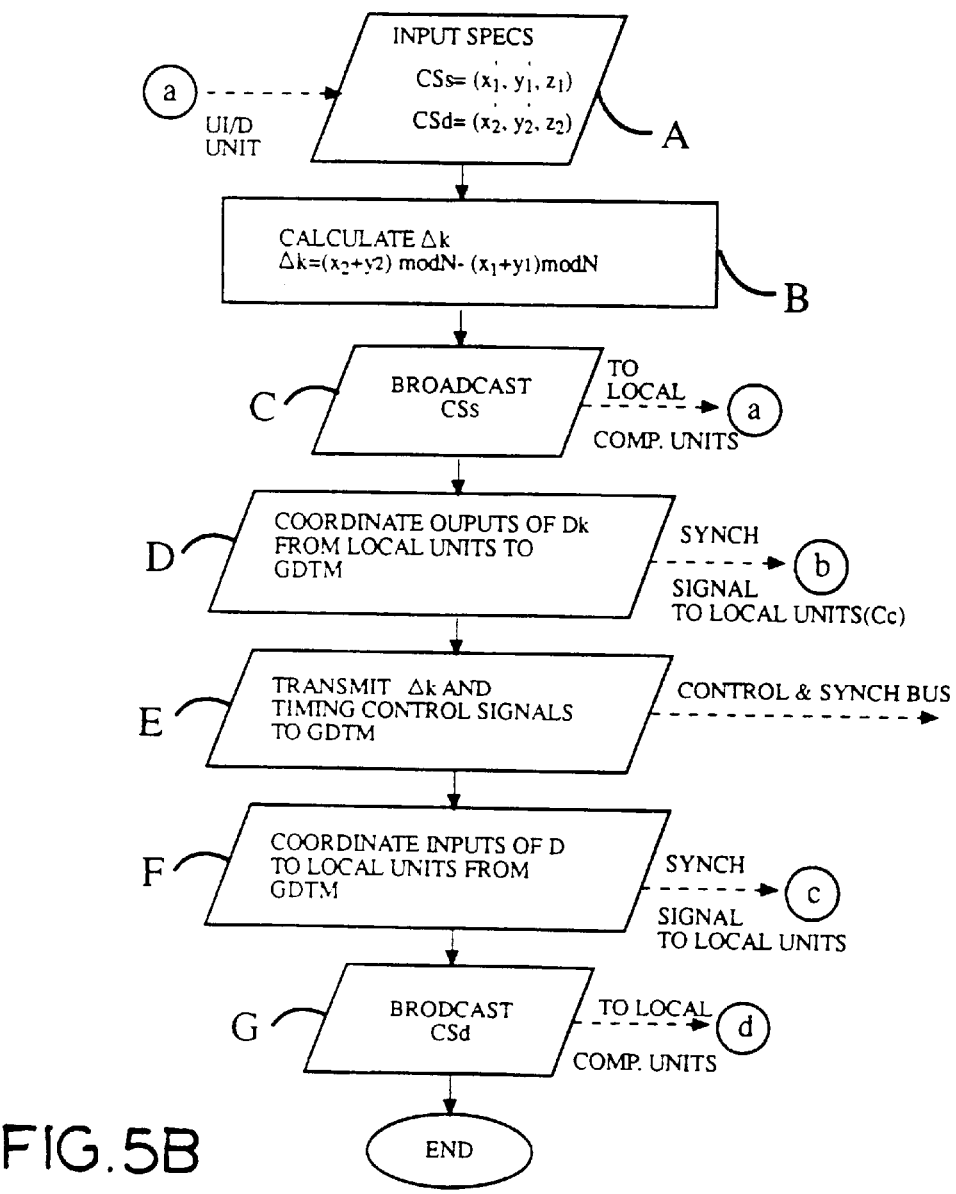
FIG. 5B is a flow chart for a control computer routine executed by the control computing unit in order to coordinate the array of local computing units to effectuate a global data transfer of the rectilinear sequence of data elements between source and destination sequences of memory storage elements, as illustrated in FIG. 5.
Figure 5C:
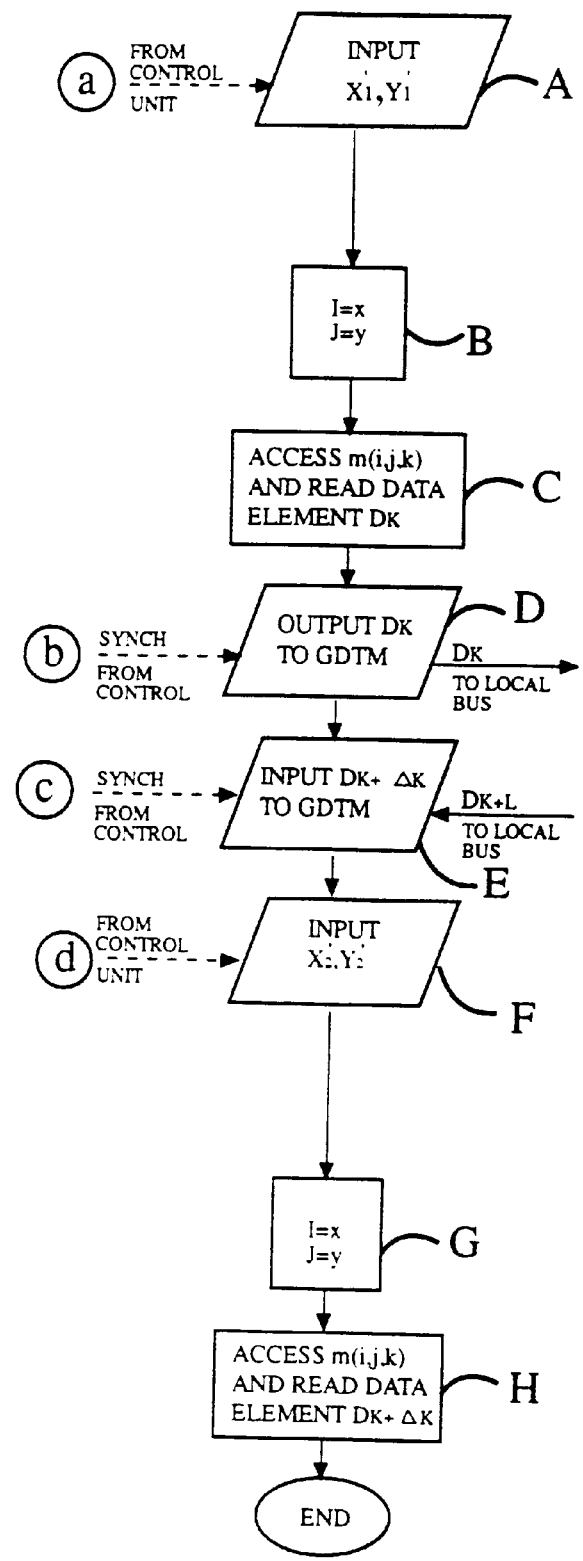
FIG. 5C is a flow chart for a local computer routine executed by each local computing unit during the uniform intermodule transfer of the rectilinear sequence of data elements between source and destination memory storage elements, as illustrated in FIG. 5.

As indicated at Block E in FIG. 5B, the control computing unit transmits module distance ▲k, and timing control signals over the control and synchronization bus, to the global data transfer mechanism, which in turn, enables the data element on each k-th local bus to be transferred into the k-th I/O buffer unit in the global data transfer mechanism. At this stage of the process, the global transfer mechanism automatically transfers (i.e., shifts) each data element in the k-th local I/O buffer port to the (k+▲k)th local I/O buffer port. Thereafter, as indicated at Block F in FIG. 5B, the control computing unit transmits control signals over the control and synchronization bus to the global data transfer mechanism, so that it transfers the data element from each k-th local I/O buffer port to the k-th local computing unit. At Block G in FIG. 5B, the control computing unit then broadcasts Cartesian parameters $CS_d$ over the system bus to each local computing unit. As indicated at Block F in FIG. 5C, the Cartesian parameter $CS_d$ is received by each local computing unit, and at Block G indices i and j are computed for the memory storage element m(i,j,k) along the destination beam. At Block H, each k-th local computing unit accesses memory storage element m(i,j,k) in its local memory storage module, and then stores data element $D_{k+▲k}$ therein.

Details of the global data transfer mechanism of the exemplary embodiment will now be described with references to FIGS. 4C, 4E(1), 4E(2) and 4E(3). As illustrated in FIG. 4C, N=4, the data element bit length is 8 bits, and a pair of global data transfer units 50A and 50B are utilized to realize the global data transfer mechanism. In the exemplary embodiment, each global data transfer unit comprises a global data transfer subunit for each bit in the eight bit local bus. Each subunit is operably connected to the corresponding data lines of two different local buses over which data bits $d_o$ and $d_1$ can be transferred. Also each subunit has left and right data bit transfer ports 51 and 52, which are operably connected to correspondingly right and left data bit transfer ports of the adjacent subunit, respectively, by way of conductive pathway pairs 53A, 53B and 54A, 54B, as shown in FIG. 4E(2). As illustrated in FIG. 4E(1), each subunit of exemplary embodiment comprises a switching matrix 55 having 2 rows and 2 columns of switching elements 56A through 56D, and two I/O buffer circuits 57A and 57B, and control logic circuitry 58 operably associated with its switching matrix and the control computing unit. As shown in FIG. 4E(2), each I/O buffer circuit comprises an I/O buffer 59, an activatable switching gate $g_x$, an input line driver 61, an output line driver 62, an I/O line 63, connected to the data line of the k-th local bus. In addition, each I/O buffer circuit comprises an input line 64 and an output line 64 connected to the input and output line drivers 61 and 62, respectively. In order to by-pass I/O buffer 59, switching gate $g_x$ is connected across the output of output line driver 62 and the input of input line driver 61.

As more clearly illustrated in FIG. 4E(3), each switching element 56 comprises a combination of four conventional switching gates $g_1$, $g_2$, $g_3$ and $g_4$ configured as shown to provide a pair of row and column data bit transfer pathways, in which only one of these pathways can be selected by control logic circuitry 58 which controls the operational status of these switching gates. Notably, each row data bit transfer pathway has a designated row input line 66 and a row output line 67, whereas each column data bit transfer pathway has an upper column line 68 and a lower column line 69. In order to control the operation of these switching gates so as to achieve the desired uniform (i.e. global) data transfer of data elements in (3 space), module distance (i.e. shift) control signals expressed in terms of ±▲k and timing control signals $t_c$ are generated by the control computing unit and provided to the control logic circuity. In response to these signals, the control logic circuitry of each subunit generates a set of switching matrix control signals including (i) I/O buffer control signals provided to I/O buffer circuitry 57A, 57B; (ii) left and right rows of switching element control signals provided to switching gates $g_1$, $g_3$ and $g_2$, $g_4$, respectively, and (iii) extended shift cycle control signals provided to the switching gate $g_x$ in each of I/O buffer circuits in order to bypass I/O buffer 59.

In order to form the 2×2 switching matrix of the exemplary embodiment, the set of switching elements ($j_{m,n}$) and the I/O input circuits are configured as follows. Notably, for purposes of explanation, the row to which each switching element is assigned, is designated by index m, and the column is designated by index n. As shown in FIG. 4E(2), the input line of each I/O buffer circuit is connected to the row input lines of the switching elements in the column associated with its I/O buffer circuit. The output line of each I/O buffer circuit is connected to the output lines of the switching elements in the column associated with its I/O buffer circuit. As shown, the upper column line of switching element $j_{1,2}$ is internally connected to the lower column line of switching element $j_{1,1}$ in the left contiguous global data transfer subunit. This interconnection provides for a bidirectional transfer of data element bits over a module distance equal to ±1 in $m^3$ space. Also, the upper column line of switching element $j_{1,1}$ is externally connected to the lower column line of switching element $j_{1,2}$ in the left contiguous global data transfer subunit. This interconnection also provides for bidirectional transfer of data element bits over a module distance equal to ±1 in $M^3$ space.

As illustrated in FIG. 4E(2), the upper column line of switching element $j_{2,2}$ is externally connected to the lower column line of switching element $j_{2,1}$ in the left contiguous global data transfer subunit. The interconnection provides for bidirectional transfer of data element bits over a module distance equal to ±2 in $M^3$ space. Also, the lower column line of switching element $j_{2,2}$ is externally connected to the upper column line of switching element $j_{2,2}$ in the right contiguous global data transfer subunit. This interconnection also provides for bidirectional transfer of data element bits over a module distance equal to ±2 in $M^3$ space.

The operation of the global data transfer mechanism of the exemplary embodiment is best illustrated by considering the events which occur during the global transfer of a sequence of data elements from a specified source beam to a designated destination. For purposes of illustration only, the case of a global data shift characterized by ▲k=+3 will be considered.

During the global data transfer process described above, the first internal operation occurs after control logic circuitry 58 in the global data transfer mechanism receives control signals from the control computing unit. At this stage, these control signals are provided to the I/O buffer circuits by the control logic circuity of each subunit, which permits each bit of each data element on each k-th local bus to be transferred to a buffer in a respective I/O buffer circuit. Each data element bit in each I/O buffer circuit is then placed on the row input lines of all the switching elements associated with its I/O buffer circuit. Then, the control logic circuitry in each subunit activates switching elements ($j_{2,m}$) along the second row only, by providing switching control signal to gates $g_2$ and $g_4$. This control operation causes data element bit $d_o$ on the first row input line of subunit $S_1$ to the lower column line thereof. Similarly, data element bit $d_1$ on the second row input line is transferred through switching element $j_{2,2}$ of subunit 50A to the lower column line thereof; data element $d_2$ on the third row input line is transferred through switching element $j_{2,1}$ of subunit 50B to the lower column line thereof; and data element bit $d_3$ on the fourth row input line is transferred through switching element $j_{2,2}$ of subunit 50B to the lower column line thereof. After each data element bit has been placed on the lower column line of its switching element described above, it is subsequently transferred to the upper column line of the interconnected switching element, positioned away at a column distance of ▲n=+2. Then each data element bit is placed on the row output line of the switching element since switching control signals are continually being provided to switching gates $g_4$. Finally, each data element bit on its low output line is moved to the terminal of its destination I/O buffer. At this stage, the I/O buffer is closed and each extended switching gate is activated so as to permit the data element bits to be placed on the row input line for a subsequent data transfer cycle of module distance ▲k=+1.

In order to transfer each data element bit by module distance ▲k=+1, and thus complete the request shift of ▲k=+3, a functionally simpler bit switching operation is performed by the global data element transfer mechanism. Specifically, control logic circuitry in each subunit activates switching elements ($j_{1,m}$) of the first row only by providing switching control signals to gates $g_2$ and $g_4$.

This control operation causes element bit on the first row input line of subunit 50A to be transferred through switching element $j_{1,1}$ to the lower column line thereof. Similarly, data element bit $d_1$ on the second row input line is transferred through switching element $j_{1,2}$ of subunit 50A to the lower column line thereof; data element bit $d_2$ on the third row input line is transferred through switching element $j_{1,1}$ of subunit 50B to the lower column line thereof; and data element bit $d_3$ on the fourth low input line is transferred thereon; switching element $j_{1,2}$ of subunit 50B to the lower column line thereof. After each data element bit has been placed on the lower column line of its switching element described above, it is subsequently transferred to the upper column line of the interconnected switching element, positioned away at a column distance of ▲n=+1. Then each data element bit is placed on the row output line of this switching element since switching control signals are continually being provided to switching gate $g_4$. Finally each bit of each k-th data element residing on its row output line is moved to the terminal of k-th destination I/O buffer which is located at a column distance +3 from k-th source I/O buffer. Then, the control logic circuitry of each subunit provides control signals to its I/O buffer circuit so as to open buffer 59 and transfer the bit thereto. During a subsequent step in the global data transfer process, each k-th local computing unit will simultaneously access each of the I/O buffer circuits comprising the k-th I/O buffer unit.

While the exemplary embodiment of the global data transfer mechanism described above contained four I/O buffer units and two data element switching matrices, this mechanism can be easily extended to include any number of I/O buffer units and switching matrices necessary to facilitate uniform global data transfer within any size 3-D N×N×N memory storage array. When extending the size of the global data transfer mechanism of the present invention, the number of I/O buffer units will be selected to equal the number of local buses, which will typically equal N, and the number of I/O buffer circuits comprising each k-th I/O buffer unit will be selected to equal the width of the local buses in the parallel computing system. The number of global data transfer units employed in any particular embodiment will be selected on the basis of several considerations. Such considerations will include the maximal number of physical pins practically achievable when implementing the subunit using an integrated circuit technology available in the art. Another consideration will involve, as desired in many applications, to achieve maximum data elements shift (i.e. ▲k) during a single global data transfer cycle.

Having described the parallel data access and transfer mechanisms of the parallel computing system, it is appropriate at this juncture to describe in detail how the array of local computing units are coordinated by the control computing unit, during these fundamental operations.

While it is possible to synchronize a hardware electronic circuit utilizing electrical signals, it is not possible to use such techniques in order to synchronize an array of computational processes carried out by the local computing units of parallel computing system of the present invention. This is due primarily to the fact that identically constructed computers executing identical routines will not perform in identical times. In order to overcome this problem, the parallel computing system of the present invention may employ one of several suitable "coordination" techniques. One coordination technique utilizes performance data empirically acquired from the individual local computing units in order to determine when a computational routine (i.e. task) has been completed by all the local computing units in the array. Specifically, the coordination technique involves empirically determining for each local computing unit, the longest "execution time" required to complete specific computational tasks (i.e., specific local computer routines) upon "worst case" data sets. These "execution times" are then listed in a local computer routine performance table, which is stored in the data storage memory of the central computing unit. Then, whenever the control computing unit reaches an instruction in one of its control computing routines which indicates local computer coordination is required, the control computing unit carries out the following local computer coordination routine. First, the central computing unit sets an internal timer and then broadcasts over the system bus a command which initiates the execution of a predesignated local computer routine requiring coordination. While the local computing units execute the local routine, the internal timer, within the central computing unit, measures the elapsed time. Prior the elapsed time reaching the "execution time," the control computing unit may execute other routine not involving coordination. However, only when the elapsed time equals the "execution time", the control computing unit proceeds to the next routine requiring coordination. This local computer coordination process will be further illustrated in FIGS. 5A through 5C, 8A through 8D, and others.

Another coordination technique that may be employed involves each local computing unit generating a task completion flag upon completion of its assigned task, and to store this flag in the k-th dual-port buffer in the data collection unit. Periodically, the control computing unit searches for flags in the data collection unit to determine if all local computing units have completed their tasks. When all local computing units have completed their routines, the control computing unit proceeds to the next routine requiring coordination.

In the illustrative embodiment in which the memory storage array has a 256×256×256 configuration in $C^3$ space and the local bus width is 32 bits, 256 modules are required to construct the parallel computing system of the present invention. In this illustrative embodiment, the 256 modules are organized into sixteen contiguous modules. Each group of sixteen contiguous modules are implemented on a printed circuit board in a like manner. In general, each printed circuit board supports the following system components: the sixteen local computing units, the sixteen local memory storage modules, the sixteen local bus interface controllers, the sixteen local buses, the sixteen local I/O ports, one parallel I/O unit, the sixteen dual-port buffers of the data collection unit, and the global data transfer unit comprising thirty-two subunits operably interconnecting the data lines of the sixteen local buses. These sixteen boards are connected to a central printed circuit board which supports the central computing unit, the interface to the user interface/display computing unit, and the system bus controller.

The parallel computing system of the invention can be easily reconfigured into one of several parallel computing configurations. This is achieved by downloading identical or different local computing programs into the program memory of each Local Computing Unit, downloading an appropriate control program into the Control Computing Unit, and UID program into the UID computing unit. In a single task multiple data (STMD) configuration all local units run the same program synchronized by the control computing unit. In a multiple instruction multiple data (MIMD) configuration, each local computing unit has a specialized task and thus its own individual program. In either of the configurations, the entire system is coordinated by the control computing unit. Alternatively, a hybrid configuration can be achieved by combining any combination of STMD and MIMD configurations throughout the parallel computing system. In hybrid configuration, the data collection buffer serves as a, configuration pool for storing different local programs.

In the following discussion, a STMD configuration is assumed. Each of the described parallel computing programs comprises an interface display program, a control program and a local program residing in the UID computing unit, the control computing unit, and the local computing unit respectively, in order to locally generate physical addresses indices i,j and then access the k-th memory storage element m(i, j, k) along a specified beam.

Having described the structure and function of the parallel computing system of the illustrative embodiment, it is appropriate at this juncture to now describe in greater detail three basic ways in which data elements can be accessed from the 3-D memory storage array in a parallel fashion by this parallel computing machine.

In FIGS. 6A through 6F, parallel accessing of data storage elements along beams parallel to the three orthographic axes are illustrated.

Figure 6A:
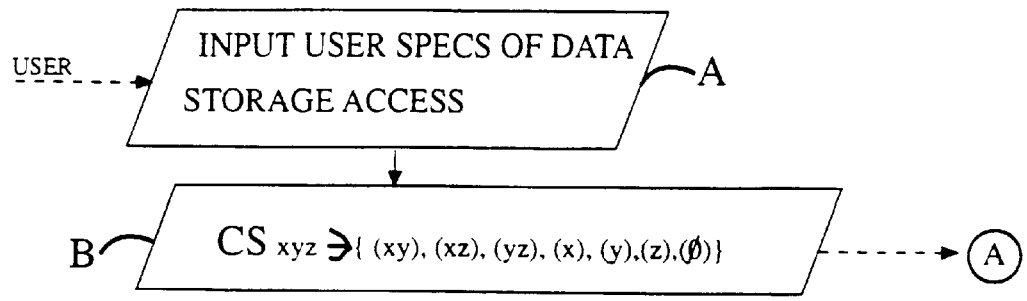
Figure 6B:
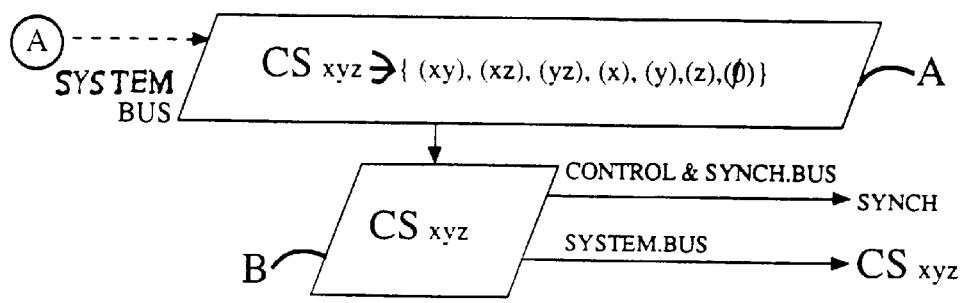
Figure 6D:
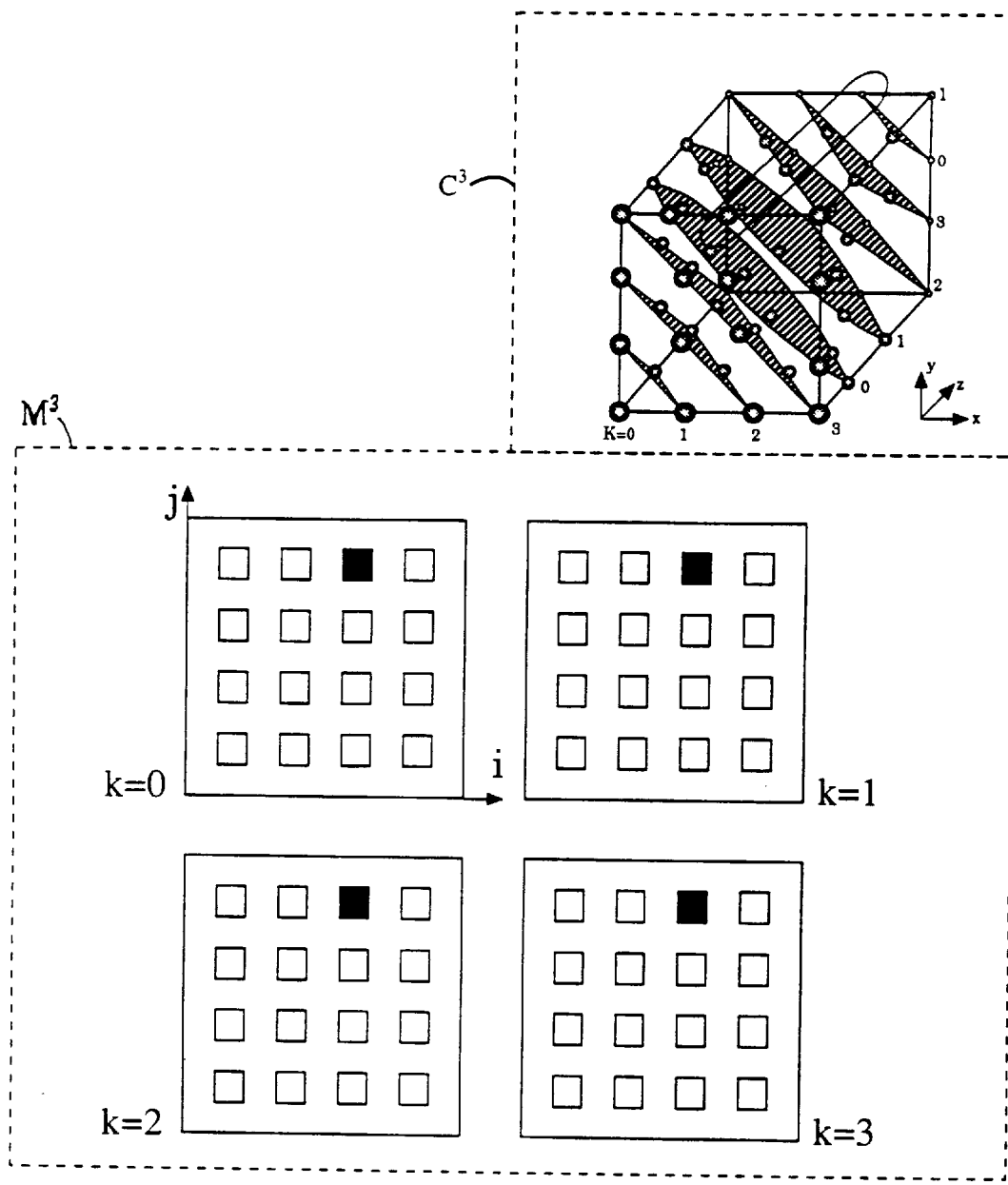
FIG. 6D is a schematic representation of the 4×4×4 memory storage array of FIG. 2, illustrating the access of a rectilinear sequence of four memory storage elements parallel to the z axis in 3-D Cartesian space $C^3$ and the location of these accessed memory storage elements in Physical Memory Storage Space $M^3$.
Figure 6E:
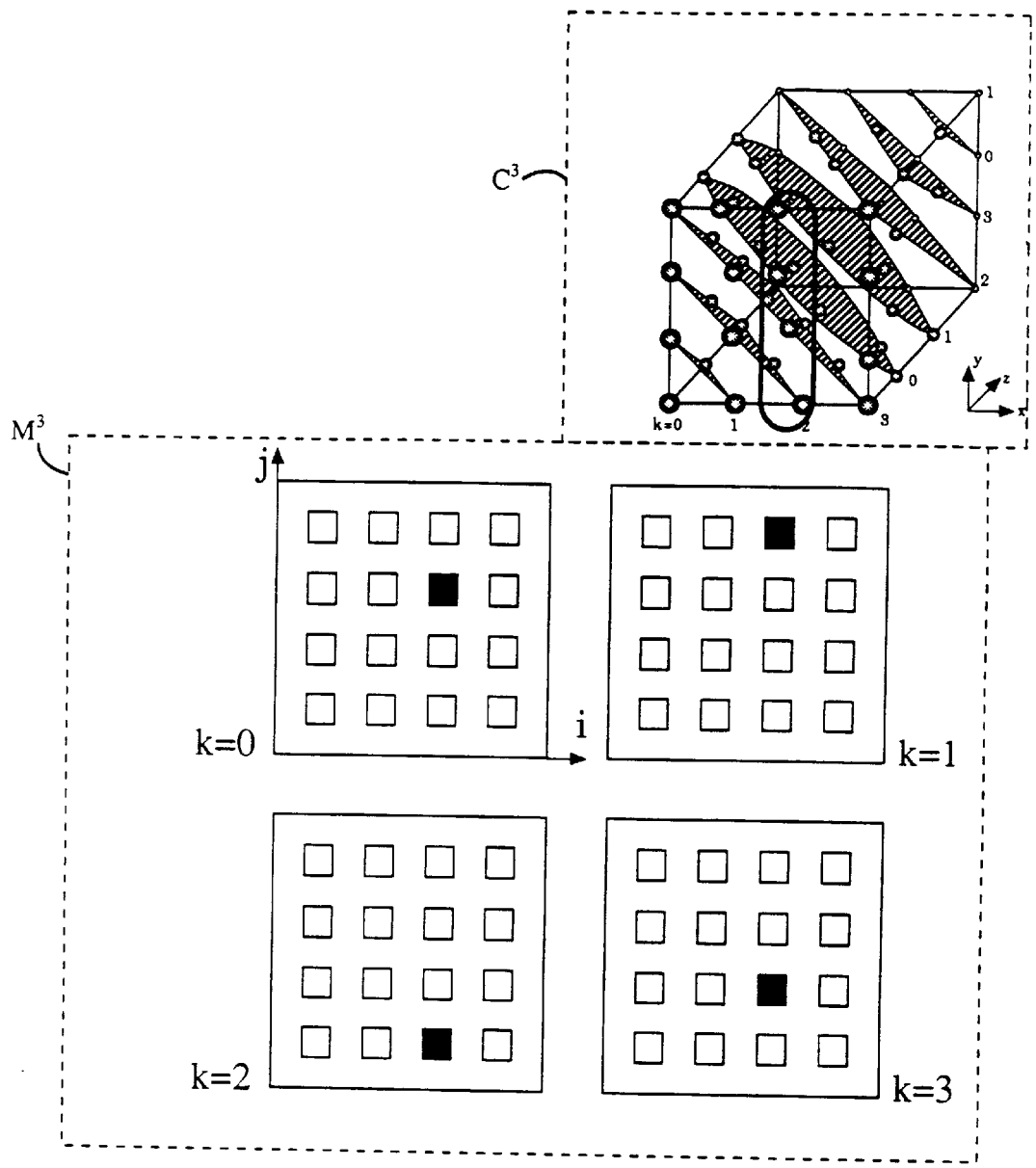
FIG. 6E is a schematic representation of the 4×4×4 memory storage array of FIG. 2, illustrating the access of a rectilinear sequence of four memory storage elements parallel to the y axis in 3-D Cartesian Space $C^3$ and the location of these accessed memory storage elements in Physical Memory Storage Space $M^3$.
Figure 6F:
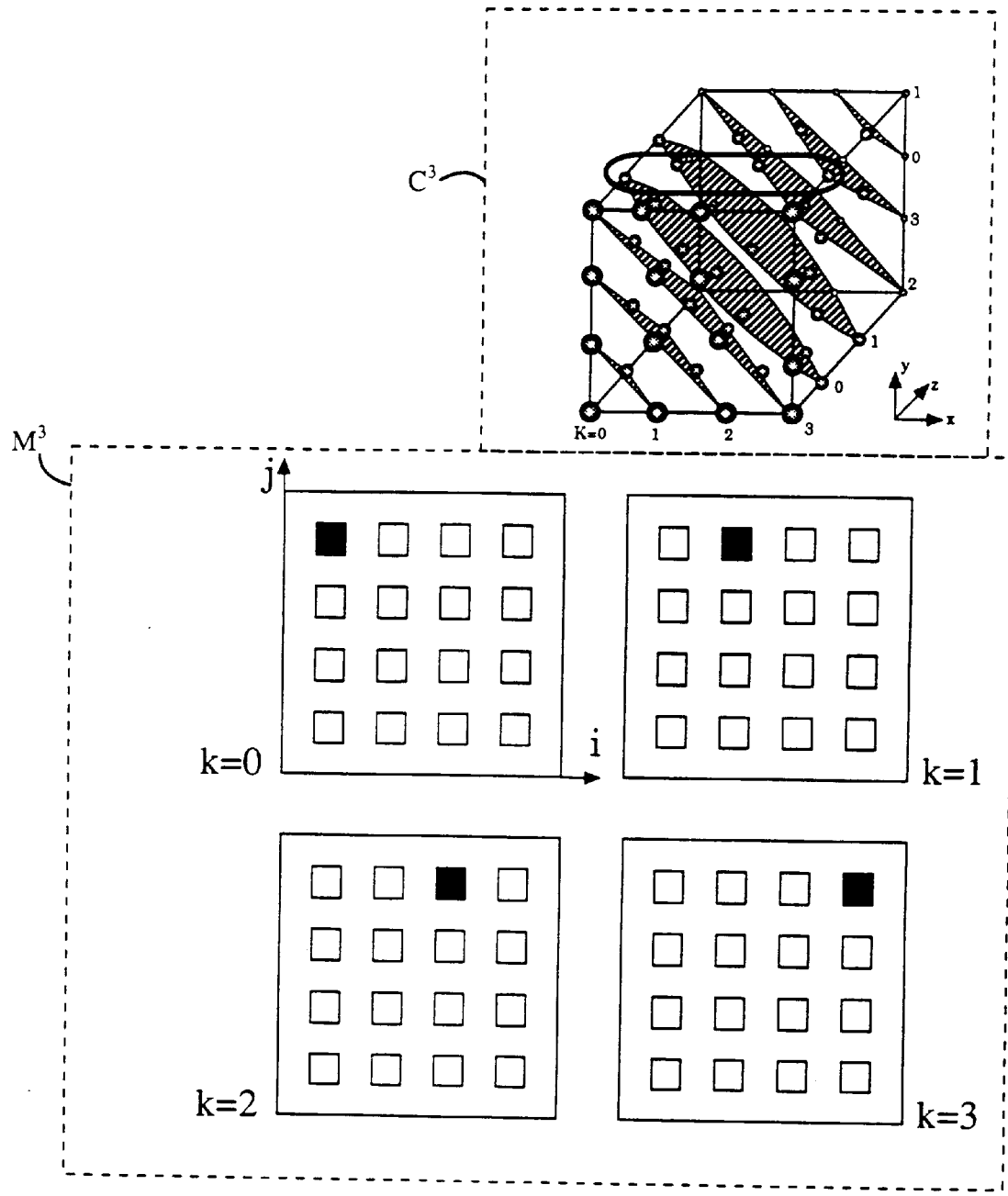
FIG. 6F is a schematic representation of the 4×4×4 memory storage array of FIG. 2, illustrating the access of a rectilinear sequence of four memory storage elements parallel to the x axis in 3-D Cartesian Space $C^3$ and the location of these accessed memory storage elements in Physical Memory Storage Space $M^3$.

As illustrated in FIG. 6D, 6E and 6F, a beam of memory storage elements parallel to any of the principal axes in $C^3$ space can be accessed in a parallel fashion by the parallel computing system of the present invention. In order to achieve such parallel data access, a set of three computer routines, illustrated in FIGS. 6A through 6C, are synchronously executed within the parallel computing system utilizing the coordination technique described in detail above. As illustrated in FIG. 6A, the first step in the computer routine executed by the interface/display computing unit, involves the user providing a Cartesian specification of the beam of memory storage elements to be accessed in the 3-D memory storage array. In general, user input specifications CS will fall within three distinct groups, namely: (i) a first group in which two coordinates are restricted, (i.e.,(x,y),(x, z) or (y,z); (ii) a second group in which one coordinate is restricted (i.e. x, y or z); and (iii) a third group in which no coordinate is restricted. For the case of beam access, Cartesian parameters CS will be selected from the first group of Cartesian specifications.

As illustrated in FIG. 6A, second step of the routine involves sending the user specified Cartesian parameters CS over the system bus to the control computing unit.

As illustrated in FIG. 6B, the first step in the computer routine executed by the control computing unit involves receiving Cartesian parameters CS from the interface/display computing unit, and then broadcasting these parameters over the system bus to the array of local computing units, while sending synchronization signals over the control and synchronization bus.

As illustrated in FIG. 6C, the first step in the computer routine by each k-th local computing unit involves synchronously receiving the broadcasted Cartesian parameters CS. The second step of the routine involves calculating the physical address indices i and j using a linear deskewing function. Thereafter, each k-th local computing unit accesses the memory storage element m(i,j,k) specified by physical address indices i,j in the k-th memory storage module. This operation is carried out in a coordinated manner by the array of local computing units so as to access a rectilinear sequence of memory storage elements extending along a beam defined by user-specified Cartesian parameters CS. Notably, for the case of a beam specified by Cartesian parameters CS=(x,y), i and j are directly known without any computation. For the cases of beam access specified by CS=(y,z) and CS=(x,z), i or j must be computed utilizing linear deskewing functions x=(k-(y+z))modN and y=(k-(x+z))modN, respectively.

Figure 6G:
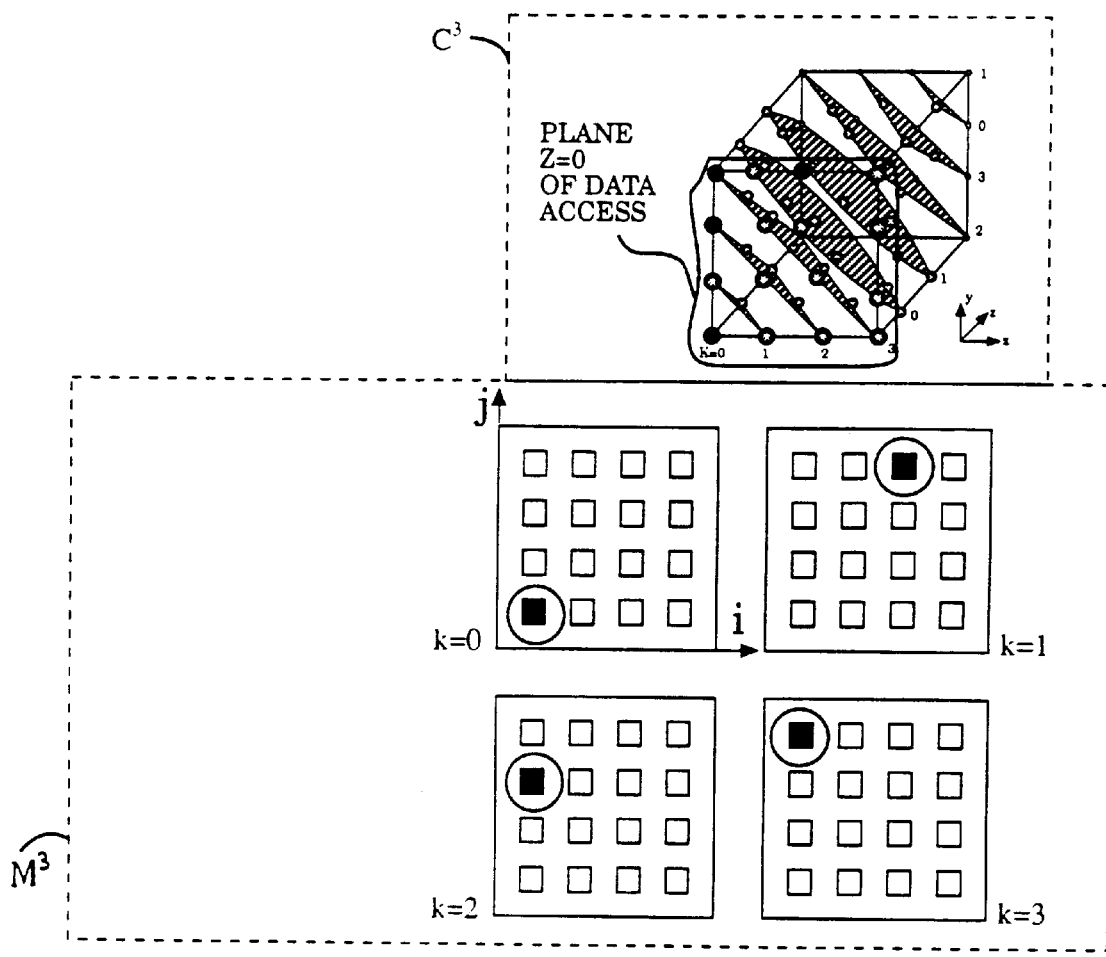
FIG. 6G is a schematic representation of the 4×4×4 memory storage array of FIG. 2, illustrating the access of four memory storage elements residing within a plane parallel to the x-y place of 3-D Cartesian Space $C^3$ and the location of these accessed memory storage elements in Physical Memory storage space $M^3$.
Figure 6H:
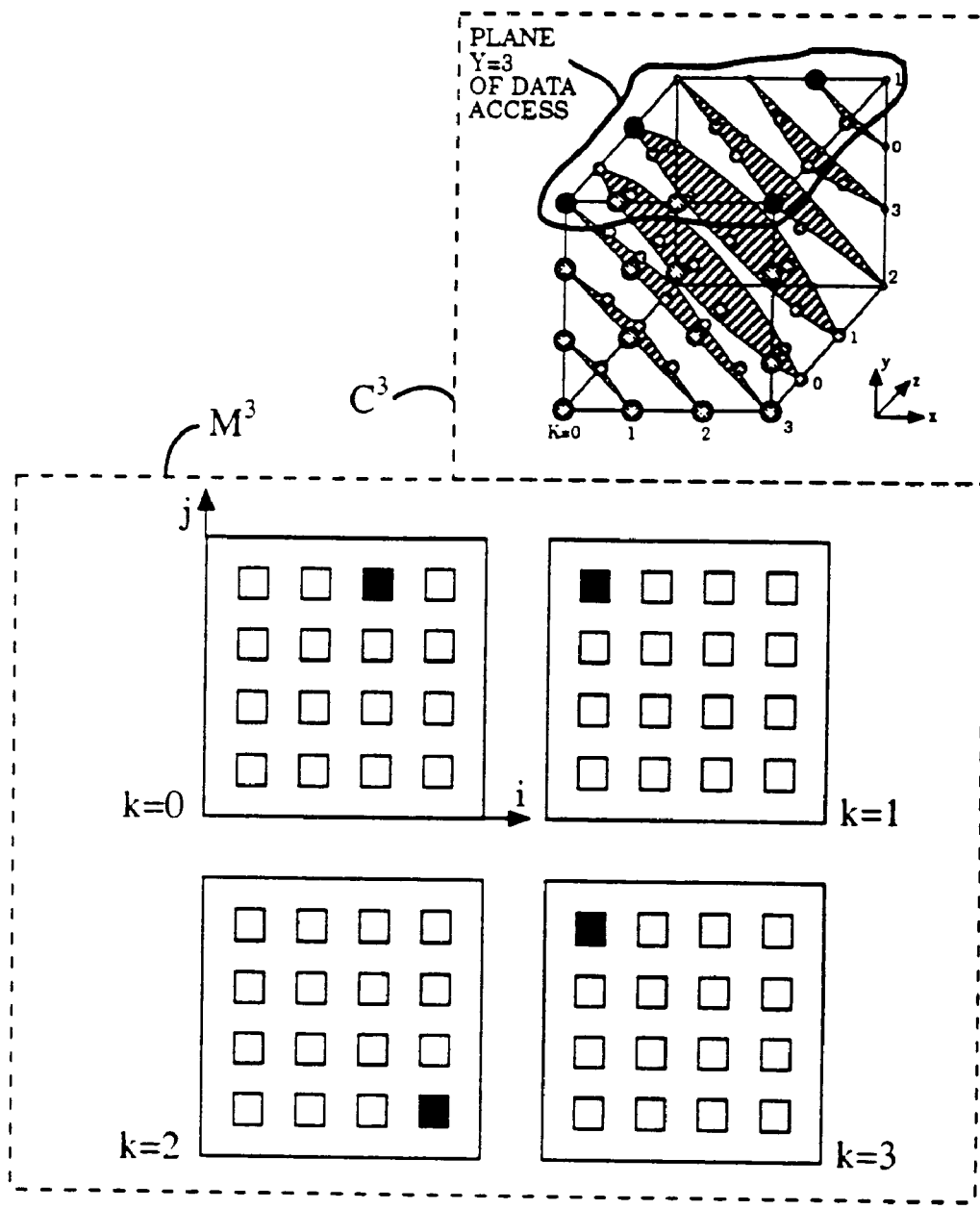
FIG. 6H is a schematic representation of the 4×4×4 memory storage array of FIG. 2, illustrating the access of four memory storage elements residing within a plane parallel to the x-z plane of 3-D Cartesian Space $C^3$ and the location of these accessed memory storage elements in Physical Memory Storage Space $M^3$.
Figure 61:
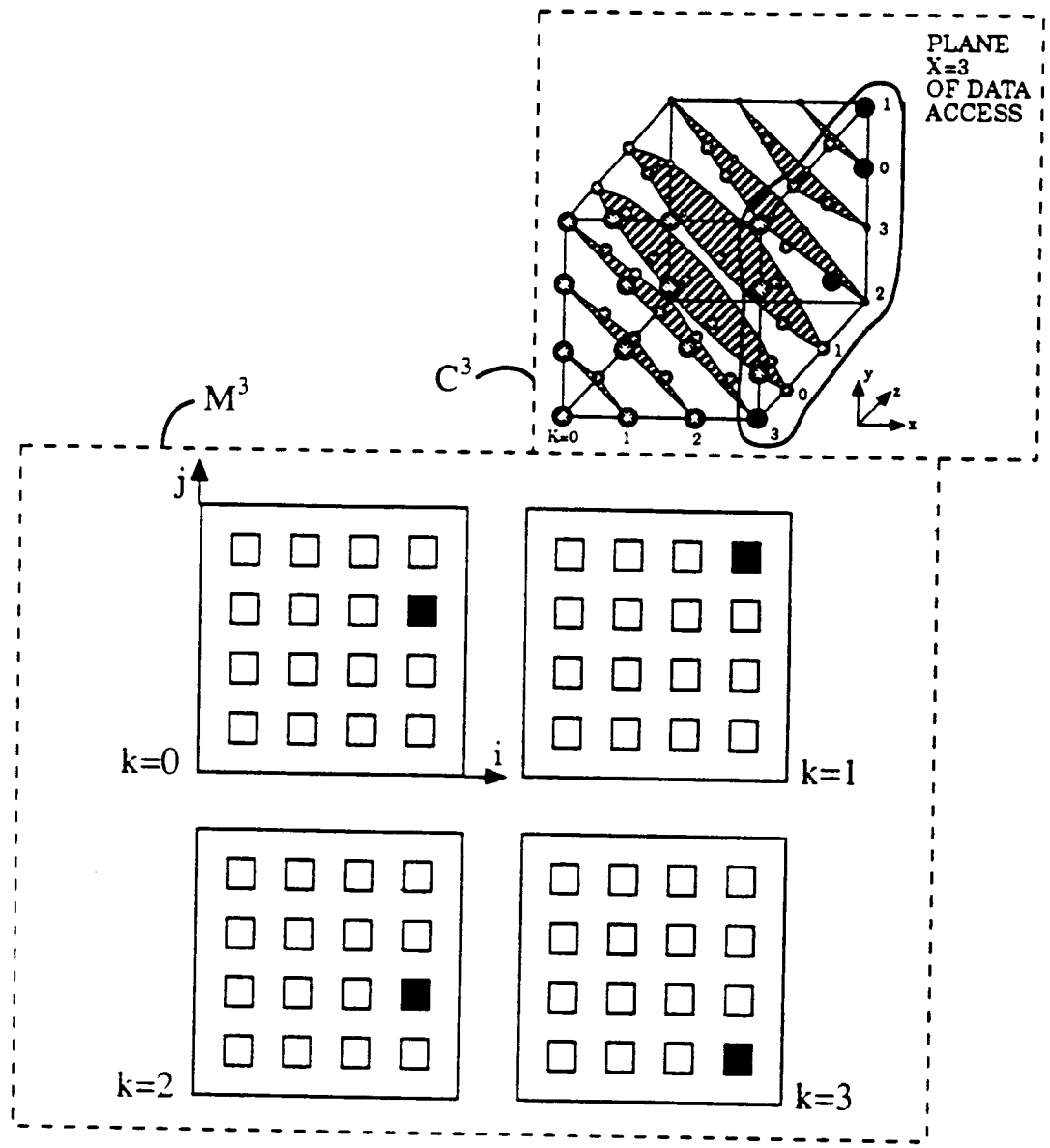

As illustrated in FIGS. 6G, 6H and 6I, N storage elements residing within a plane parallel to any one of the principal planes in $C^3$ space can be accessed by carrying out a parallel data access operation in a manner described below. In order to achieve such parallel memory storage access, a set of three computer routines illustrated in FIGS. 6A through 6C, are synchronously executed within the parallel computing system utilizing the coordination technique described in detail above. In this method of memory storage access, the computer routine executed by the user interface/display computing unit involves the user providing a Cartesian specification of the plane of memory storage elements to be accessed in the 3-D memory storage array. As illustrated in FIG. 6A, these Cartesian specifications CS will be selected from the second group of Cartesian parameters. These user-specified Cartesian parameters CS are transferred over the system bus to the control computing unit.

As illustrated in FIG. 6B, the computer routine executed by the control computing unit performs essentially the same Cartesian parameter reception and broadcasting functions, as well as the local computing unit coordinating function described hereinabove.

As illustrated in FIG. 6C, each k-th local computing unit involves synchronously receiving the broadcasted Cartesian parameters and then locally determining physical addresses. Thereafter, each k-th local computing unit uses its local bus to access the memory storage element m(i,j,k) specified by the locally determined physical address indices i,j in the k-th memory storage module. This operation is carried out in a coordinated manner by the array of local computing units so as to access the locally specified sequence of N memory storage elements confined within a plane defined by user-specified Cartesian parameters CS. Notably, for the case of a plane specified by Cartesian parameters CS=x, i=x, and each local computing unit is free to select any y or any z coordinate value. If a y coordinate value is selected, then j is known by the relation j=y. However, if a z coordinate value is selected, then the y coordinate value must be calculated using the linear deskewing formula y=(k-(x+x)) modN, and from this computed value j is determined. For use of a plane specified by Cartesian parameters CS=y, j=y and each local computing unit is free to select an x or z coordinate value. If an x coordinate value is selected, then physical address index i is known by the relation i=x. However, if a z coordinate value is selected, then x must be calculated using the linear deskewing formula x=(k-(y+z)) modN. For the case of a plane specified by Cartesian parameter CS=z, each local computing unit is free to select either an x or y coordinate and then to calculate the non-selected coordinate using linear deskewing formulas given above. Thereafter physical address indices i and j are determined using formulas i=x and j=y.

Figure 6J:
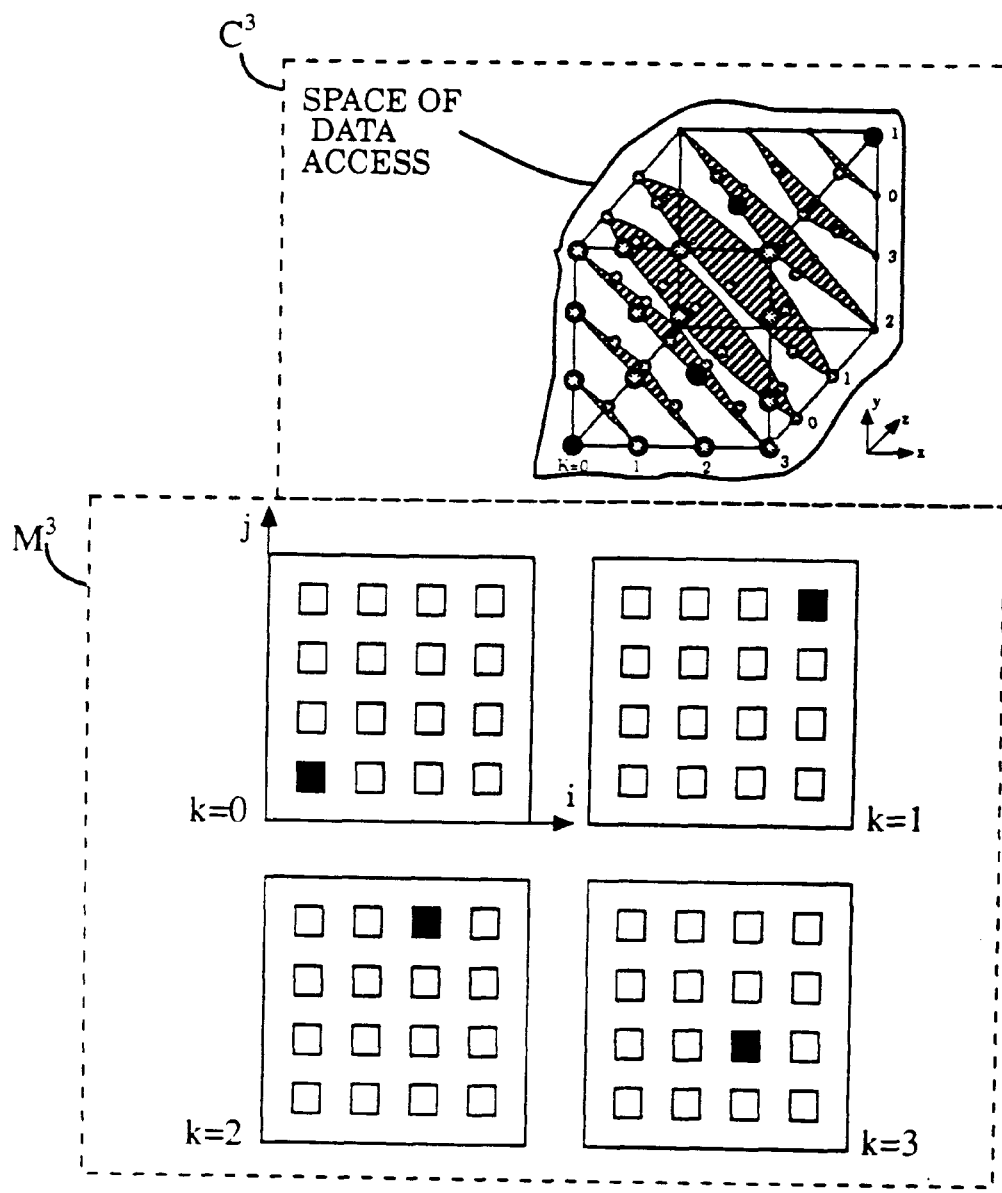
FIG. 6J is a schematic representation of the 4×4×4 memory storage array of FIG. 2, illustrating the access of four memory storage elements residing within the array in 3-D Cartesian Space $C^3$ and the location of these accessed memory storage elements in Physical Memory Storage Space $M^3$.

As illustrated in FIG. 6J, N memory storage elements residing within the 3-D array can be accessed by carrying out a parallel data access operation in the manner described below. In order to achieve such parallel memory storage access, a set of three computer routines illustrated in FIGS. 6A through 6C, are synchronously executed within the parallel computing system utilizing the coordination technique described in detail above. During this method of memory storage access, the computer routine executed by the user interface display computing unit does not involve the user specification. Instead, the specification of those N memory storage elements are selected by the local computing unit. Bypassing user specification input is achieved by the interface/display computing unit transferring a null set CS={0} to the control computing unit.

As illustrated in FIG. 6B, the computer routine executed by the control computing unit performs essentially the same Cartesian parameter reception and broadcasting functions, as well as the computing unit coordinating functions described hereinabove.

As illustrated in FIG. 6C, each local computing unit involves synchronously receiving the new broadcasted set of Cartesian parameters, and then freely selects any set of two Cartesian coordinate values, i.e., (x,y), (y,z), or (x,z). Using its selected set of Cartesian coordinates, each local computing unit computes physical address indices i and j in a manner described above. This operation is carried out in a coordinated manner by the array of local computing units so as to access the locally specified sequence of N memory storage elements extending through the 3-D memory storage of the parallel computing system.

In many applications, the user will either desire or require the ability to transfer or exchange data elements among 6-connected, 18-connected or 26-connected neighboring memory storage elements viewed from $C^3$ space. Examples of such applications include image processing of 3-D medical images, finite element analysis, physical simulations and the like. In addition, when working with massive amounts of data elements, there is also a great need to achieve such types of data transfer in a highly parallel fashion. Owing to the structure and function of the memory storage and accessing capability of the parallel computing system of the present invention, such parallel data transfers can be easily accomplished in a high speed fashion transparent to the user. In order to more fully appreciate the capability of the system, it will be helpful to discuss the relationships that hold between memory storage elements in $C^3$ space and $M^3$ space, and the data communication capabilities of the system which, together, provide the means for the data exchange mechanism among 6, 18 and 26 converted neighboring elements in $C^3$ space.

Figure 7A:
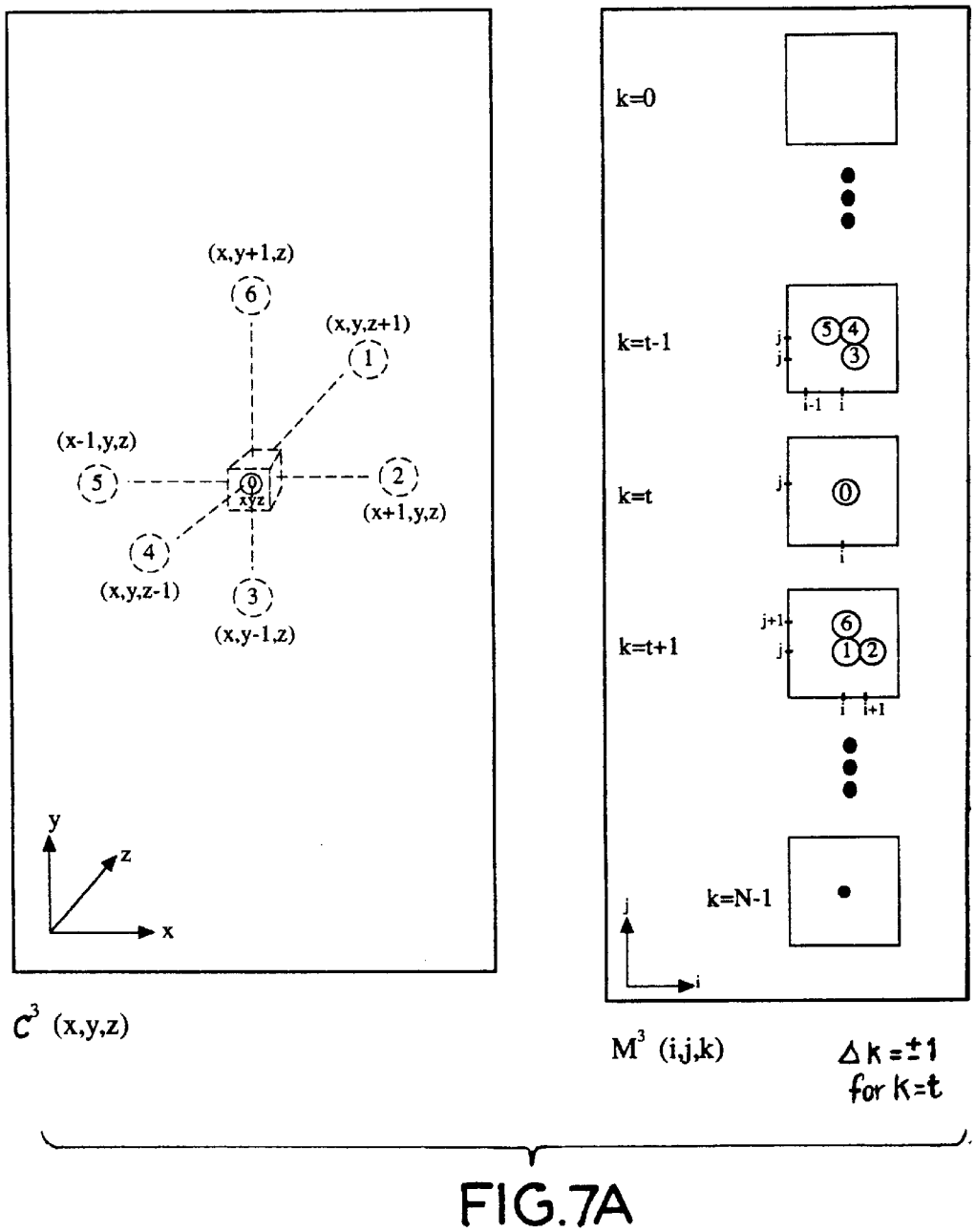
FIG. 7A is a schematic representation illustrating, in both 3-D Cartesian Space $C^3$ and physical memory space $M^3$, the location of a group of neighboring memory storage elements arranged in a 6-connected manner about a central memory storage element located at coordinates x,y,z in the 3-D memory array of the parallel computing system of the present invention.

In FIG. 7A, a schematic representation is provided in order to illustrate the relationship between (i) the location (i.e. position) of 6 connected neighboring memory storage elements in $C^3$ space and (ii) the physical addresses of corresponding memory storage elements in $M^3$ space. As shown, the "central" memory storage element m(x,y,z) in $C^3$ space, has in $M^3$ space a physical storage location m(i,j,k) in memory storage module k=t, with physical address i=x and j=y therein. Notably, all of 6-connected neighboring memory storage elements have in $M^3$ space, physical memory storage locations in two memory storage modules k=t+1 physically neighboring and k=t-1. Transferring data elements from any one of these 6-connected neighboring memory storage elements to the central memory storage element, or vice versa, can be achieved using either the local data transfer network or the global data transfer network described above. When using the local data transfer network, the initiation for the data transfer will originate with the local computing unit associated with the (k=t)th local memory storage module, and the local data transfer about this central memory storage module can occur entirely independent of all other local computing units. Alternatively, when the global data transfer network is used, the initiation for the data transfer will originate from the control computing unit and will result in a uniform data transfer involving each and every local computing unit as hereinbefore described.

Figure 7B:
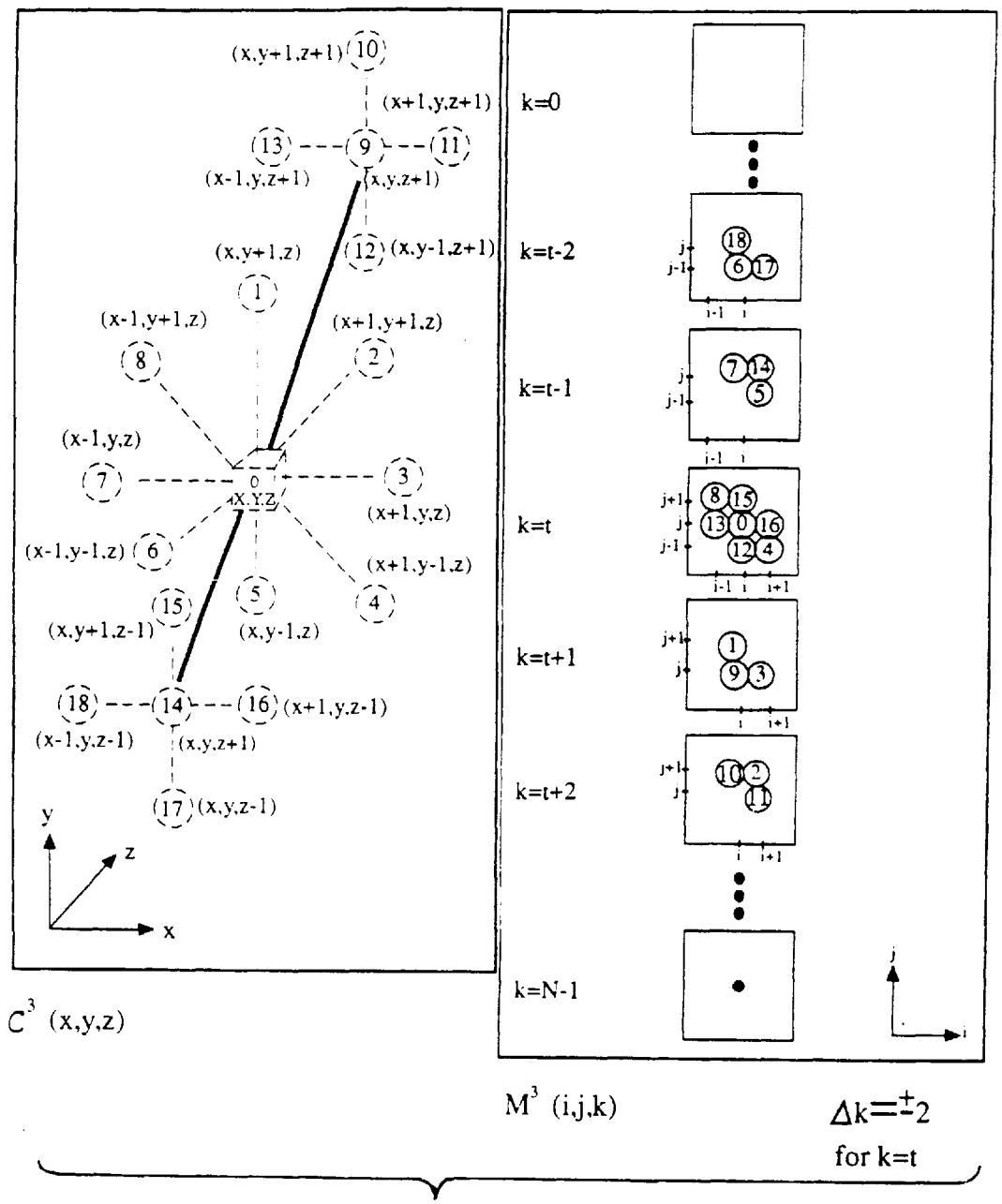
FIG. 7B is a schematic representation illustrating, in both 3-D Cartesian Space $C^3$ and Physical Memory Storage Space $M^3$, the location of a group of neighboring memory storage elements arranged in a 18-connected manner about a memory storage element located at coordinates x,y,z in the 3-D memory storage array of the parallel computing system of the present invention.

In FIG. 7B a schematic representation is provided in order to illustrate the relationship between (i) the location (i.e., position) of 18-connected neighboring memory storage elements in $C^3$ space and (ii) the physical addresses of corresponding memory storage elements in M3 space. As shown, the "central" memory storage element m(x,y,z) in $C^3$ space has in $M^3$ space, a physical storage location m(i,j,k) in memory storage module k=t, with physical address i=x and j=y therein. Notably all of 18-connected neighboring memory storage elements have in $M^3$ space, physical memory storage locations in four physically neighboring memory storage modules k=t±1 and k=t±2. Transferring data elements from any one of these 18-connected neighboring memory storage elements to the central memory storage element, or vice versa, can be achieved using either local data transfer network or the global data transfer network as described above.

In FIG. 7C a schematic representation is provided in order to illustrate the relationship between (i) the location (i.e., position) of 26-connected neighboring memory storage elements in $C^3$ space and (ii) the physical addresses of corresponding memory storage elements in $M^3$ space. As shown, the "central" memory storage element m(x,y,z) in $C^3$ space has in $M^3$ space, a physical storage location m(i,j,k) in memory storage module k=t with physical address i=x and j=y therein. Notably all of 26-connected neighboring memory storage elements have in $M^3$ space, physical memory storage locations in six physically neighboring memory storage modules k=t±1, k=t±2 and k=t±3. Transferring data elements from any one of these 6-connected neighboring memory storage elements to the central memory storage element, or vice versa, can be achieved using either local data transfer network or the global data transfer network as described above.

Figures 8, 8A:
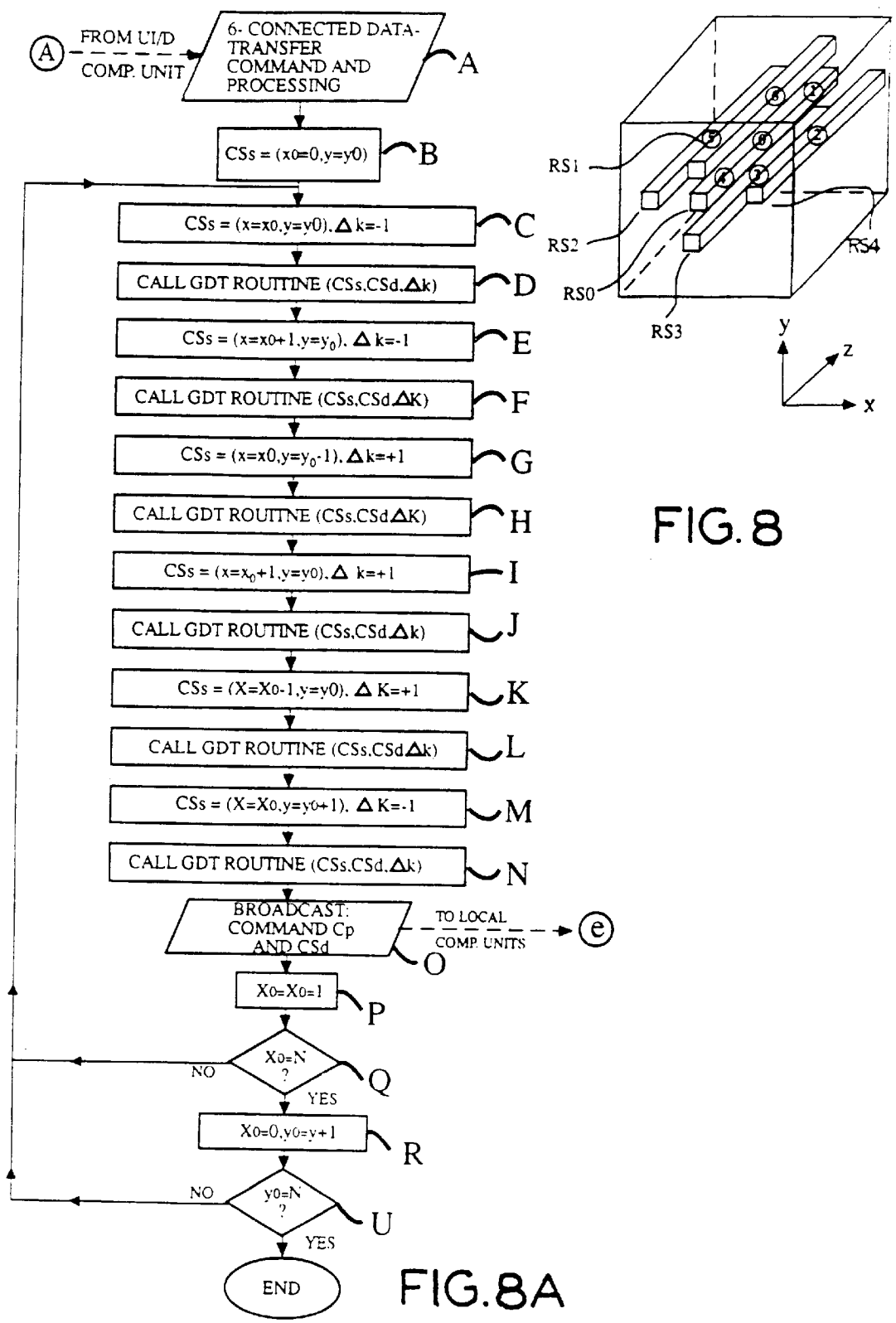
FIG. 8 is a schematic representation of the 3-D memory storage array of the parallel computing system in Cartesian Space $C^3$, in which 6-connected neighboring memory storage elements about the central memory storage elements lying along a Cartesian specified rectilinear sequence RS0, are accessed and data elements therein transferred to each such central memory storage element using the global data transfer network of the parallel computing system of the present invention.
FIG. 8A is a flow chart of the control computer routine executed by the control computing unit in order to coordinate the local computing units and control the global data transfer mechanism so as to achieve global data transfer among 6-connected neighboring memory storage elements, as illustrated in FIG. 8.

Referring now to FIGS. 8 through 8D, a method will be described for globally transferring data elements among 6-connected neighboring memory storage elements and their N "central" memory storage elements residing along a beam in $C^3$ space. As will be illustrated hereinafter, this method can be carried out $N^2$ times, to exchange 6-connected data elements throughout the entire 3-D memory storage array. The object of this operation is to transfer in parallel data elements accessed from 6-connected neighboring memory storage elements, to their N associated "central" memory storage elements reading along a specified beam, so that each local computing circuit associated with one of the "central" memory storage elements along the beam can access the "6-connected" data elements for processing.

As illustrated in FIG. 8, the N "central" memory storage elements reside along a beam (i.e. rectilinear sequence) which is designated as RS0. In the present example illustrated, this central beam can be specified by Cartesian parameters CS=(x,y). The N neighboring memory storage elements which reside along the beam specified by Cartesian parameters Cs=(x,y+1) is designated as RSI. The N neighboring memory storage elements which reside along the beam specified by Cartesian parameters CS=(x−1,y), is designated as RS2. The N neighboring memory storage elements which reside along the beam specified by Cartesian parameters CS=(x,y−1), is specified as RS3. The N neighboring memory storage elements which reside along the beam specified by Cartesian parameters CS=(x+1, y) is specified as RS4. Lastly, the neighboring memory storage elements which reside along the central beam RS0, are specified by the same Cartesian parameters CS=(x,y).

The 6-connected type global data exchange process of the present invention will be described with reference to FIGS. 4 and 8A through 8D. As indicated at Block A of FIG. 8A, the user interface/display unit executes a computer routine to provide a command which initiates the 6-connected global data exchange process and the specific data processing operation to be performed at each of the local computing units associated with each "central" memory storage elements in $C^3$ space. As indicated at block B in FIG. 8A, the central computing unit initializes the coordinate variables x,y0 which specify the central memory storage elements m(x0,y0) residing along the beam RS0. As the central memory storage elements m(x0,y0) are where neighboring data elements are to be transferred (i.e., collected), location of these central memory storage elements are specified by Cartesian parameters $CS_d$, as hereinbefore described. Notably, as data elements are to be transferred from 6-connected neighboring memory storage elements m(x,y) to the local computing units associated with central memory storage elements m(x0,y0), the location of the neighboring memory storage elements along each beam are specified by a different set of Cartesian parameters $CS_s$=(x,y) as hereinbefore described. As will be explained below, Cartesian parameters $CS_s$ for source beams RS1, RS1, RS2, RS3 and RS4 will change each time the central destination beam RS0 is changed, during each of the $N^2$ cycles in the 6-connected global data exchange process.

As indicated at Block C, the central computing unit sets the Cartesian parameters to be $CS_s$=(x=x0, y=y0) and ▲k=−1 in order to achieve a global data transfer from neighboring memory storage elements m(x,y) along central beam RS0. Then, as indicated at Block D, the control computing unit calls from its program memory, the global data transfer (GDT) routine of FIG. 5B described in great detail above, which in turn initiates the GDT subroutine of FIG. 5C carried out in the array of local computing units. At this stage, the Cartesian parameters $CS_s$ and $CS_d$ are passed to the GDT routine in the control computing unit and ▲k is passed to global data transfer mechanism as part of the execution of the global data transfer routine for source and destination beams RS0 and RS0.

As indicated at Block E, the central computing unit sets the Cartesian parameters to be $CS_s$=(x=x0+1, y=y0) and ▲k=−1 in order to achieve a global data transfer from neighboring memory storage elements m(x,y) along central beam RS0. Then, as indicated at Block F, the control computing unit calls from its program memory the global data transfer (GDT) routine of FIG. 5B described in great detail above, which in turn initiates the GDT subroutine of FIG. 5C carried out in the array of local computing units. At this stage, Cartesian parameters $CS_s$ and $CS_d$ are passed to the GDT routine in the control computing unit and ▲k is passed to global data transfer mechanism as part of the execution of the global data transfer routine for source and destination beams RS4 and RS0.

As indicated at Block G, the control computing unit sets the Cartesian parameters to be $CS_s$=(x=x0, y=y0−1) and ▲k=+1 in order to achieve a global data transfer from neighboring memory storage elements m(x,y) along central beam RS0. Then, as indicated at Block H, the control computing unit calls from its program memory, the global data transfer (GDT) routine of FIG. 5B described in great detail above, which in turn. initiates the GDT subroutine of FIG. 5C carried out in the array of local computing units. At this stage, Cartesian parameters $CS_s$ and $CS_d$ are passed to the GDT routine in the control computing unit and ▲k is passed to global data transfer mechanism as part of the execution of the global data transfer routine for source and destination beams RS3 and RS0.

As indicated at Block I, the central computing unit sets the Cartesian parameters to be $CS_s$=(x=x0, y=y0) and ▲k=+1 in order to achieve a global data transfer from neighboring memory storage elements m(x,y) along central beam RS0. Then, as indicated at Block J, the control computing unit calls from its program memory the global data transfer (GDT) routine of FIG. 5B described in great detail above, which in turn initiates the GDT subroutine of FIG. 5C carried out in the array of local computing units. At this stage, Cartesian parameters $CS_s$ and $CS_d$ are passed to the GDT routine in the control computing unit and ▲k is passed to global data transfer mechanism as part of the execution of the global data transfer routine for source and destination beams RS0 and RS0.

As indicated at Block K, the central computing unit sets the Cartesian parameters to be $CS_s=(x=x0-1, y=y0)$ and $\blacktriangle k=+1$ in order to achieve a global data transfer from neighboring memory storage elements $m(x,y)$ along central beam RS0. Then, as indicated at Block L, the control computing unit calls from its program memory, the global data transfer (GDT) routine of FIG. 5B described in great detail above, which in turn initiates the GDT subroutine of FIG. 5C carried out in the array of local computing units. At this stage, the Cartesian parameters $CS_s$ and $CS_d$ are passed to the GDT routine in the control computing unit and $\blacktriangle k$ is passed to global data transfer mechanism as part of the execution of the global data transfer routine for source and destination beams RS2 and RS0.

As indicated at Block M, the central computing unit sets the Cartesian parameters to be $CS_s=(x=x0, y=y0+1)$ and $\blacktriangle k=-1$ in order to achieve a global data transfer from neighboring memory storage elements $m(x,y)$ along central beam RS0. Then, as indicated at Block N, the control computing unit calls from its program memory the global data transfer (GDT) routine of FIG. 5B described in great detail above, which in turn initiates the GDT subroutine of FIG. 5C carried out in the array of local computing units. At this stage, the Cartesian parameters $CS_s$ and $CS_d$ are passed to the GDT routine in the control computing unit and $\blacktriangle k$ is passed to global data transfer mechanism as part of the execution of the global data transfer routine for source and destination beams RS1 and RS0.

When the steps indicated at Blocks C though N are completed, data elements from all 6 connected neighboring memory storage elements are collected by the local computing units associated with the central memory storage elements along the beams specified by the Cartesian parameters $CS_d=(x_0=0, y_0=0)$. Then as indicated at Block O in FIG. 8A, the control computing unit broadcasts the required processing command $C_p$ over the system bus to the local computing units. The effect of this command is to initiate the subroutine of FIG. 8B in which the local computing units process in a coordinated manner, the collected data available to the local computing units associated with the central memory storage elements along the beam specified by the current Cartesian parameters $CS_d$. Optimally, the results of these local computations can be buffered in the main memory of the local computing units stored locally in the local memory storage modules for future use, or be used to update the data element stored within the central memory storage elements along the beam.

Figure 8B:
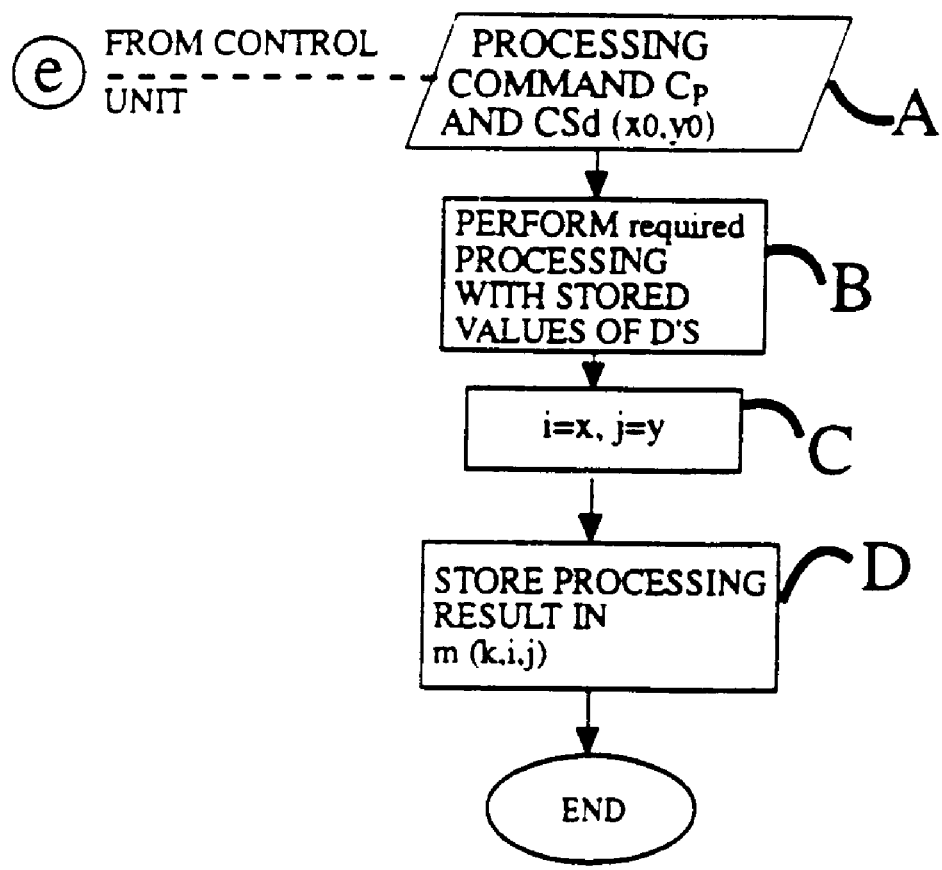
FIG. 8B is a flow chart of the global data transfer routine of FIG. 8A, executed by the control computing unit in order to coordinate the local computing units to transfer data elements from local memory storage modules onto the local buses, control the global data transfer mechanism to achieve uniform data element shifts along the local buses, and to transfer the shifted data elements back to the local memory storage modules.

As illustrated in FIG. 8B, the subroutine executed by each of the local computing units involves performing an operation having four basic steps. As indicated at Block A, each local computing unit receives the broadcasted processing command $C_p$ and Cartesian parameters $CS_d=(x_0,y_0)$. At Block B, each local computing unit performs the required processing operation upon the collected data set to obtain a computed result. At Blocks C and D of the illustrated embodiment, each local computing unit locally determines the physical addresses i and j, accesses memory storage element $m(i,j,k)$ and stores therein the computed result. Alternatively, the computed result may be stored in the main memory of the local computing unit.

As indicated at Block P in FIG. 8A, the central computing unit increments by +1, the $x_0$ coordinate of the Cartesian parameters $CS_d$ which specify the location of the central memory storage elements along the destination beam RS0 for the subsequent 6-connected global data exchange cycle. As indicated at Block Q, so long as $x_0$ is less than N, the control computing unit proceeds to Block C, and then performs the above-described steps indicated at Blocks C through O then at Block P, the central computing unit increments by +1 the $x_0$-coordinate of the Cartesian parameters $CS_d$. As indicated at Blocks Q and R, when $x_0$ eventually equals N, the control computing unit resets the $x_0$ coordinate (i.e. $x_0=0$) and increments by +1 the $y_0$ coordinate of the Cartesian parameters $CS_d$. As indicated at Block U, so long as $y_0$ is less than N, the control computing unit proceeds to Block C and then performs the steps indicated at Blocks C through R. When $y_0$ eventually equals N, the control computing unit ceases the process as the 6-connected global data exchange throughout $C^3$ has been completed.

In order to appreciate the wide variety of applications in which the parallel computing system of the present invention can be employed, it will be helpful to consider the various types of data which each "data element" may represent. In general, these data types can be grouped into at least five principal classes: (i) scaler type data; (2) vector type data; (3) hybrid vector/scaler; (4) purely numeric type data and (5) symbolic type data such as alphanumeric character and strings thereof.

Typically, the type of data which any particular data element represents will depend on the particular application at hand. For example, when connected with visually modelling of objects in 3-D space, each individual data element in $C^3$ space may be of either the scaler, vector or hybrid vector/scaler type. When color, density, transparency and other attributes of objects are to be represented in $C^3$ space and subsequently displayed, scaler data will be used. Also, when the vector or directional properties of objects in $C^3$ space are to be represented, vector data will be used. When both such types of properties are to be represented, then hybrid vector/scaler type data will be used.

When concerned with finite element modelling (FEM), each individual data element in $C^3$ space will be of the hybrid. vector/scaler type in order to represent the material structure at specific points in space, as well as the acting forces at those points.

When concerned with purely numerical applications, such as financial analysis where spatial interpretation is not a represented attribute of the data each individual data element in $C^3$ space will be of the purely numeric type. In such cases, the 3-D organization of such type of data elements will be solely for the purpose of efficient data storage, accessing and processing.

When concerned with symbolic applications, such as storage, retrieval and analysis of textually demonstrable information, (e.g. alphanumeric strings) and recorded speech in $C^3$ space, each individual data element will be of the symbolic data type. In such cases as well, the 3-D organization of such type of data elements will be solely for the purpose of efficient data storage, accessing and processing.

Understandably, there will be at times applications in which combinations and subcombinations of the above-described data element type will be required in order to suitably represent and process real and virtual objects alike within the parallel computing system of the present invention.

In general, five principal classes of data elements described above may be provided by either an external source or generated within the parallel computing system by the voxel computing units. For example, scaler type data, such as volume element (i.e. local data) can be generated by a 3-D medical scanner such as a CAT or NMR Scanner. For a detailed discussion regarding the nature of voxel data and the various uses in 3-D volume organization applications, reference can be made to Applicants prior to U.S. Pat. No. 4,985,856 entitled Method and Apparatus of Storing, Accessing and Processing Voxel-based data. Alternatively, as will be described in detail hereinafter, voxel-based images of 3-D objects in $C^3$ space can be generated within the parallel computing system hereof using a "parallel voxelization process".

Similarly, vector and hybrid vector/scaler type data elements can be generated within a separate, external computer graphics workstation interfaced with parallel I/O unit 25, and then loaded into the 3-D memory storage array under the control of the control computing unit. Alternatively, such types of data elements can be generated within the parallel computing system of the present invention.

Figure 9A:
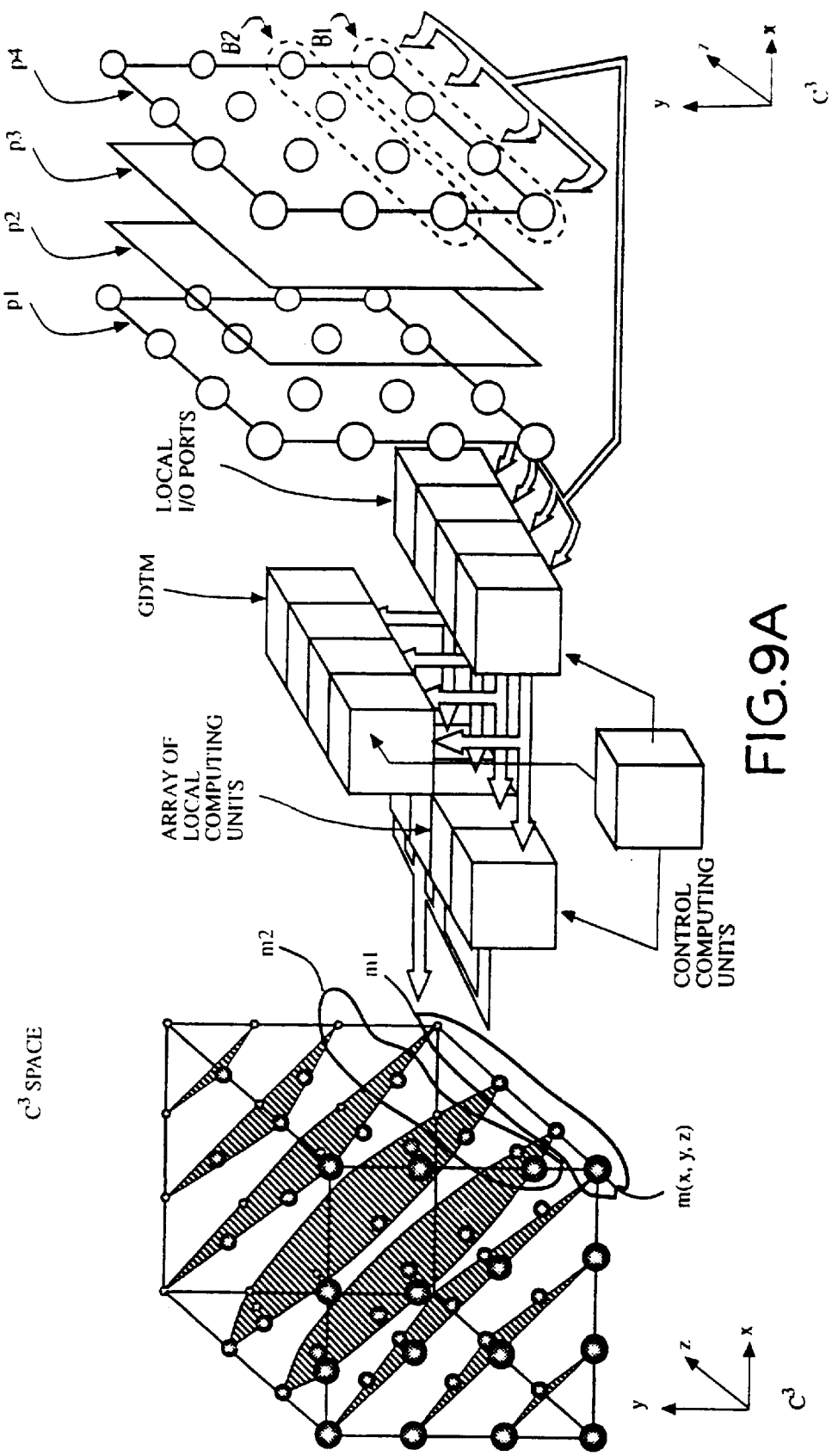
FIG. 9A is a schematic diagram of the parallel computing system of the present invention, interfaced with an external data storage device for storage of voxel and/or pixel data.
Figure 9B:
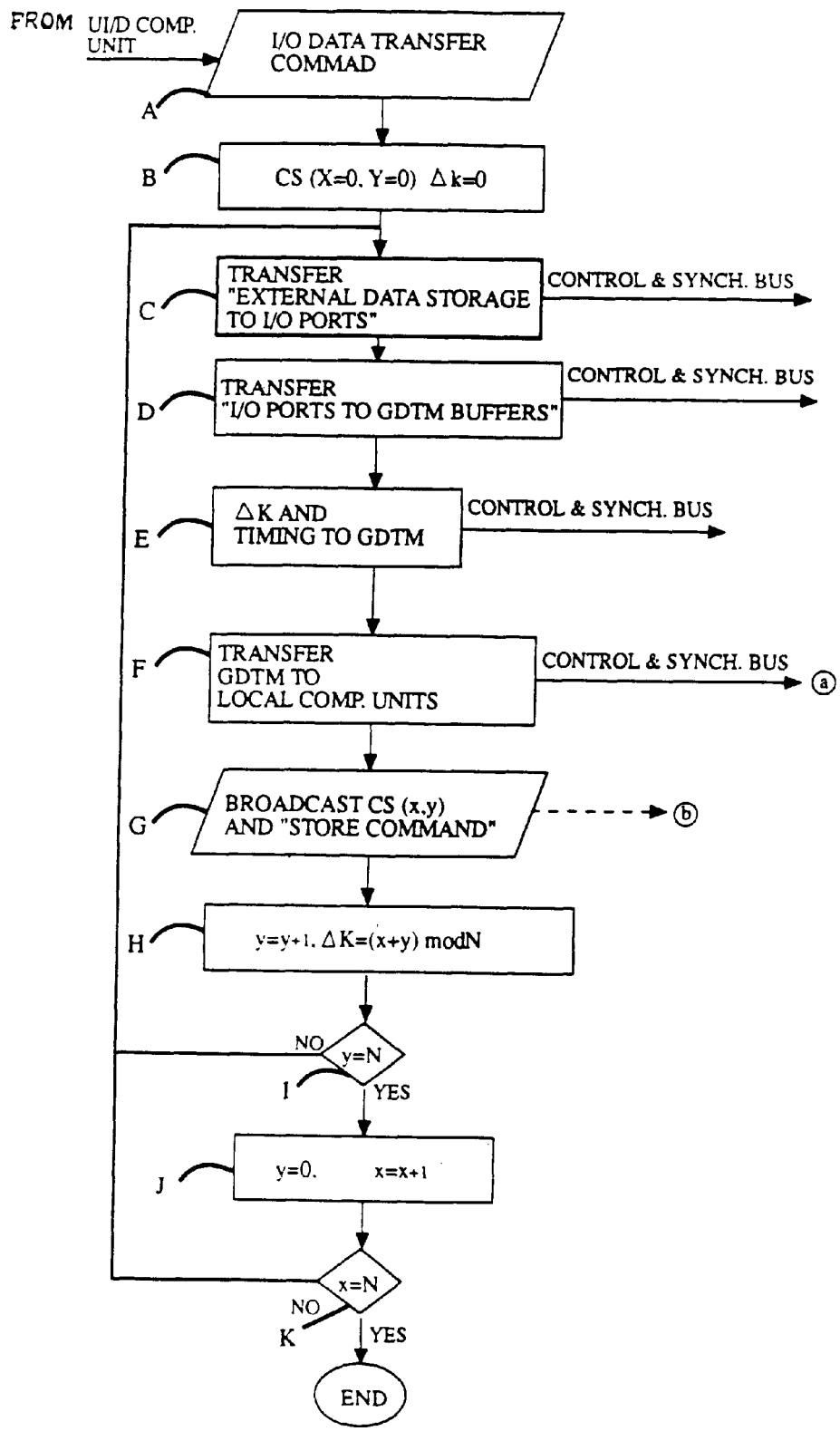
FIG. 9B is a high level flow chart of the control computer routine executed by the control computing unit in order to transfer voxel data from an external data storage system to the parallel computing system of the present invention.

When desiring to process voxel-based 2-D images using the parallel computing system of the present invention, it is necessary to first load such image data on to the 3-D memory storage array. Typically, a plurality of 2-D voxel images will be provided to provide a 3-D representation of an object, typically of medical concern. Each such image will have been taken of a cross-section of the object and will be indexed with respect to a 3-D coordinate system typically embedded within the medical scanner. In order to transfer the data elements of those voxel image planes into the 3-D memory storage array of the parallel computing system, and at the same time preserve the spatial relationship of the voxels, a special data transfer process illustrated in FIGS. 9A and 9B is employed. As shown, this process involves the use of the parallel I/O unit, the global data transfer mechanism, the array of local computing units and the control computing unit.

As schematically illustrated in FIG. 9A, the rectilinear sequence of N voxels $(V(x,y,z)_N$ residing in a beam $B_1$ in voxel image plane $P_4$ are accessed from an external buffer (not shown) by controller 36 in the I/O unit, and then buffered in the N local I/O buffer ports thereof. As illustrated, each k-th local computing unit can access the voxel in the k-th I/O buffer port and then access memory storage element $m(i,j,k)$ corresponding to $m(x,y,z)$ along beam $M_1$, in $C^3$ space, as each such memory storage element is contained within the local memory storage module of the k-th local computing unit. However, when the N voxels residing in beam $B_2$ in voxel image plane $P_4$ are buffered in the N local I/O buffer ports of the I/O unit, and each k-th local computing unit accesses the local I/O buffer port, the k-th local computing unit is unable to access memory storage element $m(i,j,k)$ corresponding to $m(x,y,z)$ along beam $M_2$ in $C^3$ space, as each such memory storage element is not contained within the local memory storage module of the k-th local computing unit, owing to the fact of the linear skewing scheme employed in the memory storage and accessing system of the present invention. Notably, however, voxels of each beam B in the 3-D image can be properly transferred to its spatially correct memory storage element location in $C^3$ space of the 3-D memory storage array by first uniformly shifting each voxel in each beam a predetermined module distance ▲k using the global data transfer mechanism, and then move the shifted beam of voxels into its spatially correct beam of memory storage elements in the 3-D memory storage array. The specific operations of this data transfer process will be described below with reference to FIGS. 9A and 9B.

As indicated at Block A in FIG. 9B, the user interface/display computing unit sends an I/O data transfer command $C_{I/O}$ over the system bus to the control computing unit. As indicated at Block B, the control computing unit responds to this command by initializing the Cartesian parameter CS= (x=0, y=0) and module distance ▲k=0. Notably, Cartesian parameters CS specify both the location of the beam of voxels in the 3-D image relative to a coordinate system isometric with the internal coordinate system of $C^3$ space.

Also, Cartesian parameters CS=(x,y) specify the location of the beam of memory storage elements in $C_3$ space into which the beam of similarly specified voxels are to be transferred.

Figure 9C:
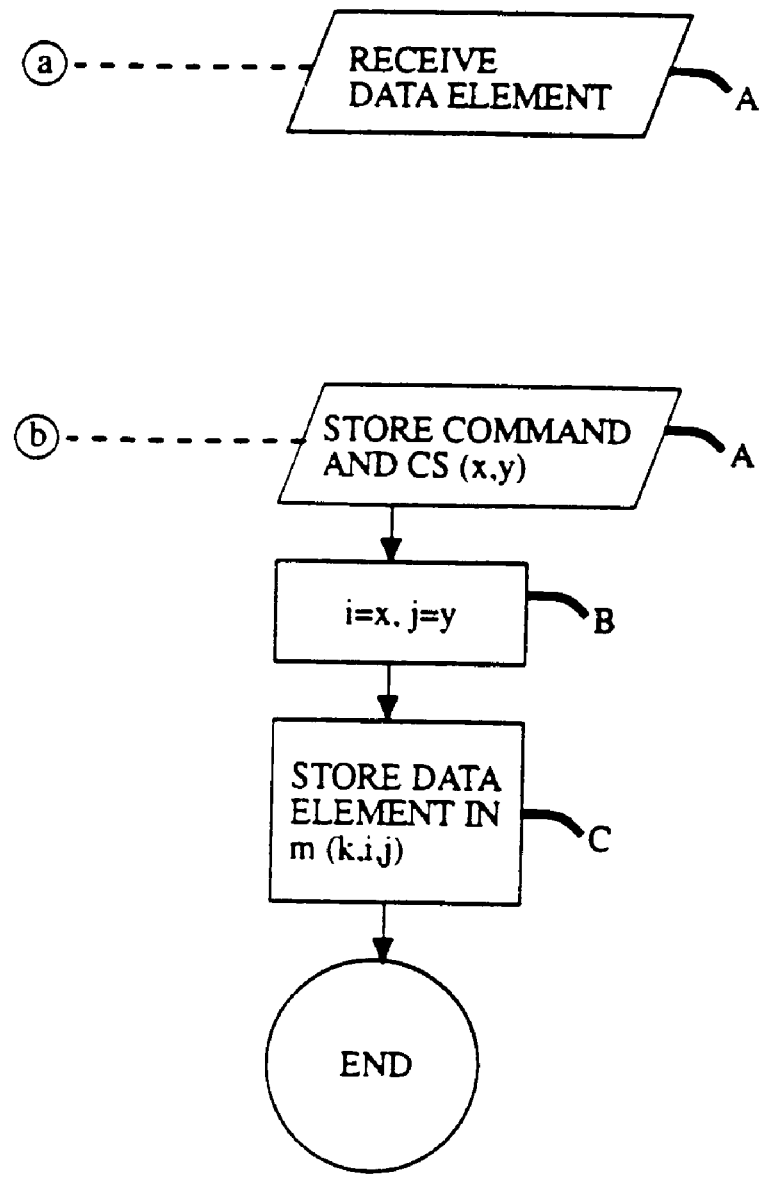
FIG. 9C is a high level flow chart of the local computing routine executed by each local computing unit during the control computer routine of FIG. 9A.

As indicated at Block C, the control computing unit sends control signals over the control and synchronization bus to the I/O controller in order to initiate an input of beam of voxels with the N local I/O buffer ports of the I/O unit. At Block D, the control computing unit sends a control signal to the local I/O buffer ports and the control logic circuitry of the global data transfer mechanism to move the beam of voxels from the local I/O buffer ports to the I/O buffer circuits of the global data transfer mechanism. Then at Block E, the control computing unit sends over the control and synchronization bus, timing control signals and module distance ▲k to the global data transfer mechanism. In response, the global data transfer mechanism executes the global data shift upon the buffered voxel beam. At Block F, the control computing unit sends control signals over the control and synchronization bus to the global data transfer mechanism and the local computing units in order to transfer the uniformly shifted voxel to the local computing units. The subroutine performed by each of the local computing units during this step is illustrated in FIG. 9C. Finally, at Block G, the Control computing unit broadcasts Cartesian parameters CS=(x,y) and data store command to the local computing units so as to store the voxel beam in the memory storage elements along the beam in $C_3$ space specified by Cartesian parameters CS. At this stage, the first voxel beam of the 3D voxel image is successfully loaded with the 3-D memory storage array.

As indicated at Block E, in order to successively load the next voxel beam into the 3-D memory storage array, the control computing unit increments by +1 the y coordinate of Cartesian parameters CS=(x,y), and then calculates the required module distance (i.e. shift) ▲k according to the formula ▲k=(x+y)modN. Thereafter, the control computing unit determines at Block F whether the y coordinate is less than N. If so, then the control computing unit proceeds to Block C, and executes the steps in Blocks C through F to load the second voxel beam of the 3-D image into the 3-D memory storage array. As indicated at Block G, when the y coordinate equals N, all voxel beams in plane z=0 have been loaded and then the y coordinate is initialized to zero and y coordinate is incremented by +1. Then as indicated at Block H, the control computing unit determines whether the x coordinate is less than N. If so, then the control computing unit proceeds to Block C and executes the steps in Blocks C through H, thereby loading the second voxel beam in plane z=1. As indicated at Block H, when all voxel beams in plane z=1 have been loaded, then the $x_o$ coordinate is incremented by +1. This process continues in a recursive fashion until all $N^3$ voxel beams in the N×N×N voxel image have been loaded into the 3-D memory storage array.

There are voxel and other type of data that can be provided to the 3-D memory storage array of the parallel computing system utilizing mechanisms other than the parallel I/O data input described above.

In general, each local computing unit in the array can generate data elements in accordance with a specified set of rules and then stored in local memory storage modules in a parallel manner. In volume visualization applications, 3-D voxel-based images of geometrically represented objects can be generated within the parallel computing system of the present invention according to the method described below. As will become evident, this detailed description, beams of N voxels within the voxel-based image can be generated and stored within the 3-D memory storage array in a highly parallel fashion, in marked contrast to prior art 3-D voxelization (i.e., scan-conversion) techniques characteristic of prior art methodologies. Examples of such prior art scan-conversion methodologies are described in U.S. Pat. Nos. 5,038,302 and 4,987,554 to Kaufman.

The parallel voxelization method of the present invention provides voxel-based representation of objects with complete volumetric information about their inner structure and properties. In the illustrated embodiment, the size of each voxel is preferably at least 32 bits, although each such data element can be extended in length so as to permit representation of parameters which occupy preselected roles in a modelling system having a preselected level of representation. For example, when simulating the behavior of particles within a volume of space and each such voxel represents the state of a localized region therein, a selected number of bits in each voxel data element can be assigned to represent a parameter used to specify the state at each point in space. Typically, the value of each such state will be of one or more dimensions to suitably model (i.e. describe and predict) the general behavior and interaction between each of the elements comprising the system. In such a memory organization, it is possible to create a plurality of different data bases, each being represented at different ranges of physical bit levels within the 3-D memory storage array. When it is time to update any particular database storing information pertaining to a particular type of knowledge within, for example, a particular modelling system, the memory storage and accessing system can physically address specific bits associated with physical addresses i and j within each local memory storage module. In this way, the bits associated with particular parameters in a simulated modelling system can be easily accessed, utilized and subsequently updated in a highly parallel fashion. Exploitation of this aspect of the present invention will become readily apparent to those with ordinary skill in developing and using parallel computing systems for simulation of diverse types of physical and virtual processes.

Figure 10A:
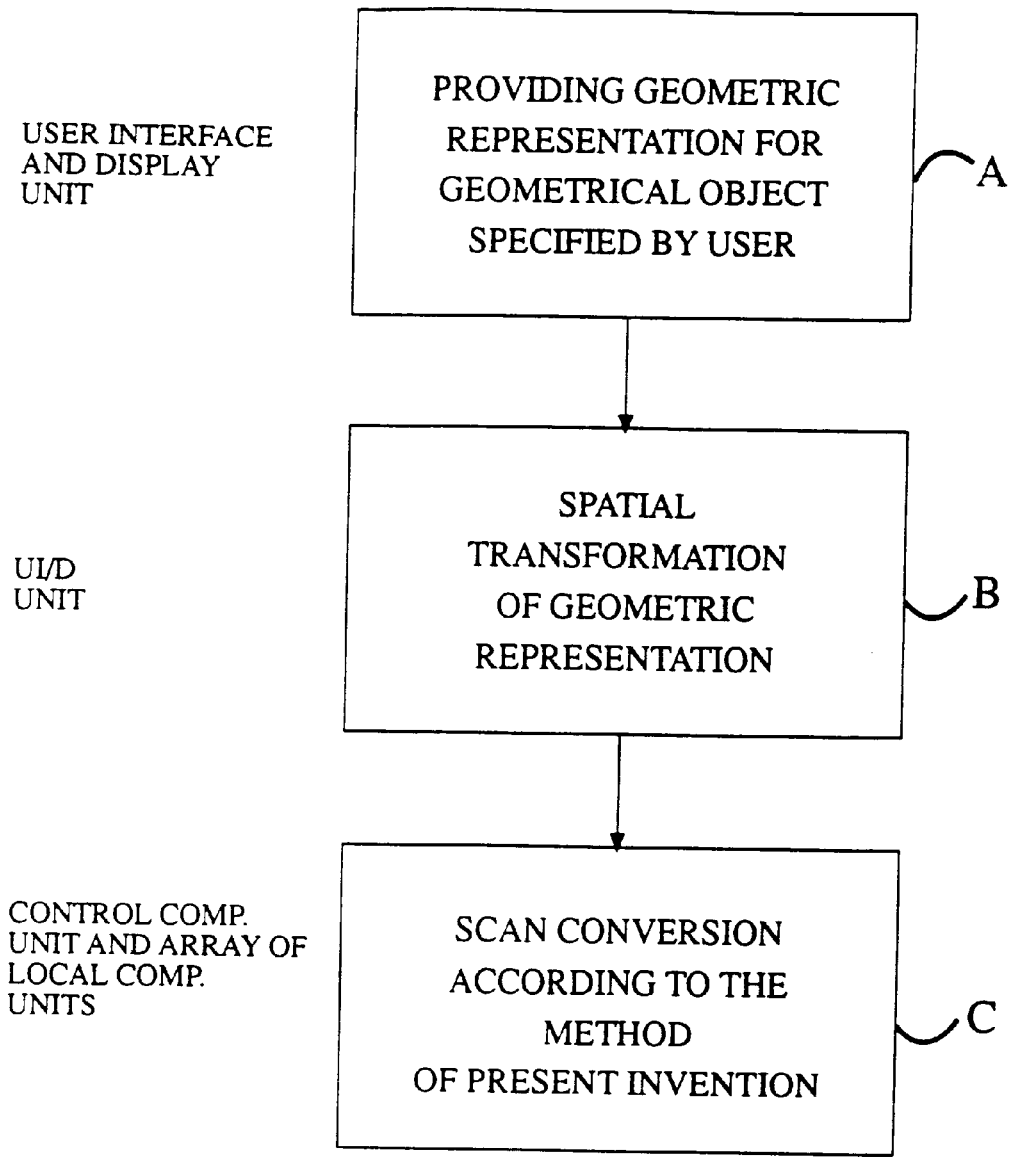
FIG. 10A is a high level flow chart for voxelizing 3-D geometrical objects using the parallel computing system of the present invention.

As illustrated in FIG. 10A, the parallel voxelization process of the present invention comprises four major steps which can be readily carried out on the parallel computing system of the present invention.

As indicated at Block A in FIG. 10A, the first step of the method involves the user, interface/display computing unit specifying the 3-D geometrical object to be voxelized. In general, the specification of the 3-D geometrical object, represented in $C^3$ space, is expressed in terms of a list of 3-D geometrical primatories and Boolean sets thereof, which are characterized by mathematical expressions and parameters well known to these skilled in the geometrical modelling art. In order to visualize and analyze a 3-D geometrical object represented by a list of such primatives, the method of the present invention involves each such primative is expressed, in the preferred embodiment in the form of an "implicit" equation. In the embodiment, where primative objects are surfaces, such implicit equations are selected to be of the general form:

$$V(x,y,z)=Ax^2+By^2+Cz^2+Dxy+Eyz+Fxz+Gx+Hy+Iz+J=O$$

which defines a family of quartic surfaces defined in $C^3$ space. However, it is understood that in other embodiments, other types of implicit surface equations may be used. Each geometrical primitive can be expressed in terms of the implicit surface equation by setting particular coefficients therein equal to certain valves. For example, a unit sphere centered at x=0, x=0, and z=0, can be mathematically represented by a graphic representation, in which coefficients A=B=C=–J=j and all other remaining coefficients are equal to zero. Similarly, a general plane primative can be represented by a quannatic expression in which coefficients A through F are equal to zero. Quadric expressions for diverse types of geometric primatives are discussed in detail in the proper "objects composed of quadric systems" by J. Levin, published in Volume 19, No. 10 of the communications of ACM, 1976. By simply combining one or more quadric expressions, complex 3-D geometrical objects can be represented in this mathematical format.

Alternatively, the quadric representation V(x,y,z) above can be expressed in the form:

$$v(x,y,z)=P*Q*P^T=0,$$

Where:

$$Q = \begin{vmatrix} A & D & F & G \\ D & B & E & H \\ F & E & C & I \\ G & H & I & J \end{vmatrix} = T*Q^1$$

$$Q' = \begin{vmatrix} A' & D' & F' & G' \\ D' & B' & E' & H' \\ F' & E' & C' & I' \\ G' & H' & I' & J' \end{vmatrix},$$

and Vector $P = |\; X \quad Y \quad Z\; |$

Notably, matrix Q is a spatial transformed matrix and contains all of the coefficients of the quadric representation defined above, and represents an implicit surface equation. As indicated at Block B in FIG. 10A, any particular translation of rotation of the surface defined by Matrix Q can be achieved by multiplying the matrix Q' by a transformation matrix T. To obtain matrix Q, which represents the desired implicit surface presentation, the nature of the matrix T is described by J. Levin, supra, and is widely known to those skilled in the geometrical modelling art.

In order to define solid geometrical objects consisting of solid primatives, implicit surface of representation V(x,y,z)=0 above is replaced by the inequalities, V(x,y,z)<0 or V(x,y,z)>0, to define implicit sold volumes bounded by implicit surfaces, termed half-spaces.

As indicated at Block B of FIG. 10A, the coefficient A through J representing V(x,y,z) and color and attributes of the geometrical object are passed from the user interface/display computing unit to the control computing unit; and are then broadcasted over the system bus to each of the local computing units, where they buffered in main memory. Then at Block C, each local computing unit uses coefficients A through J to determine in which memory storage element m(i,j,k) in its local memory storage module, a voxel should be generated and stored in order to internally produce a partial voxel-based representation of the 3-D geometrical object. Each such generated voxel will have color and other attributes. As will be described in detail below, each k-th partial voxel-based representation requires $N^2$ stages of N executed voxel generation/storage operations performed in parallel by the coordinated array of local computing units under the supervision of the control computing unit. When considered as a shown, the partial voxel representations provide a complete voxel-based representation (i.e. image) of the user-specified 3-D geometrical object.

Figure 10B:
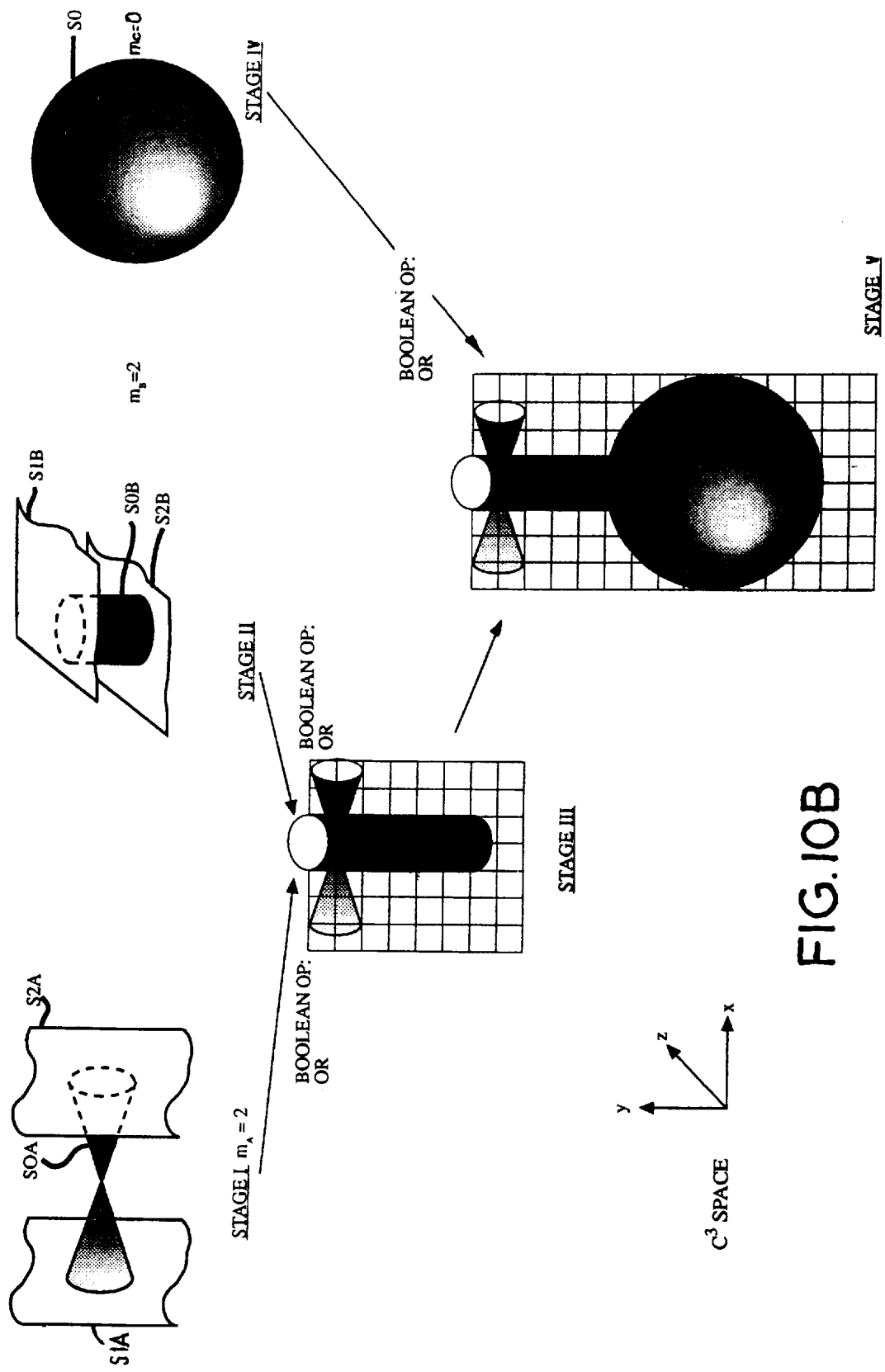
FIG. 10B is a schematic representation of an exemplary process, in which a 3-D geometrical object is voxelized and processed using the parallel computing system of the present invention.

Referring to FIGS. 10B through 10D, an illustrated embodiment of the parallel oxidation method of the present invention will be described below.

FIG. 10B schematically illustrates the method of FIG. 10A, in which a complex solid is constructed by assembling three solid primative objects. As shown, these three solid primative objects include a clipped cone, a clipped cylinder and a sphere. As shown, the clipped cone primative is formed by three subprimatives, namely a cone and pair of clipping planes. The sphere, on the other subprimative, namely a sphere. As used hereinafter, M shall be used to denote the number of subprimatives selected by the user to define a primative object. Also, during the voxelization process, a set of quadric coefficients Q will be required to specify each subprimative, and thus for each primative object M sets of quadric coefficients will be required to specify the primative object. The user specifications for each of these primative objects A, B and C are illustrated in FIG. 10C and are provided by the user to the user interface/display computing unit at Block A of FIG. 10A. After performing spatial transformation upon those primatives as indicated at Block B in FIG. 10A, the user interface/display computing unit generates. The geometrical representation of these three spatially transformed primatives, their attributes and clipping planes and the Boolean logic operations to be performed upon these primatives. Preferably, such data is expressed in the form of a list as shown in FIG. 10D, and is then passed over the System bus to the control computing unit.

In order to generate in a voxel-based representation of the 3-D $C^3$ geometrical objected specified by these three primatives, their attributes and the Boolean oeprations, as schematically illustrated in FIG. 10B. The control computing unit coordinates the array of computing units to carry out the parallel oxidation process described above for each of these primatives while performing Boolean operations, i.e., $OP_{OreAcc}$ and $OP_{PostAcc}$ which Boolean operations are performed during the voxelization process. Notably, Boolean operation $OP_{PreAcc}$ is performed between primative $S_0$ and its subprimatives $S_1$ and $S_2$ prior to accessing memory storage element m(i,j,k). Boolean operation $OP_{PostAcc}$, on the other hand, is performed between the resulting clipped solid primative and another clipped solid subprimative or unclipped solid subprimative after memory storage element m(i,j,k) has been accessed in order to obtain voxel data essential to the operation.

In the case illustrated in FIG. 10B, a Boolean operation $OP_{PreAcc}$ is first performed between the geometric values of the solid cone supbprimative $S_{OA}$ and the geometric values of its clipping planes $S_{1A}$ and $S_{2A}$ to shape the cone in a definite manner. Then, a Boolean operation $OP_{PreAcc}$ is performed between the geometric values of the solid cylinder subprimative $S_{OB}$ and the geometric values of its clipping planes $S_{1B}$ and $S_{2B}$ in order to shape the cylinder. Then as illustrated, a Boolean operation $OP_{PostAcc}$ is performed between the geometric values of the resulting clipped solid cone and the geometric values of the resulting clipped solid cylinder to yield a voxel-based first object defined by these clipped subprimatives and the applied Boolean operation. Finally, during the voxelization of solid primative sphere $S_{OD}$, a post-access Boolean operation is performed between voxel values of solid subprimative sphere $S_{OD}$ and the voxel values of the first voxel-based object, to yield a final voxel-based object of the user-specified 3-D geometrical object. The details of such operations will become readily apparent from the description of the computer routines illustrated in FIGS. 10E, 10F and 10G.

Figure 10E:
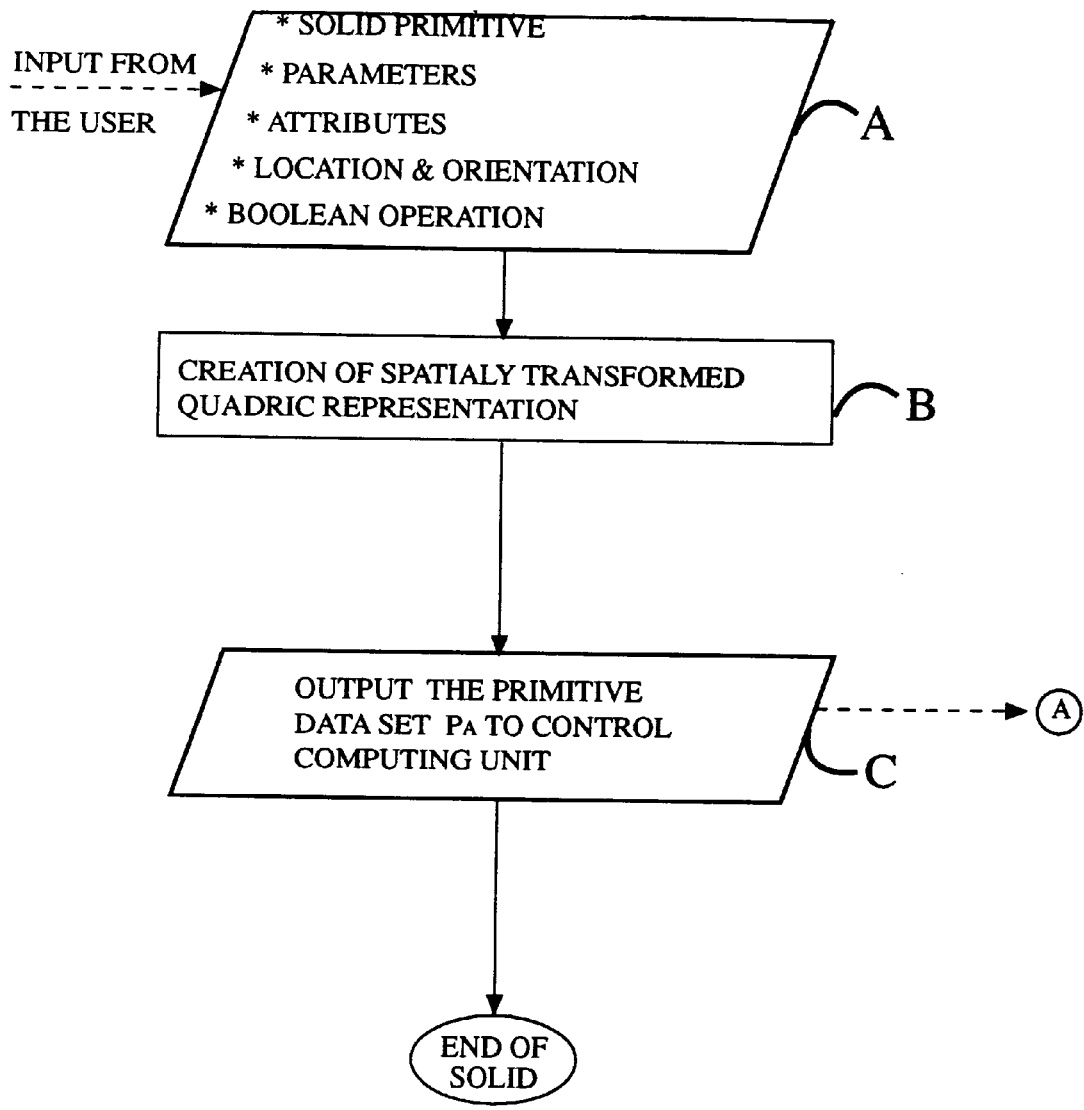
FIG. 10E is a high level flow chart of a generalized method of voxelizing and processing 3-D geometric objects using the parallel computing system of the present invention.

As indicated at Block A of FIG. 10E, the user interface/display computing unit receives from the user, the geometrical specification list illustrated in FIG. 10C. Then, as indicated at Blocks B and C, spatially transformed geometrical primatives in the specification list of FIG. 10C are generated, organized in a list as illustrated in FIG. 10D, and then one primative data set (e.g. $P_A$) is passed to the control computing unit.

Figure 10F:
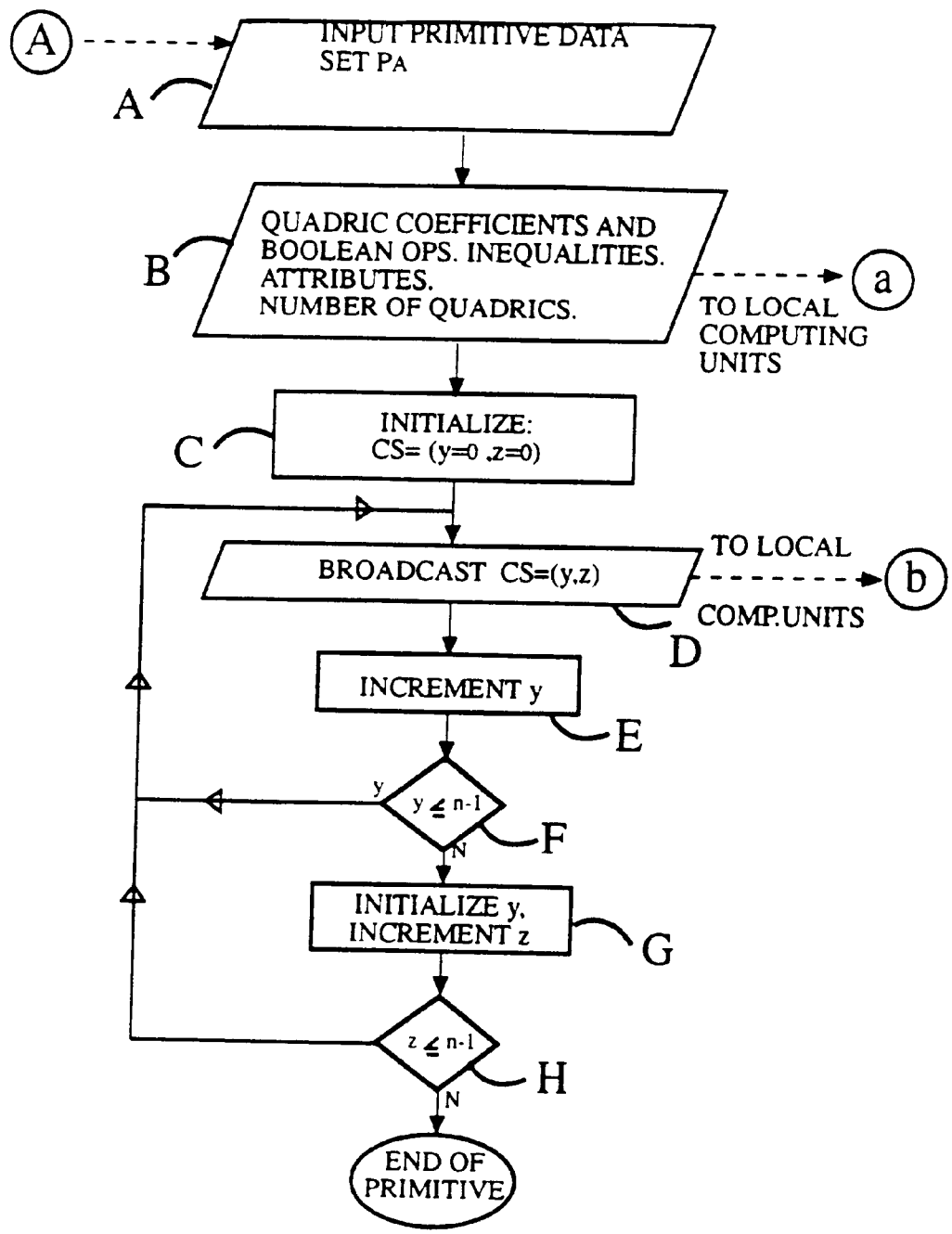
FIG. 10F is a flow chart of the user interface computer routine program executed by the interface and display computing unit the voxelization and processing of 3-D geometric objects according to the method of FIG. 10D using the parallel computing system of the present invention.

As indicated at Block A of FIG. 10F, the control computing unit receives data set $P_A$ associated with a single primative, e.g. the clipped cone primative illustrated in FIG. 10B. For the clipped cone, m=3 sets of quadric coefficients $Q_1, Q_2, Q_3$ will be received along with the quadric evaluation functions $E(V_1), E(V_2), E(V_3)$ and Boolean pre-access and post- access operators associated with each of the subprimatives required to construct the clipped cone. Then, as indicated at Block B, the control computing unit broadcasts to the local computing units, the data (i.e. quadric coefficients $Q_m$, and evaluation function $E(v_m)$ associated with the cone subprimative). As indicated at Block A of FIG. 10G, each local computing unit receives the broadcasted data and buffers it in its main memory.

As indicated at Block C in FIG. 10F, the control computing unit specifies the first beam of memory storage elements in the 3-D array within which a voxel data elements are to be written in a parallel manner by the array of the local computing units. This beam is specified by initializing the y, z coordinates of the Cartesian parameters CS=(y=0, z=0). As indicated at Blocks D through H, the control computing unit accesses the specified beam, determines the voxel value associated with each memory storage element in the beam, writes these values into the beam in a parallel fashion, increments the Cartesian parameters CS, and then proceeds to broadcast each such beam until the entire $N^2$ beams within the 3-D memory storage array have been addressed.

Figure 10G:
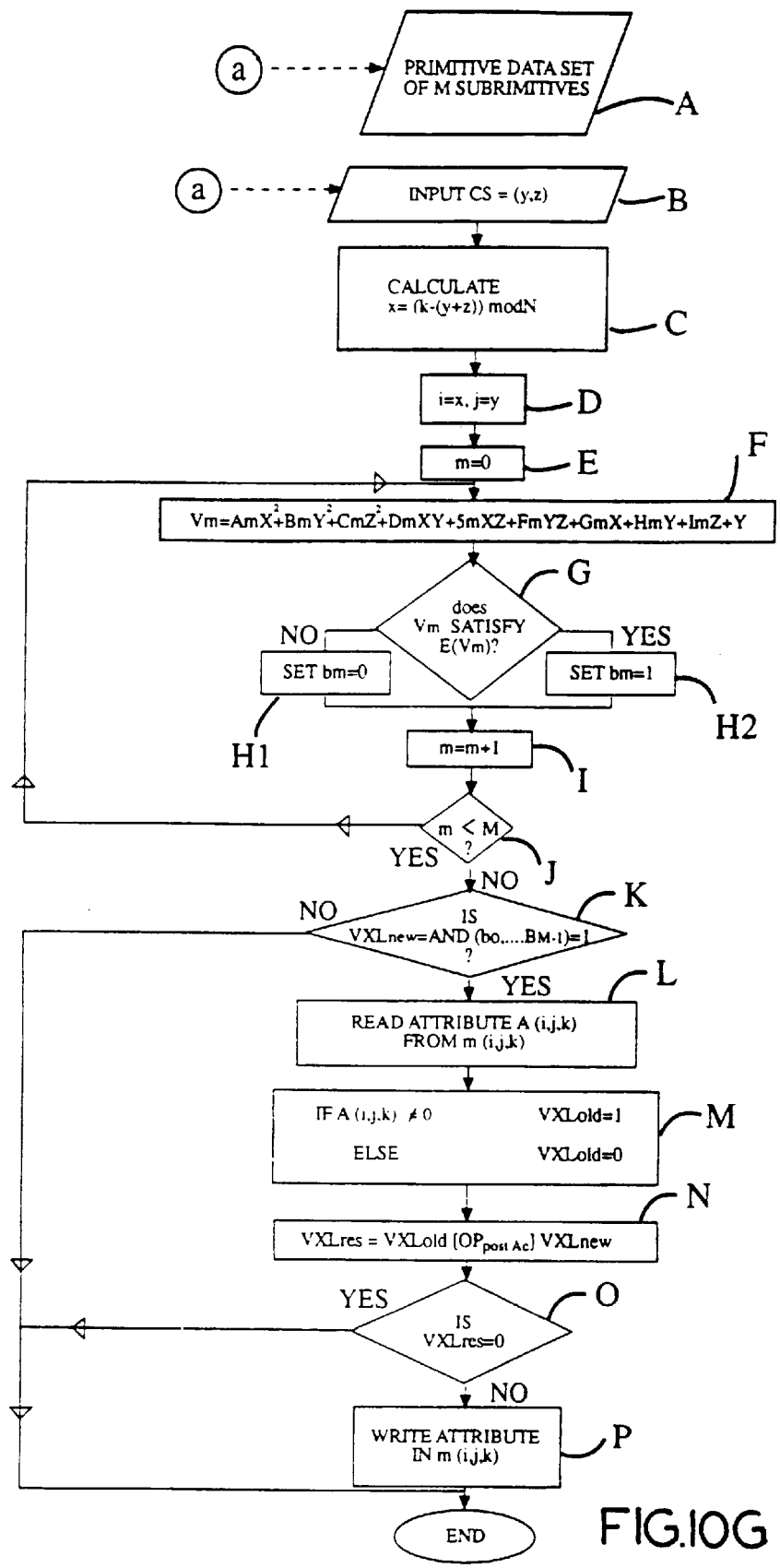
FIG. 10G is a flow chart of the control computer routine executed by the control computing unit during the voxelization and processing 3-D of geometric objects in accordance with the present invention.

Specifically, at Block D in FIG. 10F, the control computing unit broadcasts the Cartesian parameters CS=(y,z) over the system bus to the local computing unit. Then, the steps indicated at Block E through H are performed in a manner similar to the steps indicated at Blocks P through U in FIG. 8A. In FIG. 10G, the steps performed by each local computing unit in a coordinated manner during the execution of Blocks E through H in FIG. 10F are illustrated. Specifically, at Block B of FIG. 10G, each local computing unit receives broadcasted Cartesian parameters CS=(y,z) and buffers the same in its main memory. At Blocks C and D, each local computing unit calculates physical address indices, i,j.

At Block E, subprimative index m is initialized, i.e. m=o. Then at Blocks F through J, each k-th local computing unit determines whether or not the n-th subprimative contributes, in a geometric value sense, to memory storage element m(x,y,z) having a physical address location at i,j,k in $M^3$ space. Specifically, at Block F, each unit evaluates the n-th quadric expression $V_m$ at its x,y,z coordinates values, and then at Block G determines whether the result of $V_m$ satisfies evaluation function $E(V_m)$. If so, then as indicated at Block H, the n-th boolean weight bit $b_m$ is set to 1; otherwise it is set to 0. Then, at loop control Blocks I and J, each local computing unit increments the subprimative index m by +1, reexecutes the steps at Blocks F through H, until all M subprimatives have been processed. At this stage, there will be a set of M Boolean weight bits bo, bi, . . . $b_{M-1}$ which, at Block K, are subjected to the logical AND function representing the voxel contribution of the entire set of M-subprimatives comprising the primative object, e.g., the clipped cone. If the function $VXL_{New}$ is 0, indicative that the primative has no voxel value contribution, then the local computing exits the routine. If, however, the function $VXL_{New}$ is 1, then the steps at Blocks L through O are performed to determine what value contribution, if any, should be written into memory storage element m(i,j,k). Notably, the result of the AND function is produced prior to accessing memory-storage element m(i,j,k) and thus is considered a "pre-access" operation, in contrast with the operation performed at Block N.

At Block L, each k-th local computing unit accesses memory storage element m(i,j,k) and reads the residing voxel therefrom, and then at Block M determines whether this memory storage element is empty. If it is not empty, each local computing unit sets the $VXL_{old}$ function to 1; otherwise it sets the $VXL_{old}$ to 0. Then at Block N in FIG. 10G, each local computing unit performs a Boolean operation $OP_{PostAcc}$ (associated with the primative data set, e.g. $P_A$) between the Boolean values of $VXL_{old}$ and $VXL_{New}$, yielding the Boolean value of the $VXL_{Res}$ function. If the value of $VXL_{Res}$ is true (i.e. "1") then a new attribute value is written into memory storage element m(i,j,k); otherwise the resident attributes in m(i,j,k) remain unchanged. Notably, in the case that $VXL_{Res}$ is true, the new attribute value written into m(i,j,k) may be any contribution of the set of new and old attributes.

After the primative for the clipped cone has been voxelized as described above, the primative data set $P_B$ for the clipped cylinder is passed to the control computing unit, which then initiates the local computing units to voxelize subprimative by suprimative, the clipped cylinder primative. Similarly, the sphere primative can be likewise voxelized to automatically combine its subprimatives with the resulting resident primatives.

In order to produce and display a 2-D image of a 3-D voxel-based object viewed along any arbitrary viewing direction specified in $C^3$ space, the general method illustrated in FIGS. 11A through 11G can be used. In FIGS. 11D through 11H, a more detailed description is provided for a method of producing 2-D images from parallelly projected viewing rays along a user specified viewing direction in $C^3$ space.

Figure 11A:
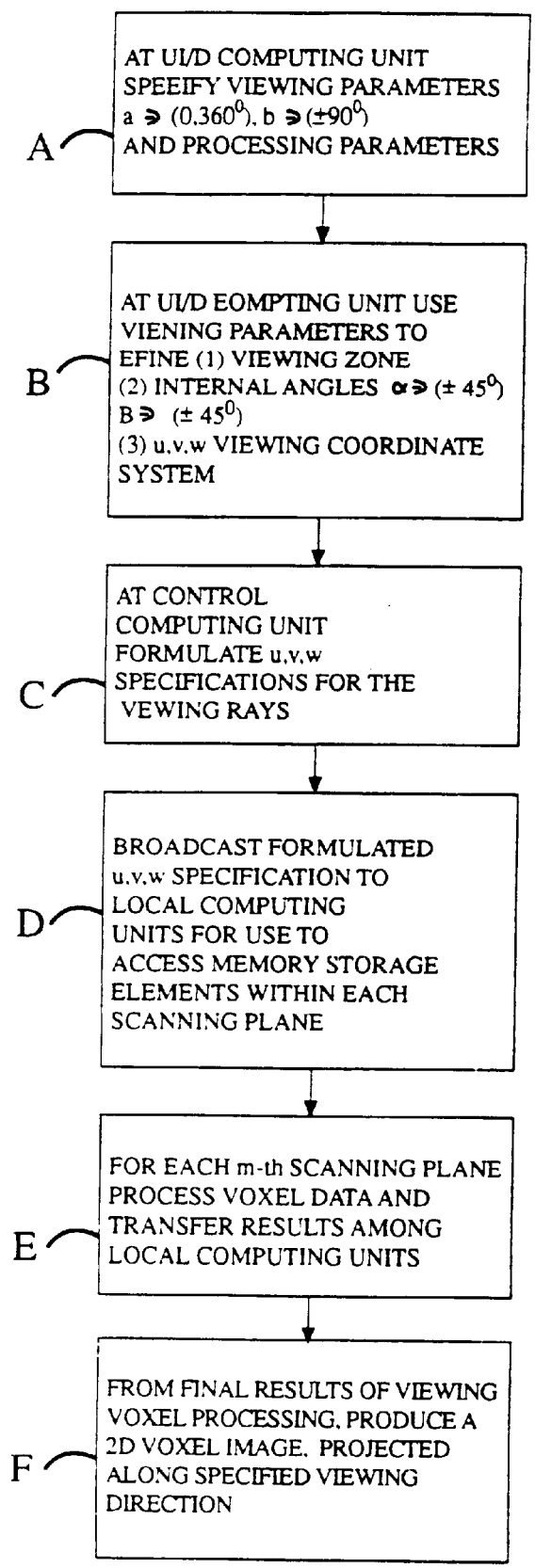
FIG. 11A is a high level block diagram illustrating the general method of generating 2-D images from either parallel or perspective viewing rays projected from any arbitrary viewing direction specified in 3-D Cartesian Space.
Figure 11B:
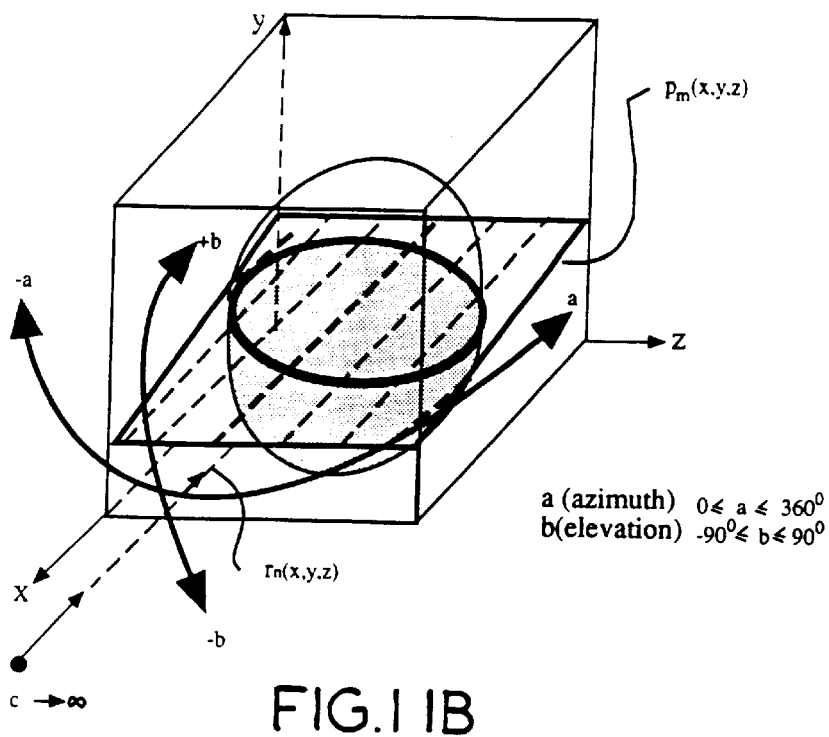
FIG. 11B is a schematic representation of the parallel ray projection process for producing 2-D images of a 3-D voxel-based object represented in the parallel computing system.

As indicated at Block A in FIG. 11A, the first step of the general image projection method of the present invention involves specifying viewing parameters and image processing parameters at the user interface/display computing unit. In the illustrated embodiment depicted in FIG. 11B, user viewing parameters comprise (i) azimuth parameter "a" ranging from $0 \leq a \leq 360°$; elevation parameter "b", ranging from $-91° \leq b \leq 90°$; and range parameter "c" ranging from 0 to infinity. Notably, the combination of these three viewing parameters a, b and c are sufficient to specify any arbitrary viewing direction in $C^3$ space. When producing parallel projected images range parameter c is set to infinity, and when producing perspective projected images range parameter c is set to some finite value specified by the user. In the image projection method of the present invention, the function of these viewing parameters is to specify the direction in $C^3$ space, along which a set of projected viewing rays extend from the user's eyes into the 3-D voxel-based image represented in $C^3$ space. In the case of parallel projected images, the user's eyes are deemed to be located at infinity and thus each viewing ray $r_n(x,y,z)$ in the set of N viewing rays between the users eyes and the voxel-based image, is parallel to every other viewing ray. This condition in the parallel ray projection process is illustrated in FIG. 11B by sharing for exemplary purposes, an m-th scanning plane $P_m(x,y,z)$, along which N parallel viewing rays extend. As will be described in greater detail hereinafter, the number of scanning planes will depend on the viewing parameters, and thus index m will range from $N \leq m \leq 2N$.

Figure 11C:
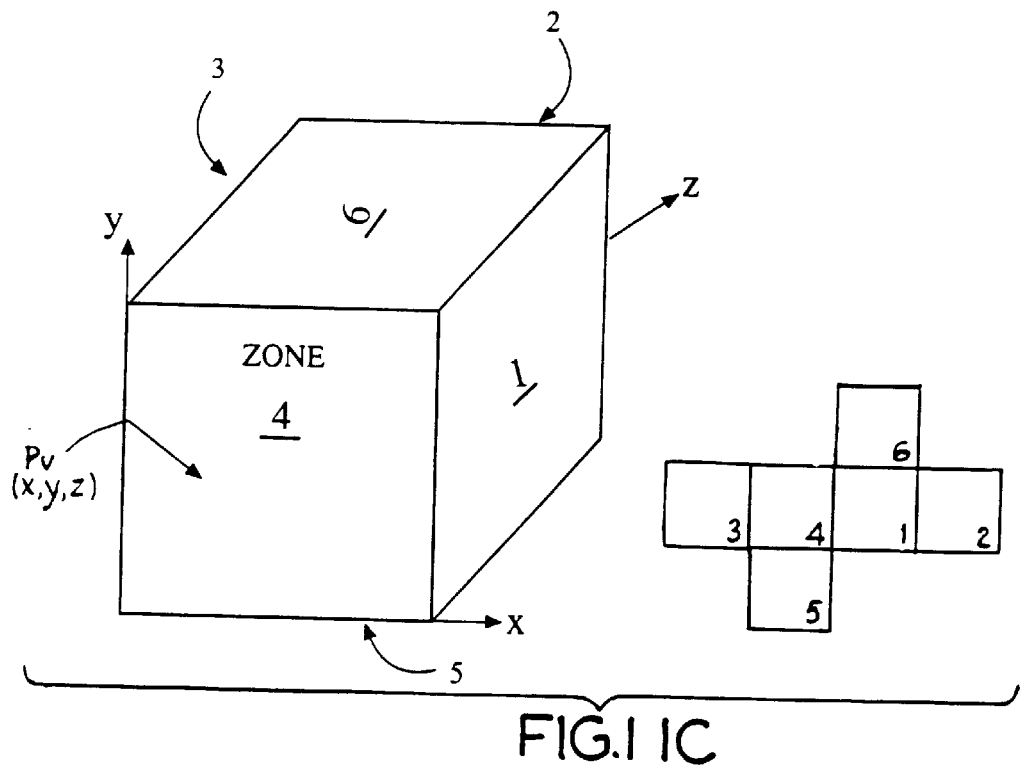
FIG. 11C is a schematic representation illustrating the viewing zones assigned to various ranges of viewing parameters in 3-D Cartesian Space.
Figure 11D:
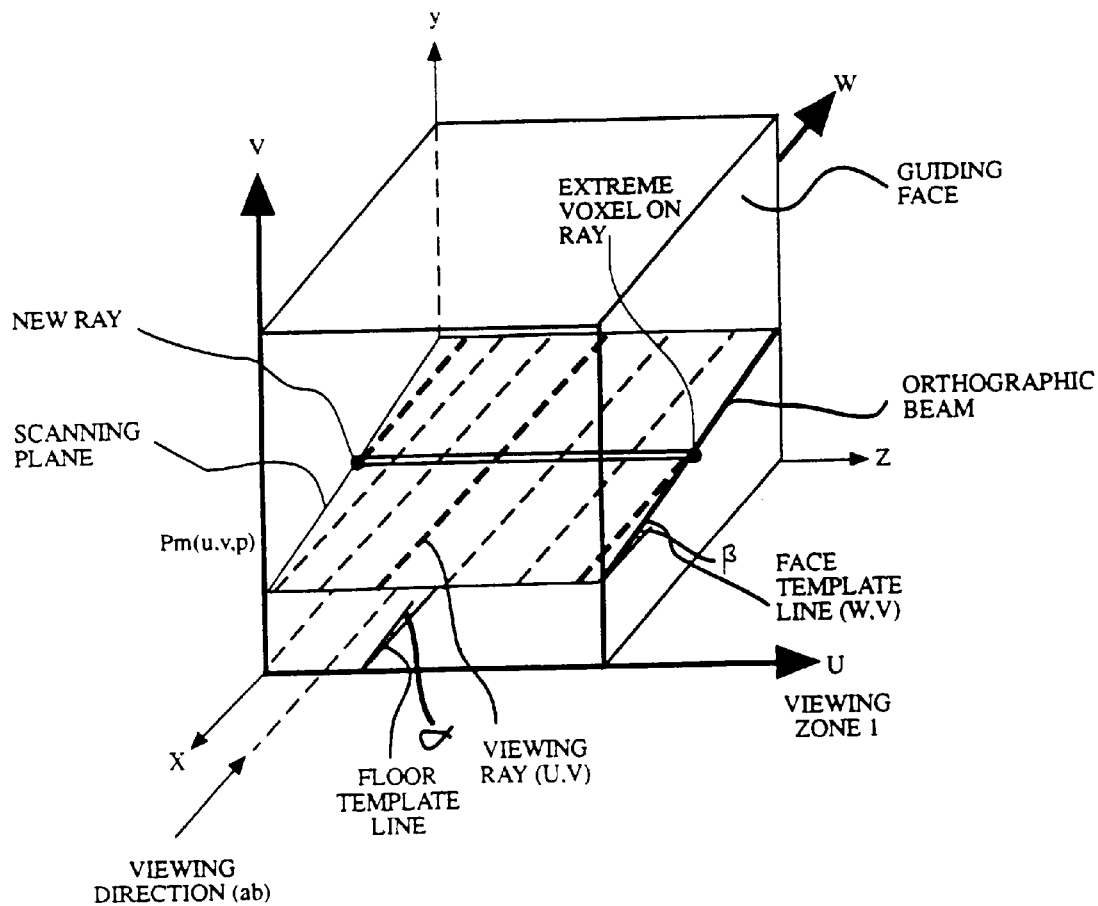
FIG. 11D is a schematic representation of the 3-D memory storage array in 3-D Cartesian Space, illustrating the viewing direction, the viewing rays, a scanning plane, and other parameters used in the parallel ray projection process of the present invention.
Figures 11E, 11F:
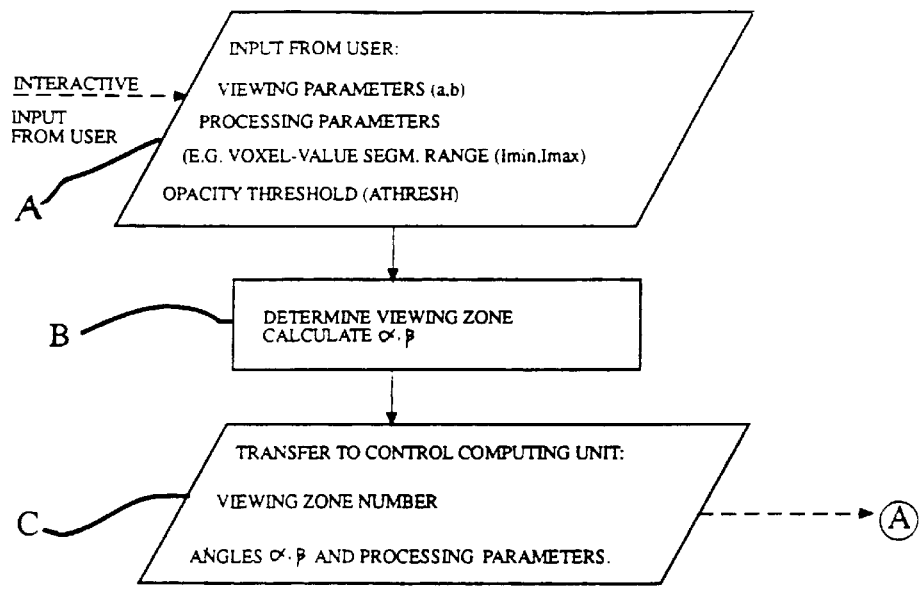
FIG. 11E is a flow chart of the interface/display computer routine executed by the user interface and display computing unit during the parallel ray projection process of the present invention.
FIG. 11F is a data table used by the control computing unit during the parallel ray projection process of the present invention.

As indicated at Block B of FIG. 11A, the viewing field defined by parameters a and b is segmented into six viewing zones, each being assigned a unique viewing zone number as illustrated in FIG. 11C. Each of these viewing zones has a viewing plan $P_v(x,y,z)$ and is defined in terms of subranges of viewing parameter values a and b as indicated in the table of FIG. 11F. For each viewing zone, a pair of internal ray specifying angles α and β are defined in terms of viewing angles a and b, as indicated in the table of FIG. 11F.

As illustrated, ray specifying angles α and β may each take on a value within the range of $-45° \leq \alpha, \beta \leq 45°$. As will be described in greater detail hereinafter the function of β is to specify the angle of declination of scanning plane P(u,v,w), whereas the function of α is to specify the angle of each viewing ray within the scanning plan $P_m(u,v,w)$. In addition, for each viewing zone, the specified viewing direction is redefined in terms of a Cartesian coordinate system characterized by orthogonal coordinate axes u, v and w, in which the U-V principal plane is parallel with the one of the principal planes in XYZ coordinate system, as determined by the table of FIG. 11F. After parameters α and β and the viewing zone number have been determined, they are passed over the system bus to the control computing unit. As indicated at Block C in FIG. 11A, the control computing unit uses parameters α and β in order to specify the viewing rays within each viewing plane $P_m(u,v,w)$ Cartesian parameters which specify viewing $r_m(u,v,w)$ rays are expressed in terms of u, v and w coordinate values. However, only v and w coordinate values are broadcasted to the local computing units.

As will be seen, the formulation of Cartesian parameters CS=(v,w) restricts the parallel accessing of memory storage elements in the 3-D storage array during the image projection process. Then, at Block D, the control computing unit broadcasts the Cartesian parameters CS=(v,w) formulated in Block C, so that once received by the local computing units, they can be converted into corresponding x,y coordinate values, which are used to compute physical address indices i,j of memory storage elements along the beam specified by broadcasted parameters CS=(v,w).

At Block E, up to M=2N stages of processing are performed by the coordinated array of local computing units. More specifically, at each n-th processing stage, N stages of subprocessing stages are required. Specifically, at each n-th stage of subprocessing, the memory storage elements {m(x,y,z)} along each beam in the m-th scanning plane are accessed in a parallel manner, and voxel data read therefrom are then processed to produce a set of up to N intermediate results $\{R\}_n$. These N intermediate data elements are subsequently transferred in parallel among the local computing unit for use in the (m+1)th stage of subprocessing at the subsequent beam in the m-th scanning planes.

After each beam in the m-th scanning plane has been accessed, voxel elements read therefrom, and intermediate elements transferred, as described above, a final set of intermediate results $\{R\}_{n+N}$ will have been collected along the specified viewing rays, wherein each final result resides in the main memory of different local computing unit. As will be illustrated in greater detail in the illustrative embodiment, the manner in which the set of intermediate data elements $\{D\}_n$ is transferred among the array of local computing units, depends on the direction of the user specified viewing rays. In the case of parallel projected images, this data transfer can be achieved using the global data transfer network, whereas for perspective projected images, the local data transfer network can be used. Then, at Block F up to M=2N stages of processing are performed. Specifically, at each m-th stage, each k-th local computing unit processes its final results R so that the coordinated array of local computing units produce N voxel values along the m-th scan-line in the derived 2-D image. This process is repeatedly performed for each m-th scanning plane so that all of the voxels along each scan line are produced, thus constituting the entire 2-D voxel image.

Referring to FIGS. 11B through 11H, the details of the parallel projected image process will be described.

As indicated at Block A in FIG. 11E, the user provides viewing specification and projection processing parameters to the intertace/display computing unit in a manner generally described in connection with Block A of FIG. 11A. In a typical computer graphics workstation environment, these parameters can be input using manual data entry equipment, or by way of automated data entry equipment, as used in virtual reality environments well known in the art. Examples of projection processing parameters may include voxel value segmentation ranges (i.e. $I_{min}, I_{max}$) for voxel value clipping, and opacity thresholds for semitransparency applications.

At Block B, the user interface/display computing unit determines the viewing zone number using the table given in FIG. 11F, and then determines viewing ray specification angles $\alpha$ and $\beta$ from the same table. Then at Block C, the user interface/display computing unit passes to the control computing unit, the viewing zone number (e.g. 1, 2, 3, 4, 5 or 6), angles $\alpha$ and $\beta$ and user-specified projection processing parameters. As indicated at Block A in FIG. 11G, the control computing unit receives the viewing zone number, angles $\alpha$ and $\beta$ and the user-specified processing parameters passed from the interface/display computing device. At Block B, the control computing unit uses $\beta$ to create a face template line, and $\alpha$ to create a floor template line, as shown in FIG. 11D. At Block C, the control computing unit broadcasts to the local computing units, projection processing parameters and the viewing zone number to be used throughout each stage of the ray projection process.

Figure 11G:
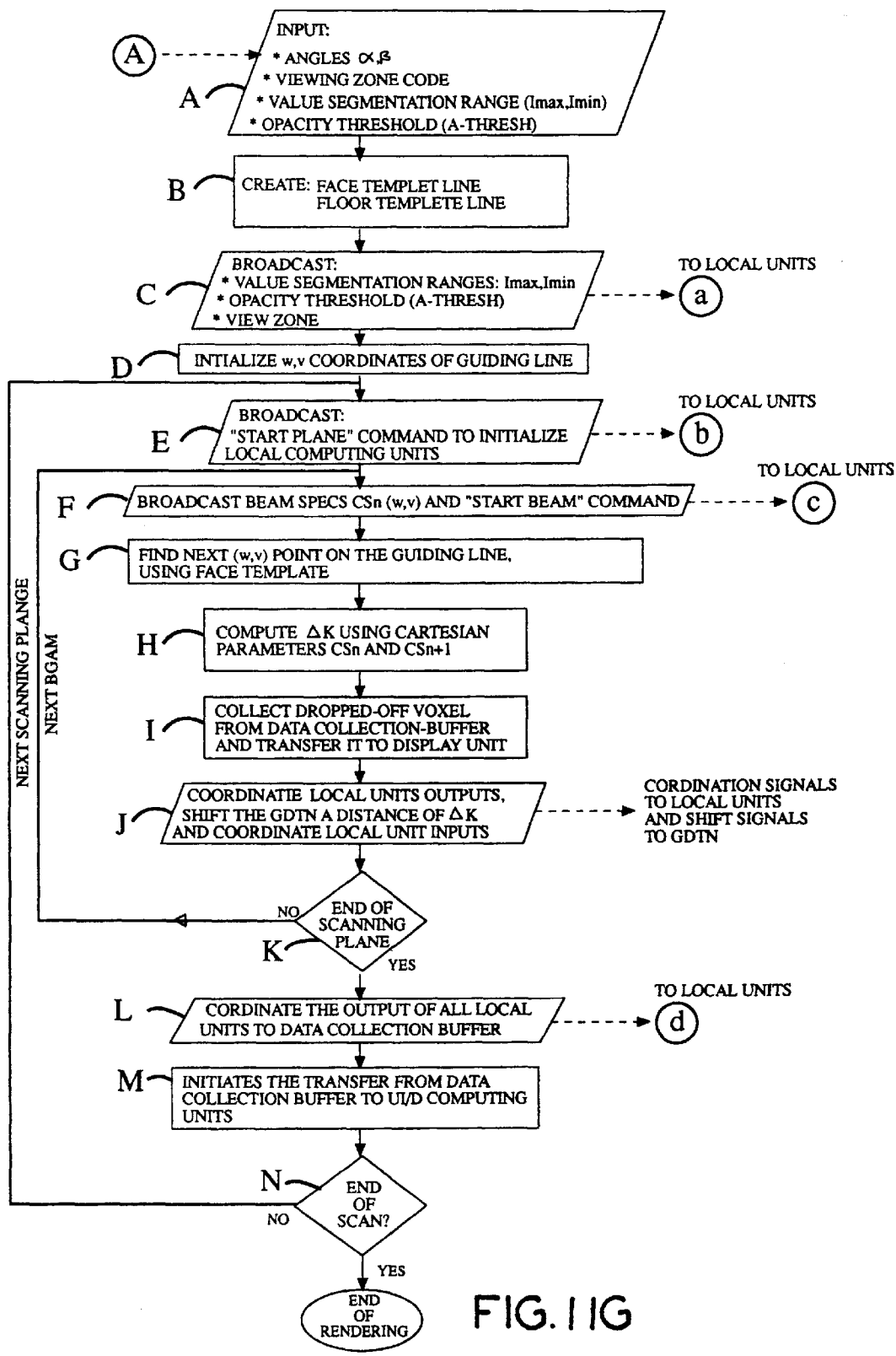
FIG. 11G is a flow chart of the control computer routine executed by the control computing unit during the parallel ray projection process of the present invention.

At Block D in FIG. 11G, the control computing unit specifies the first scanning plane by initializing the w, v coordinate values of Cartesian parameters CS=(w,v). In order to perform its functions during the steps indicated at Blocks D, E and F in FIG. 11A, the control computing performs the steps in two control loops: the outer control loop defined by Blocks E through N specifying operations performed by the control computing unit during the processing of each m-th scanning plane in $C_3$ space; and the inner control loop specifying the operations performed by the control computing unit during the processing of each n-th beam in the m-th scanning plane. Notably, outer loop control parameter m runs from N up to 2N, whereas inner loop control parameter runs from 1 to N.

As illustrated at Block E in FIG. 11G, the control computing unit broadcasts the "Start Plane" Command to initialize result parameter $R_n$ in the local computing units. At Block B in FIG. 11H, each local computing unit receives the Start Plane Command and initializes ray visibility parameters d, Ac, and Ic, representing the depth of the voxel being processed along each ray, voxel intensity and voxel transparency, respectively. Then, at Block F in FIG. 11G, the control computing unit broadcasts to the local computing units the first set of Cartesian parameters CSn=(w,v) and the "Start Beam" Command. As indicated at Blocks C through K, each local processing unit performs operations generally described in connection with Block E in FIG. 11A. These operations will be described in detail below.

Figure 11H:
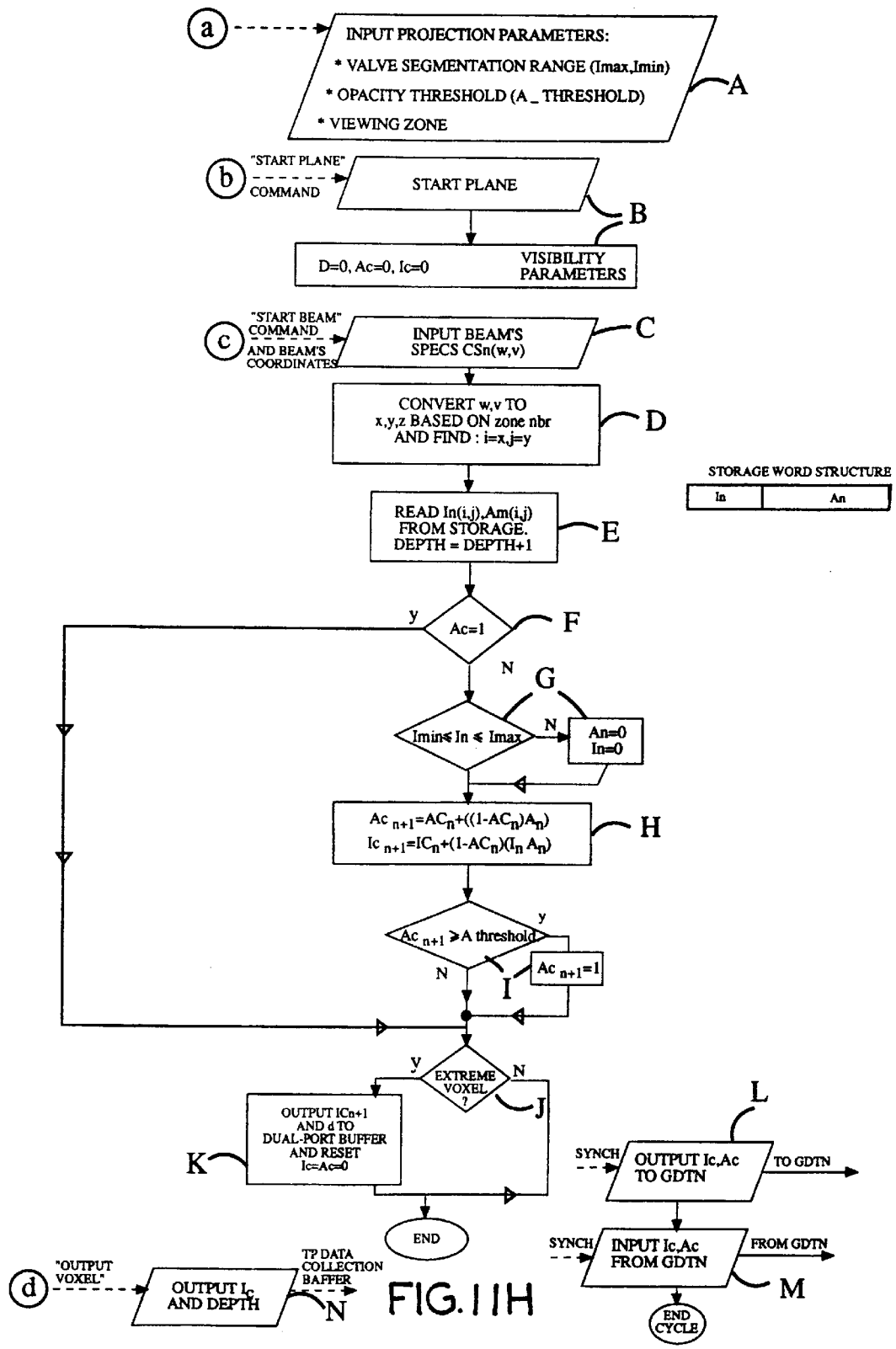
FIG. 11H is a flow chart of the local computer routine executed by each local computing unit during the parallel projection process of the present invention.

At Block C in FIG. 11H, each local computing unit receives the broadcasted Cartesian parameters $CS_n$=(w,v). At Block D, each local computing unit uses the viewing zone number and broadcasted Cartesian parameters $CS_n$= (w,v) to look up in the table of FIG. 11F the corresponding coordinate values (x,y), (y,z) or (y,z) from which physical addresses i,j can be computed in a manner described above. At Block E, each local computing unit accesses the memory storage element m(i,j,k) and reads therefrom, the visibility values $A_N$ and $I_N$ associated with the voxel stored in m(i,j,k). Then, at Block F, each local computing unit tests the accumulated opacity value $A_C$, which has been transferred to the local computing as the result from the m-th stage of subprocessing. If the accumulated opacity value $A_C$ is equal to 1, indicative that subsequent voxels along the ray cannot be seen, then visibility parameter processing Blocks G through I are bypassed; otherwise, the following steps are performed. Specifically, at Block G, each local computing unit tests the voxel intensity value $I_n$ by comparing it with the value segmentation range $I_{max}, I_{min}$. If the test result is negative, then the intensity and opacity values of the associated voxel are assigned zero values, implying that the voxel is invisible (i.e. completely transparent to the user). If, however, the test result is positive, then the voxel intensity and opacity values remain unchanged. At Block H, each local computing unit then computes the accumulated voxel intensity and opacity values $I_C$ and $A_C$, using the following formulas:

$$Ac_{n+1}=Ac+((1+Ac_n).A_n$$

$$Ic_{n+1}=Ic_n+(1-Ac_n).(I_n.A_n)$$

At Block I, each local computing unit compares the present accumulated opacity value $Ac_{n+1}$ with an opacity threshold $A_{Three}$. If the test result is positive, then the present accumulated opacity value $Ac_{n+1}$ is set to value 1 to indicate complete opacity. If, however, the test result is negative, then the opacity value accumulation will continue to the subsequent nth subprocessing stage. At Block J, each local computing unit determines whether the memory storage element accessed at the (n−1)th subprocessing stage contains a voxel along a viewing ray, as illustrated in FIG. 11D. This determination is made by analyzing the floor template and the broadcasted Cartesian parameter u, at the n-th stage of subprocessing. Specifically, when a local computing unit determines that u=N−1 or u=0, then an extreme voxel memory storage element has been identified. At Block K, if a k-th local computing unit detects an extreme voxel, it outputs the present accumulated intensity value $Ic_{n+1}$ to the k-th dual-port buffer in the data collection unit, and then resets the accumulated values of intensity and opacity to zero for a new viewing ray to be handled, as illustrated in FIG. 11D.

Returning to Block G in FIG. 11G, the control computing unit utilizes the face template to determine the Cartesian parameters $CS_{n+1}$ of the next beam within the (m=1)th scanning plane. At Block H, the control computing unit then uses formula 6 and Cartesian parameters $CS_n$ and $CS_{n1}$ to compute the uniform module distance (i.e. shift) ▲k required to uniformly transfer the set of results (e.g. accumulated opacity and intensity values) among the local computing units, as hereinbefore described. At Block I, the control computing unit collects the voxel value stored in the data collection buffer by the particular local computing unit at Block K in FIG. 11H, and transfers it to a 2N×2N frame buffer associated for example with the user interface/display computing unit. Then, at Block J in FIG. 11G, the control computing unit initiates the uniform transfer of the set of intermediate results R (e.g. accumulated opacity and intensity values) among the coordinated local computing units (i.e. by module distance ▲k) using the global data transfer network. At Blocks L and M in FIG. 11H, the steps performed by each local computing unit are illustrated.

At Block K in FIG. 11G, the control computing unit increments the inner control loop parameter n and then proceeds to perform the steps indicated in Block E through J to process the (n+1)th beam in the (m=1)th scanning plane. Each time the control computing unit proceeds through Block K, the inner control loop parameter n is analyzed to determine whether the last beam in the scanning plane has been processed. The number of beams in each m-th particular scanning plane will be determined by the specified viewing direction. When all beams in the m-th scanning plane have been processed, the control computing unit enters Block L and initiates the local computing units to transfer to the data collection buffer, the N accumulated voxel intensity values $I_c$ and the associated depth parameter d necessary for shading. This sequence of voxel data elements represents one scan-line of the 2-D parallel projected image. Finally, at Block M, the control computing unit initiates the serial transfer of these voxel data elements out from the data collection unit, over the system bus, and into the frame buffer of the interface/display computing unit for shading-type processing and display in a manner well known in the art.

At Block N, the control computing unit increments the outer control loop parameter m by +1 and then proceeds to perform the steps indicated in Blocks E through M, to process the (m+1) scanning plane in $C^3$ space. Each time Block N is passed and then scan line of voxel data is produced and stored in the frame buffer, and the outer loop control parameter is analyzed to determine whether the last scanning plane has been processed. The number of scanning planes extending through the 3-D memory storage array in $C^3$ space will be determined by the specified viewing direction. When all scanning planes have been processed and the complete 2-D projected image produced for display, the computer routine of FIG. 11G is completed.

Figure 12A:
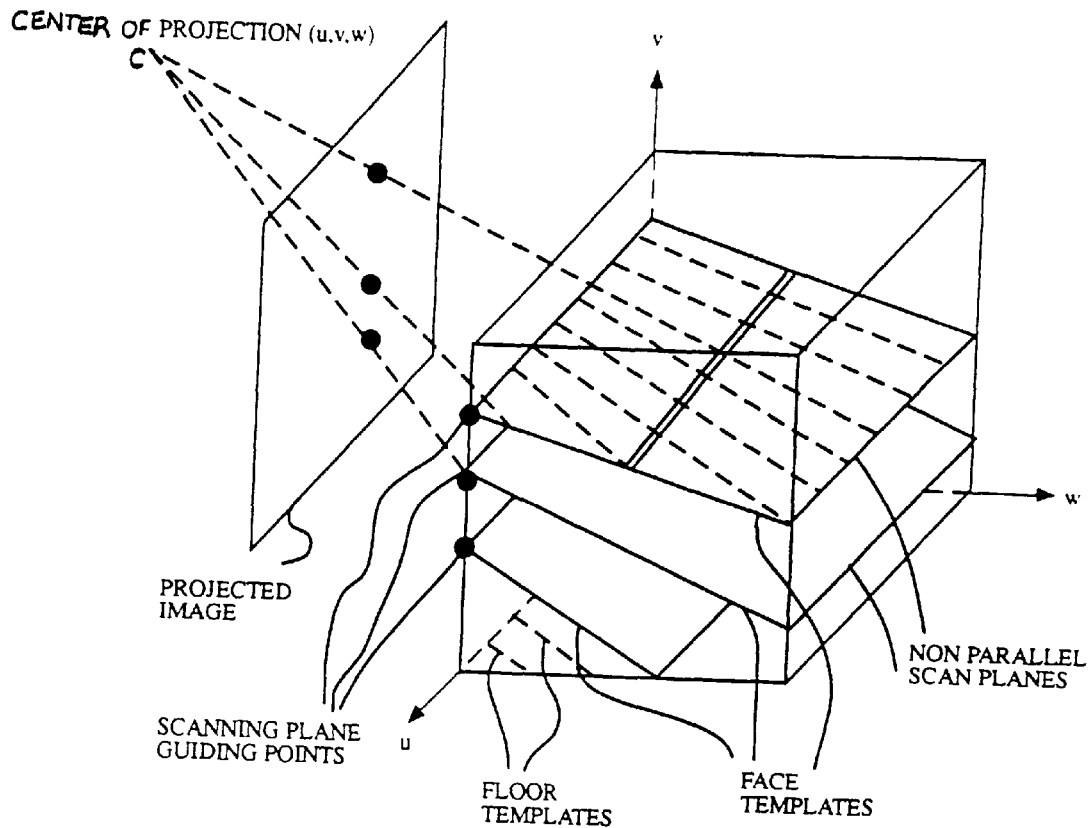
FIG. 12A is a schematic representation of the perspective ray projection process for producing 2-D images of a 3-D voxel-based object represented within the parallel computing system.

In FIG. 12A, a schematic representation of the perspective viewing process according to the present invention is illustrated. This process is similar to the parallel projection process depicted in FIG. 11D, except for several minor modifications within the control and local computer routines. One major difference is that the center of projection "c" is not located at infinity and thus neither the scanning planes nor the viewing rays within these planes are parallel. Consequently, in order that intermediate results of voxel opacity and intensity are transferred to local computing units having local access to the memory storage elements along these perspective viewing rays, it is necessary to transfer such data elements in a non-uniform fashion, during each n-th subprocessing stage, using the local data transfer network. Advantageous, the maximal module distance that any data element must be transferred during the subprocessing stages of this process, never exceeds ▲k=±3. This implies that data transfer between each adjacent memory storage element along any perspective viewing ray in the system can be achieved using the 26-connected type local data transfer process hereinbefore described.

Figure 13A:
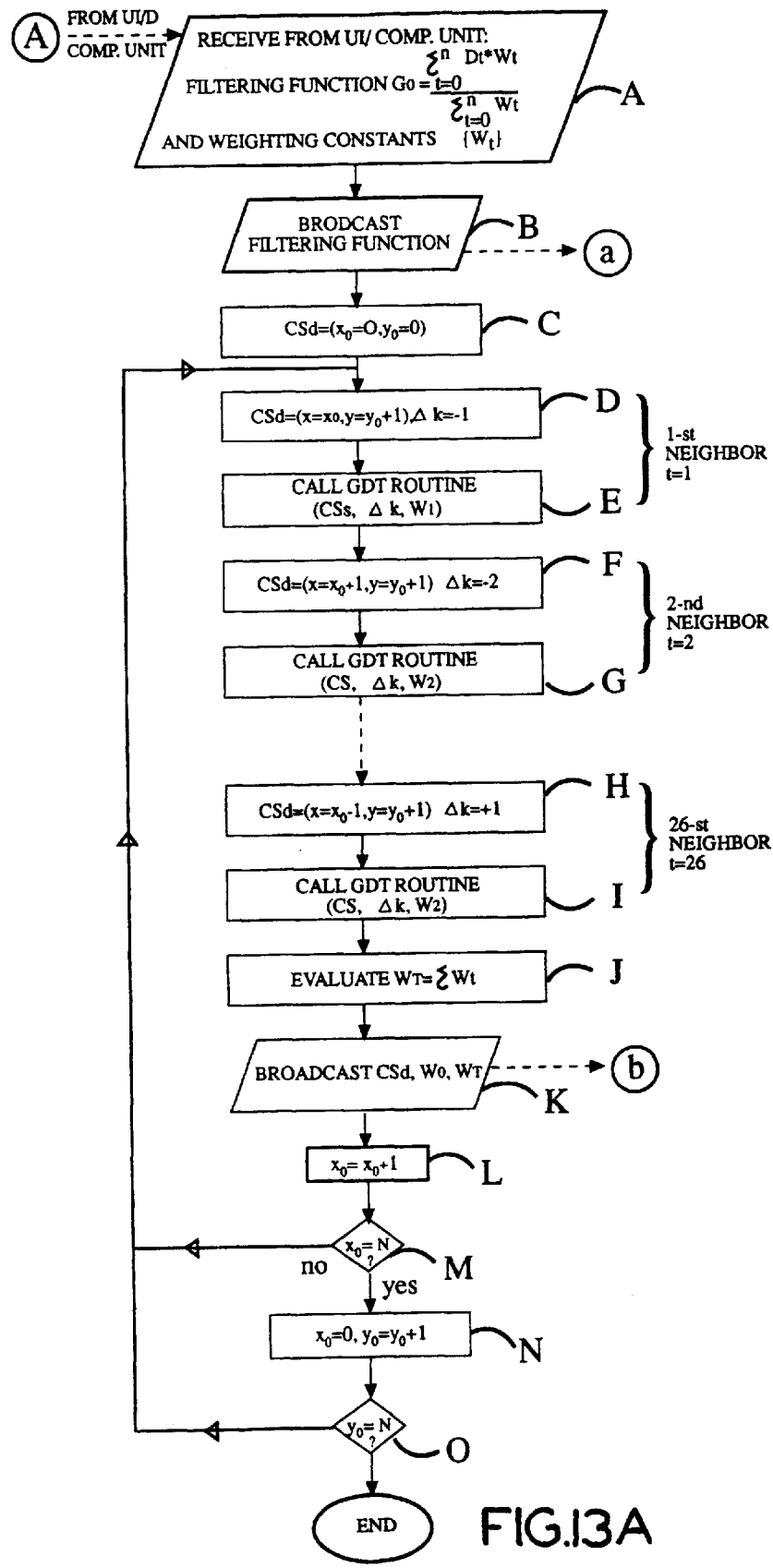
FIG. 13A is a flow chart of the control computer routine executed by the control computing unit during the low-pass filtering of data stored in the 3-D memory storage array of the parallel computing system.

Referring now to FIGS. 13A and 13B, a method of parallel data processing within the parallel computing system of the present invention will be described below.

In general, many types of data processing can be performed on data elements stored within the 3-D memory storage array. One type of processing of importance in voxel-image applications involves filtering the voxel data in order to either "smooth" or "enhance" structural features in a scene. Typically, a filtered scene will have the same number of voxels, although the voxel intensity and/or opacity values will be different from the original scene. By defining how the intensity and/or opacity values of neighboring voxels are to be used in arriving at the final intensity and opacity values at each voxel in a scene, a wide variety of filtering operations can be developed for use with the parallel computing system of the present invention. When developing filtering operations in accordance with the principles of the present invention, the global or local data transfer networks, or combination thereof, may be used by the local computing units in order to facilitate a desired exchange of data during a specified parallel data filtering process. In this regard, what is of great significance is that the uniform exchange of data elements is not restricted among neighboring memory storage elements, but rather can be achieved between memory storage elements of any arbitrary distance in $C^3$ space, without the occasion of a reduction in processing speed. In each such embodiment, suitable computer routines will be designed for the interface/display, control and local computing units utilizing principles of coordination and routine initiation.

In FIGS. 13A, 13B(1), and 13B(2), control and local computer routines are illustrated for a parallel method of low-pass data filtering according to the principles of the present invention. As indicated at Block A in FIG. 13A, the user interface/display computing unit provides to the control computing unit, a data filtering function which, in the illustrative embodiment, is expressed as:

$$G_o = [\Sigma D_t w_t]/[\Sigma w_t]$$

wherein $\{W_t\}$ are the set of weighing constants with t=0,1, 2 . . . 26. At Block B, the control computing unit broadcasts this filtering function $G_o$. At Block C, the Cartesian parameters specifying the first "central" beam of memory storage elements, are initialized, i.e. $CS_d=(x_0=0, y_0=0)$. Then, at the next t=26 subsequent pairs of blocks (e.g. D and E, F and G and H and I), the control computing unit (i) specifies the Cartesian parameters $CS_s$ of the each 26-connected neighboring source beam according to the scheme described in connection with FIG. 7C, (ii) determines module distance (i.e. shift) ▲k, and then (iii) calls the global data transfer routine illustrated in FIGS. 5B and 5C. Notably, this routine uses specified Cartesian parameters $CS_s$ determined module distance ▲k, and the weighing parameter $w_t$. During the execution of each set of these blocks, data transfer is achieved between the memory storage elements of the specified source and destination beams. Also, as indicated at Block A in FIG. 13B(1), each k-th local computing unit receives the broadcasted Cartesian parameters $CS_s$. At Block C, each k-th local computing unit accesses memory storage element m(i,j,k) and reads "neighboring" data element $D_t$. At Block D, each k-th local computing unit then computes the product $D_k=D_t*w_t$, and at Block E transfers the result to the k-th local bus, which is then transferred to the (k+▲k) local bus by way of the global data transfer mechanism. At Block F, each k-th local computing unit then removes the weighted and shifted data element $D'_{k+\blacktriangle k}$ from the k-th local bus, and at Block G buffers it in main memory.

At Block J in FIG. 13A, the control computing unit sums the individual weights of the 26 weighing constants, and at Block K the total weight $W_T$ is broadcasted to the array of local computing units. At Block A in FIG. 13B(2), each local computing unit receives the Cartesian parameters $CS_d$, the weighing constant $w_0$ of the central memory storage element, and the total weight $W_T$ of the weighing constants. At Block B in FIG. 13B(2), each k-th local computing unit determines the physical addresses using the broadcasted Cartesian parameters, and at Block C reads the control data element $D_0$ from accessed memory storage element $m(i,j,k)$. At Block D, each k-th local computing unit computes the weighed data element $D_0'=D_0W_0$ in the control memory element in the k-th local memory storage module. At Block E, each k-th local computing unit computes the filtered data element value $G_0$ associated with the central memory storage element in the k-th local memory storage module.

As the original data element value $D_0$ at each central memory storage element will be required during the filtering of its neighboring data elements, it will be necessary to save these original data values until filtering of the 3-D memory storage array is completed. To achieve this condition, each filtered data value $G_0$ (to be stored in its central memory storage element) can be buffered within a designated sequence of memory storage bits contained within its memory storage element during the data filtering process.

When the process is completed, these filtered data elements can be transferred from the sequence of "buffering" memory storage bits to its permanent memory storage bits within its memory storage element. This process can be achieved in parallel fashion without requiring data transfer among any memory storage elements in the 3-D array. Thereafter, filtered 2-D images can be displayed along any desired viewing direction in a manner hereinbefore described.

While preferred embodiments of the system and method of the present invention have been described, it will be appreciated that variations and modifications of the present invention will occur to persons skilled in the art, and that all such modifications shall be within the scope and spirit of the appended claims.

What is claimed is:

1. A parallel computing system for generating and processing voxel-based objects within a three-dimensional memory storage array represented in 3-D space, comprising:

a system bus for transferring coordinate data sets and local programs;

a plurality of local computing units, each said local computing unit being connected to said system bus and having local program storage means for storing one or more local programs, and local processing means for locally processing one or more coordinate data sets in accordance with one or more of said local programs and producing data elements, including voxel data elements representative of a portion of a 3-D voxel-based object represented in said 3-D space;

a plurality of local memory storage modules, each said local memory storage module having a set of memory storage elements and each said memory storage element being capable of storing one or more voxel data elements, wherein a plurality of said memory storage elements in said plurality of local memory storage modules are indexed so as to represent said three-dimensional memory storage array in said 3-D space;

a plurality of local buses, each said local bus being operably connected to one said local computing unit and one said local memory storage module, for transferring voxel data elements therebetween; and a control computing unit, operably connected to said plurality of local computing units by way of said system bus, for controlling and coordinating said plurality of local computing units during the local production and storage of said voxel data in said three-dimensional memory storage array.

2. The parallel computing system of claim 1, which further comprises data element buffering means, operably connected to said system bus and said plurality of local buses and controlled by said control computing unit, for buffering data elements transferred from said local computing units, over said local buses, to said data element buffering means; and a user interface computing unit operably connected to said system bus for producing and transferring user output data to said control computing unit by way of said system bus, wherein said user interface computing unit includes:

means for inputting and storing user-input data, means for storing a user interface program, means for processing said user-input data in accordance with said user interface program and producing said user-output data for use by said control computing unit, and means for visually displaying an image of said 3-D voxel-based object, viewed along a viewing direction specified by said user.

3. The parallel computing system of claim 2, wherein said user-input data specifies a 3-D geometric object for conversion into said 3-D voxel based object, and said user-output data specifies an implicit representation of said 3-D geometric object;

wherein said control computing unit transmits to said local computing units, a data set representative of said implicit representation of said 3-D geometric object; and wherein said one or more local programs stored at each said local program storage means includes a local voxelization program that processes said implicit representation data set to produce voxel data elements representative of a portion of said 3-D geometric object, and stores said produced voxel data elements in said respective local memory storage module, whereby, the voxel data elements produced by said plurality of local computing units running said local voxelization programs, collectively provides a complete voxel-based representation of said 3-D geometric object in said 3-D space.

4. The parallel computing system of claim 3, wherein said 3-D space is characterized by three orthographic coordinate axes and wherein said control computing unit includes means for coordinating the operation of said plurality of local computing units so as to orchestrate access to a rectilinear sequence of memory storage elements parallel to any one of said orthographic coordinate axes.

5. The parallel computing system of claim 3, wherein said 3-D space is characterized by three principal planes, and wherein said control computing unit includes means for coordinating the operation of said plurality of local computing means so as to orchestrate access to a sequence of memory storage elements arranged within a plane parallel to one of said principal planes.

6. The parallel computing system of claim 3, wherein said control computing unit produces as control data, a set of Cartesian coordinates which are transmitted over said system bus to said plurality of local computing units, and wherein said plurality of local computing units process said set of Cartesian coordinates in accordance with said stored local programs so as to generate physical memory addresses for accessing the sequence of memory storage elements specified by said set of Cartesian coordinates.

7. The parallel computing system of claim 2, wherein said user-input data further specifies a viewing direction in 3-D space along which a plurality of projected viewing rays extend through said 3-D voxel-based object; and wherein said user-output data further specifies a geometric representation of said projected viewing rays, and said control computing unit transmits to said local computing units, viewing ray data representative of said projected viewing rays so that each said local computing unit can produce pixel data that each said projected viewing ray contributes to the image of said 3-D voxel-based object along said specified viewing direction.

8. The parallel computing system of claim 7, wherein said control computing unit includes means for coordinating the operation of said plurality of local computing units so as to orchestrate access to a sequence of memory storage elements arbitrarily arranged across said three-dimensional memory storage array.

9. The parallel computing system of claim 2, wherein each projected viewing ray in said plurality of projected viewing rays extends parallel to each and every other said projected viewing ray, and through said 3-D voxel-based object.

10. The parallel computing system of claim 2, wherein each projected viewing ray in said plurality of projected viewing rays extends from said user and through said 3-D voxel-based object.

11. The parallel computing system of claim 1, wherein said control computing unit further comprises means for receiving said user-output data, means for storing a control routine, and means for processing said user-output data in accordance with said control routine, and producing control-output data which is provided to said local computing units for use in achieving coordination thereof.

12. The parallel computing system of claim 2, wherein said control computing unit further comprises means for receiving said user-output data, means for storing a control routine, and means for processing said user-output data in accordance with said control routine, and producing control-output data which is provided to said local computing units for use in achieving coordination thereof.

13. The parallel computing system of claim 1, which further comprises a data input/output unit, through which a plurality of voxel data elements can be selectively transferred from an external data storage device to a specified sequence of memory storage elements in said three-dimensional memory storage array, and from said specified sequence of memory storage elements in said three-dimensional memory storage array to said external storage device.

14. A method of generating 3-D voxel-based objects using a parallel computing system which includes (1) a system bus for transferring coordinate data sets and local programs, (2) a plurality of local computing units, each being connected to said system bus and having local program storage means for storing a local voxelization program, and local processing means for locally processing received coordinate data sets in accordance with said local voxelization program, (3) a plurality of local memory storage modules, each having a set of memory storage elements and each said memory storage element being capable of storing one or more voxel data elements, wherein a plurality of said memory storage elements in said plurality of local memory storage modules are indexed so as to represent a three-dimensional memory storage array in 3-D space within which the voxel data elements of said 3-D voxel-based object can be stored, (4) a plurality of local buses, each said local bus being operably connected to one said local computing unit and one said local memory storage module, for transferring voxel data elements therebetween, (5) a control computing unit, operably connected to said plurality of local computing units by way of said system bus, for coordinating said plurality of local computing units during each access to a sequence of memory storage elements in said three-dimensional memory storage array, and (6) data element buffering means, operably connected to said system bus and said plurality of local buses and being controlled by said control computing unit, for buffering data elements transferred from said local computing units over said local buses, to said data element buffering means, said method comprising:

(a) transferring coordinate data sets over said system bus to said plurality of local computing units;

(b) each said local computing unit using said local voxelization program to locally process received coordinate data sets, and produce voxel data elements representative of a portion of a 3-D voxel-based object represented in said 3-D space; and (c) storing the produced voxel data elements of said 3-D voxel-based object in said plurality of local memory storage modules.

15. The method of claim 14, which further comprises operably connecting a user interface computing unit to said system bus, and producing and transferring user output data to said control computing unit by way of said system bus, said user interface computing unit including data input means for inputting and storing user-input data program storage means for storing a user interface program, data processing means for processing said user-input data in accordance with said user interface program and producing said user-output data for use by said control computing unit, and image display means for visually displaying an image of said 3-D voxel-based object, as viewed along a viewing direction in 3-D space specified by a user of said user interface computing unit.

16. The method of claim 15, which further comprises:

using said user-input data to specify a viewing direction in 3-D space along which a plurality of projected viewing rays extend through said 3-D voxel-based object in said 3-D space;

producing user-output data specifying a geometric representation of said projected viewing rays;

transmitting from said control computing unit to said local computing units, viewing ray data representative of said projected viewing rays; and each said local computing unit using said viewing ray data and a said local stored program to produce pixel data which each said projected viewing ray contributes to the image of said 3-D voxel-based object along said specified viewing direction.

17. The method of claim 16, which further comprises:

transferring said produced pixel data over said local buses and buffering said pixel data in said data element buffering means, under the control of said central computing unit;

transferring said pixel data from said data element buffering means, over said system bus and to said user interface computing unit; and using said pixel data and said image display means to visually display the image of said 3-D voxel-based object.

18. A parallel computing system for producing, storing, and processing voxel data elements in parallel within a three-dimensional memory storage array, said parallel computing system comprising:

a system bus for transferring parameters and local programs;

a plurality of local computing units indexable as k=0,1, 2, . . . ,N-1, each said local computing unit being connected to said system bus and having means for storing one or more local programs, including a local voxelization program, capable of locally producing, storing and processing voxel data elements within said three dimensional memory storage array, and means for executing said one or more local programs, including said local voxelization program, using said parameters so as to locally produce, store and process within said three-dimensional memory storage array, voxel data elements representative of at least a portion of 3-D geometric object;

a plurality of local memory storage modules indexable as k=0,1,2, . . . ,N-1, each said local memory storage module having a set of memory storage elements and each said memory storage element being capable of storing one or more voxel data elements, wherein a plurality of said memory storage elements in said plurality of local memory storage modules are indexed so as to represent said three-dimensional memory storage array in 3-D space;

a plurality of local buses indexable as k=0,1,2, . . .N-1, each said local bus being operably connected to one said local computing unit and one said local memory storage module, for transferring voxel data elements therebetween; and a control computing unit, operably connected to said plurality of local computing units by way of said system bus, for coordinating parallel execution of said one or more local programs by said plurality of local computing units.

19. The parallel computing system of claim 18, which further comprises pixel data element buffering means, operably connected to said plurality of local buses and said system bus, and controlled by said control computing unit, for buffering pixel data elements produced from a plurality of voxel data elements in said three-dimensional array by said plurality of local computing units, and transferred over said plurality of local buses to said pixel data element buffering means, prior to being transferred over said system bus to a user interface computing unit operably connected to said system bus, for use in visualization of voxel data elements stored within said three-dimensional memory storage array.

20. The parallel computing system of claim 18, wherein said control computing unit further comprises means for storing a control routine, means for executing said control routine, and producing coordination data, and means for transferring said coordination data to said plurality of local computing units, for use during the execution of said one or more local programs in a parallel manner by said plurality of local computing units.

21. The parallel computing system of claim 18, which further includes said user interface computing unit operably connected to said system bus for producing and transferring said parameters to said control computing unit by way of said system bus, wherein said user interface computing unit comprises:

means for inputting and storing user-input data;

means for storing a user interface program;

means for executing said user interface program so as to process said user-input data, produce said parameters, and transfer said parameters over said system bus to said control computing unit; and means for visually displaying an image of said 3-D voxel-based object represented in said three-dimensional memory storage array, wherein said image is viewable along a viewing direction specified by said user and formed from a two-dimensional array of said pixel data elements obtained from said pixel data element buffering means.

22. The parallel computing system of claim 21, wherein said user-input data specifies said 3-D geometric object for conversion into said 3-D voxel based-object, and said parameters specify an implicit representation of said 3-D geometric object;

wherein said control computing unit transmits said parameters to said local computing units;

wherein said one or more local programs at each said local computing unit comprise a local voxelization program which instructs said local computing unit to process said parameters, produce voxel data elements representative of a portion of said 3-D geometric object in said 3-D space, and store said produced voxel data elements in said operably connected local memory storage module, and whereby, the voxel data elements produced by said plurality of local computing units collectively provide, in parallel, a complete voxel-based representation of said 3-D geometric object in said 3-D space.

23. The parallel computing system of claim 21, wherein said user-input data further specifies a viewing direction in 3-D space along which a plurality of projected viewing rays represented therein extend through said 3-D voxel-based object and said parameters further specify a geometric representation of said projected viewing rays;

wherein said local computing units use said parameters to produce pixel data elements which each said projected viewing ray contributes to the image of said 3-D voxel-based object viewed along said specified viewing direction.

24. The parallel computing system of claim 21, wherein each projected viewing ray extends parallel to each and every other projected viewing ray, represented in said 3-D space, and through said 3-D voxel-based object.

25. The parallel computing system of claim 21, wherein each projected viewing ray extends from said user and through said 3-D voxel-based object.

26. The parallel computing system of claim 21, wherein said parameters specify a voxel data filtering function to be performed on said 3-D voxel based object;

wherein said one or more local programs at each said local computing unit comprise a local filtering program which instructs said local computing unit to process voxel data elements in accordance with said voxel data filtering function, and wherein voxel data elements are processed in parallel by said plurality of local computing units to provide a complete voxel-based representation of said 3-D geometric object filtered in accordance with said voxel data filtering function.

27. The parallel computing system of claim 26, wherein, for each rectilinear sequence of memory storage elements in said three-dimensional memory storage array accessed by said plurality of local computing units, said control computing unit transmits Cartesian coordinates to said local computing units in order to specify the rectilinear sequence of data storage elements, transmits a predetermined memory module distance parameter to said voxel data element transfer means in order to specify parallel transferal of voxel data elements among said plurality of local computing units, and controls the operation of said voxel data element transfer means.

28. The parallel computing system of claim 27, wherein the parameters specifying said voxel data filtering function are produced by said user interface computing unit.

29. The parallel computing system of claim 27, which further comprises a data input/output unit, through which a plurality of voxel data elements can be selectively transferred from an external data storage device to a specified sequence of memory storage elements in said three-dimensional memory storage array, and through which said plurality of voxel data elements can be selectively transferred from said specified sequence of memory storage elements in said three-dimensional memory storage array to said external storage device.

30. The parallel computing system of claim 29, wherein said control computing unit includes means for coordinating the operation of said plurality of local computing units so as to orchestrate access to a rectilinear sequence of memory storage elements parallel to any one of said coordinate axes in said three-dimensional memory storage array.

31. The parallel computing system of claim 29, wherein said three-dimensional memory storage array has three principal planes, and wherein said control computing unit includes means for coordinating the operation of said plurality of local computing means so as to orchestrate access to a sequence of memory storage elements arranged within a plane parallel to one of the principal planes in said three-dimensional memory storage array.

32. The parallel computing system of claim 29, wherein said control computing unit includes means for coordinating the operation of said plurality of local computing units so as to orchestrate access to a sequence of memory storage elements arbitrarily arranged across said three-dimensional memory storage array.

33. The parallel computing system of claim 29, wherein the location of each said memory storage element in said three-dimensional memory storage array is specified by Cartesian coordinates selected from the group consisting of x, y and z;

wherein said control computing unit executes said one or more local programs produces a set of Cartesian coordinates which specify a sequence of memory storage elements in said three-dimensional array, and transmits said set of Cartesian Coordinates over said system bus to said plurality of local computing units; and wherein said plurality of local computing units process said set of Cartesian coordinates in accordance with said one or more local programs so as to generate physical memory addresses for accessing said sequence of memory storage elements specified by said set of Cartesian coordinates.

34. The parallel computing system of claim 33, wherein said pixel data element buffering means comprises a plurality of dual-port data storage buffers indexable as k=0,1, . . . , N-1, each said dual-port data storage buffer being operably connected to one said local computing unit by one said local bus, and said plurality of dual-port data storage buffers being accessible in parallel by said plurality of local computing units by way of said plurality of local buses, and being sequentially accessible by said control computing unit or said user interface computing unit by way of said system bus.

* * * * *

UNITED STATES PATENT AND TRADEMARK OFFICE
CERTIFICATE OF CORRECTION

PATENT NO. : 5,963,212  
APPLICATION NO. : 08/873043  
DATED : October 5, 1999  
INVENTOR(S) : Reuven Bakalash Page 1 of 1

It is certified that error appears in the above-identified patent and that said Letters Patent is hereby corrected as shown below:

Title page, item [63] should read

--Related U.S. Application Data:

Continuation of application No. 08/329,250, October 26, 1994, Pat. No. 5,751,928, which is a continuation of application No. 07/936,178, August 26, 1992, Pat. No. 5,361,385.--

Signed and Sealed this

Twenty-third Day of February, 2010

David J. Kappos  
*Director of the United States Patent and Trademark Office*